May 13, 1958 O. J. SUNDSTRAND 2,834,542

TOTALIZER ENGAGING MECHANISM

Filed Jan. 14, 1954 37 Sheets-Sheet 1

Inventor:
Oscar J. Sundstrand
By
Ahlberg, Wupper & Gradolph
Attorneys.

Inventor.
Oscar J. Sundstrand
By Ahlberg, Wupper & Gradolph
Attorneys.

May 13, 1958 O. J. SUNDSTRAND 2,834,542

TOTALIZER ENGAGING MECHANISM

Filed Jan. 14, 1954 37 Sheets-Sheet 3

Inventor:
Oscar J. Sundstrand
By Ahlberg, Wupper, & Gradolph
Attorneys.

Inventor:
Oscar J. Sundstrand
By Ahlberg, Wupper & Gradolph
Attorneys.

Inventor:
Oscar J. Sundstrand

By Ahlberg, Wupper & Gradolph
Attorneys

May 13, 1958 O. J. SUNDSTRAND 2,834,542

TOTALIZER ENGAGING MECHANISM

Filed Jan. 14, 1954

37 Sheets-Sheet 6

INVENTOR.
Oscar J. Sundstrand

BY

Ahlberg, Wupper & Gradolph
Attorneys.

May 13, 1958 O. J. SUNDSTRAND 2,834,542

TOTALIZER ENGAGING MECHANISM

Filed Jan. 14, 1954 37 Sheets-Sheet 7

INVENTOR.
Oscar J. Sundstrand
BY Ahlberg, Wupper & Gradolph
Attorneys.

May 13, 1958 O. J. SUNDSTRAND 2,834,542

TOTALIZER ENGAGING MECHANISM

Filed Jan. 14, 1954 37 Sheets-Sheet 8

INVENTOR.
Oscar J. Sundstrand
BY
Ahlberg, Wupper & Dradolph
Attorneys

May 13, 1958 O. J. SUNDSTRAND 2,834,542

TOTALIZER ENGAGING MECHANISM

Filed Jan. 14, 1954 37 Sheets-Sheet 9

INVENTOR.
Oscar J. Sundstrand
BY
Ahlberg, Kupper & Gradolph
Attorneys

INVENTOR.
Oscar J. Sundstrand
BY
Ahlberg, Wupper & Gradolph
Attorneys

INVENTOR.

Oscar J. Sundstrand

BY

Ahlberg, Wupper & Gradolph

Attorneys

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 13

Inventor:
Oscar J. Sundstrand
By Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 14

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954

37 Sheets-Sheet 15

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 16

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 17

INVENTOR.

Oscar J. Sundstrand

BY Ahlberg, Wupper & Gradolph

Attorneys.

INVENTOR.
Oscar J. Sundstrand
BY
Ahlberg, Wupper & Gradolph
Attorneys.

May 13, 1958 O. J. SUNDSTRAND 2,834,542

TOTALIZER ENGAGING MECHANISM

Filed Jan. 14, 1954 37 Sheets-Sheet 19

INVENTOR.
Oscar J. Sundstrand
BY
Ahlberg, Wupper & Gradolph
Attorneys

INVENTOR.
Oscar J. Sundstrand
BY
Ahlberg, Wupper & Gradolph
Attorneys

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 22

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 23

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 24

INVENTOR.
Oscar J. Sundstrand
BY
Ahlberg, Wupper & Gradolph
Attorneys

INVENTOR.
Oscar J. Sundstrand
BY
Ahlberg, Wupper & Gradolph
Attorneys

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 27

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 28

INVENTOR.
Oscar J. Sundstrand
BY
Ahlberg, Wupper & Gradolph
Attorneys

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 30

INVENTOR.
Oscar J. Sundstrand
BY
Ahlberg, Wupper & Gradolph
Attorneys

INVENTOR.
Oscar J. Sundstrand
BY
Ahlberg, Wupper & Gradolph
Attorneys

May 13, 1958

O. J. SUNDSTRAND 2,834,542

TOTALIZER ENGAGING MECHANISM

Filed Jan. 14, 1954

37 Sheets-Sheet 32

INVENTOR.
Oscar J. Sundstrand
BY
Ahlberg, Wupper & Gradolph
Attorneys

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 34

INVENTOR.
Oscar J. Sundstrand
BY Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 35

INVENTOR.
Oscar J. Sundstrand
BY
Ahlberg, Wupper & Gradolph
Attorneys

May 13, 1958 O. J. SUNDSTRAND 2,834,542

TOTALIZER ENGAGING MECHANISM

Filed Jan. 14, 1954 37 Sheets-Sheet 36

INVENTOR.
Oscar J. Sundstrand
BY
Ahlberg, Wupper & Gradolph
Attorneys

INVENTOR.
Oscar J. Sundstrand
BY Ahlberg, Nupper & Gradolph
Attorneys

United States Patent Office 2,834,542

Patented May 13, 1958

2,834,542

TOTALIZER ENGAGING MECHANISM

Oscar J. Sundstrand, West Hartford, Conn., assignor to Victor Adding Machine Co., Chicago, Ill., a corporation of Illinois Application January 14, 1954, Serial No. 404,088

4 Claims. (Cl. 235—60)

The present invention relates to printing calculating machines, and more particularly to improved means and mechanism whereby adding, subtracting, multiplying, and dividing operations may be expeditiously performed.

It is the primary object of the invention to provide a printing calculating machine in which amounts may be totalized, and without removing the total from the machine this total may be used as the multiplicand of a following multiplication operation or as the dividend of a following dividing operation.

A further object is to provide a printing calculating machine in which amounts set up by the numeral keys may be transferred to a register, and the amounts set up in this register subsequently may be used in multiplying or dividing operations.

A further object is to provide a printing calculating machine which is capable of performing successive dividing operations, using a constant divisor, and similarly may be used in successive multiplying operations using a constant multiplicand, without having to reset the divisor in dividing operations or the multiplicand in multiplying operations.

A further object is to provide an improved printing calculating machine which, in addition to performing the usual adding and subtracting operations, is capable of performing multiplying operations, printing the multiplier, multiplicand, and product; which is capable of performing dividing operations printing the dividend, divisor, and quotient, with the remainder; which is capable of taking automatic totals and subtotals, both positive and negative; and which is capable of automatically multiplying by a constant multiplier and automatically dividing by a constant divisor; whereby, the machine may be used to perform a large variety of arithmetical problems conveniently and rapidly, with a minimum of time required to set up amounts in the keyboard, and with a complete record of the problem printed on the record tape.

Other objects will appear from the following description, reference being had to the accompanying drawings, in which.

GENERAL DESCRIPTION OF MACHINE

Figure 1:
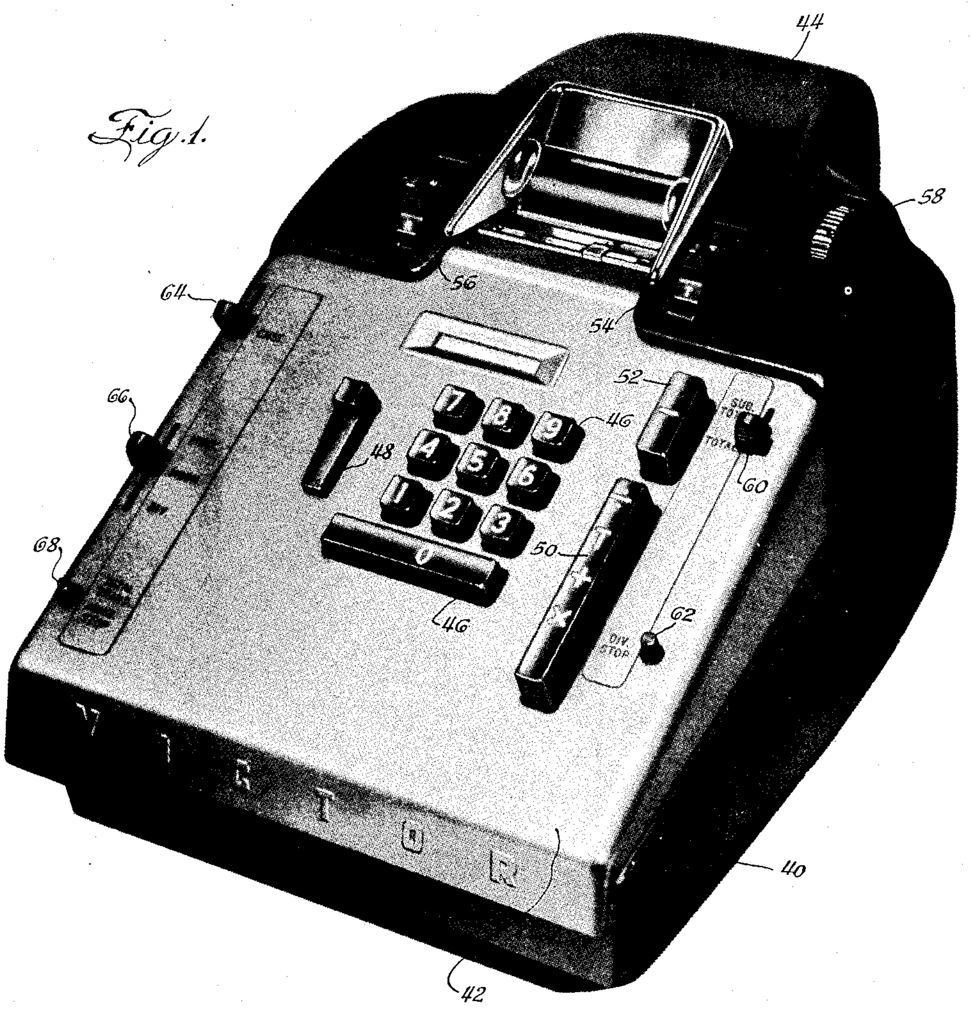
Fig. 1 is a perspective view of the machine.

As best shown in Fig. 1, the machine comprises a casing bottom 40, a casing top 42, and a back cover 44 hinged to the top 42. The casing top 42 and back cover 44 are suitably apertured for the following manually operating control elements:

Ten numeral keys for zero and the digits 1 to 9, a pin carriage clearing slide knob 48, motor bar 50, subtract bar 52, manual total and subtotal control lever key 54, repeat and nonadd lever key 56, and a platen feed knob 58.

In most respects, the above recited manual control elements are operated in a conventional manner, and cause the machine to accomplish the conventional results.

In addition to these more or less conventional controls, there is provided a shiftable knob 60 to control the machine to take totals or subtotals automatically, a division stop button 62 which controls the stopping of a dividing operation in the event the problem has been carried out to the desired number of decimal points or if the machine is incorrectly operated in a certain manner.

In general, when not referring to any specific figure, the terms "left" and "right" and similar directional terms, will be understood to refer to the machine as viewed from the front. The "forward" and "return" stroke will be considered in the customary sense as applied to the main operating shaft of a hand operated adding machine.

On the left side of the machine there is a "constant" key 64 shiftable between one of two positions to condition the machine to retain the multiplicand (or divisor) when a series of multiplying (or dividing) operations are to be performed, using the same multiplicand (or divisor); a key 66 movable to condition the machine for performing adding or subtracting operations, a multiplying operation, or a dividing operation; and a push button 68 for controlling total transfers in multiplying operations and for use in stopping multiplying operations in the event that an insoluble problem has been entered in the machine.

The machine disclosed herein is, in so far as its adding and subtracting functions are concerned, similar in many respects to the machine shown in Thomas O. Mehan Patents No. 2,475,510, granted July 5, 1949, No. 2,486,-959, granted November 1, 1949, and No. 2,550,581, granted April 24, 1951. In general, this mechanism which, per se, is not claimed herein, comprises a pin carriage 70 (Fig. 4) suitably mounted for lateral sliding movement on a rod 71 and a rail 72. This carriage has a plurality of rows of pins 74 which are depressed by the stems 76 of the numeral keys 46, so that one pin in each row may be projected in front of the offset stop shoulder 78 of an actuator 80. The pins are held in either their upper positions or in their projected position by any well known detent or friction means.

The rearward ends of the actuators 80 are provided with upwardly facing racks 82 which mesh with segmental gears 84, carrying numeral type segments 86. The segments 84 also have teeth 88 for cooperation with an aligner 90 to align the type faces prior to making a printing impression, which is accomplished by cooperation with an inking ribbon (not shown) and platen 92 in the customary manner to make a printing impression.

The actuators 80 also have downwardly facing racks 94 at their rearward ends, these racks meshing with segmental gears 96 which are connected by springs 98 with gear segments 100. The springs 98 are normally tensioned by virtue of the engagement of sidewardly extending lugs 102 with the end of the hook portion 104 of transfer pawls 106, which are tripped in the usual manner during an adding or subtracting operation so as to permit the lug 102 to enter into the notch formed by portion 104, and thereby cause the segmental gear 100 of the next higher denominational order to advance and thereby effect a transfer into either the subtract pinions 108 and into the meshing adding pinions 109 of an accumulator, which will hereinafter be termed the "C" register or accumulator. The transfer mechanism is reset in the customary manner.

The machine as a whole is operated by power transmitted through a main shaft 110. Either set of accumulator pinions 108 or 109 is selectively brought into mesh with the segmental gears 100, depending upon whether a subtracting or adding operation is to be performed. The mechanism for accomplishing this being well known, will not be described in detail herein.

OPERATIONAL CONTROLS

*The cycle sequence cam shaft*

Figure 75:
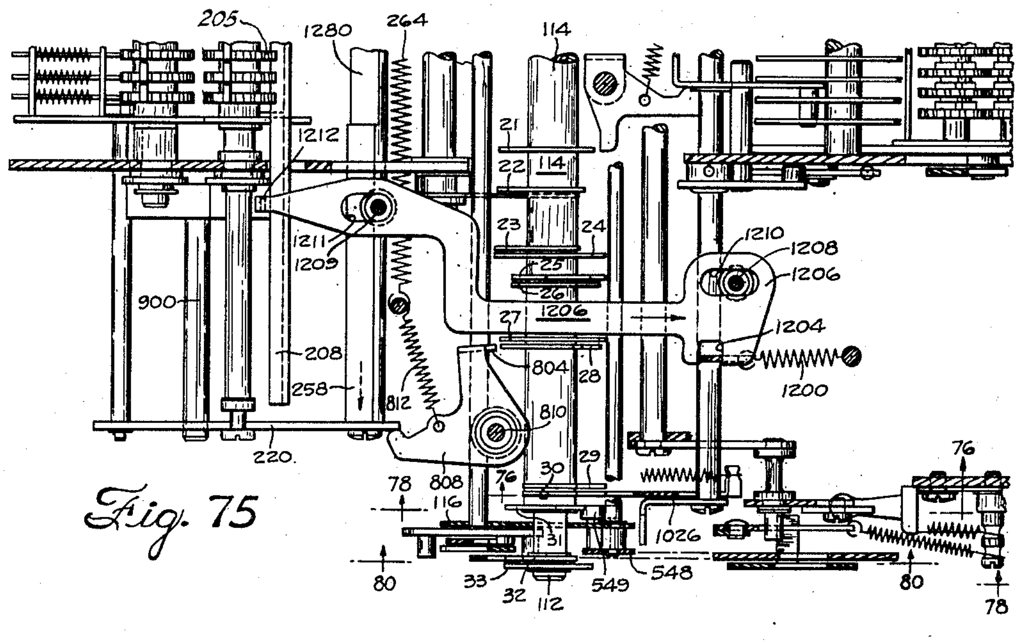
Fig. 75 is a top plan view, taken on the line 75—75 of Fig. 73, showing mechanism below the base, this figure being a continuation of Fig. 23.

For operating the various controls, particularly those for conditioning the machine for multiplying and dividing, for taking automatic totals and subtotals, and for other operations, there is provided a cam shaft 112 (Figs. 4, 15, 23, and 75). Thirty-three cams, numbered 1 to 33, are keyed to the shaft 112, being separated from each other by suitable tubular spacers 114 of different lengths. (One of these "cams" is a ratchet wheel and another is part of an indexing means for the shaft.) The left-hand end of cam shaft 112 bears in an outer left frame plate 115 (Fig. 23) while the right-hand end bears in a plate 116 (Fig. 75).

Figure 3:
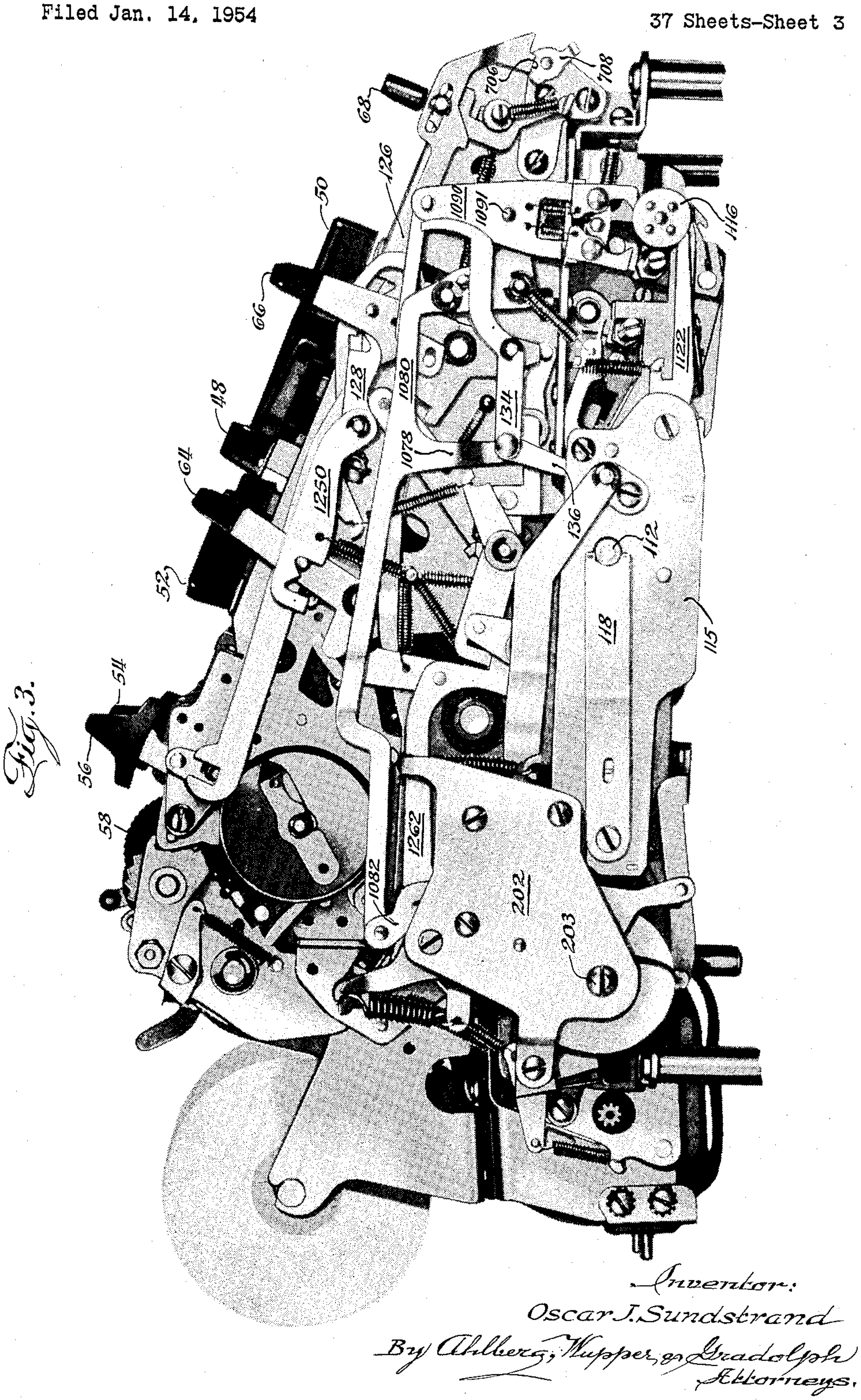
Fig. 3 is a left side elevation, with the case removed.
Figure 15:
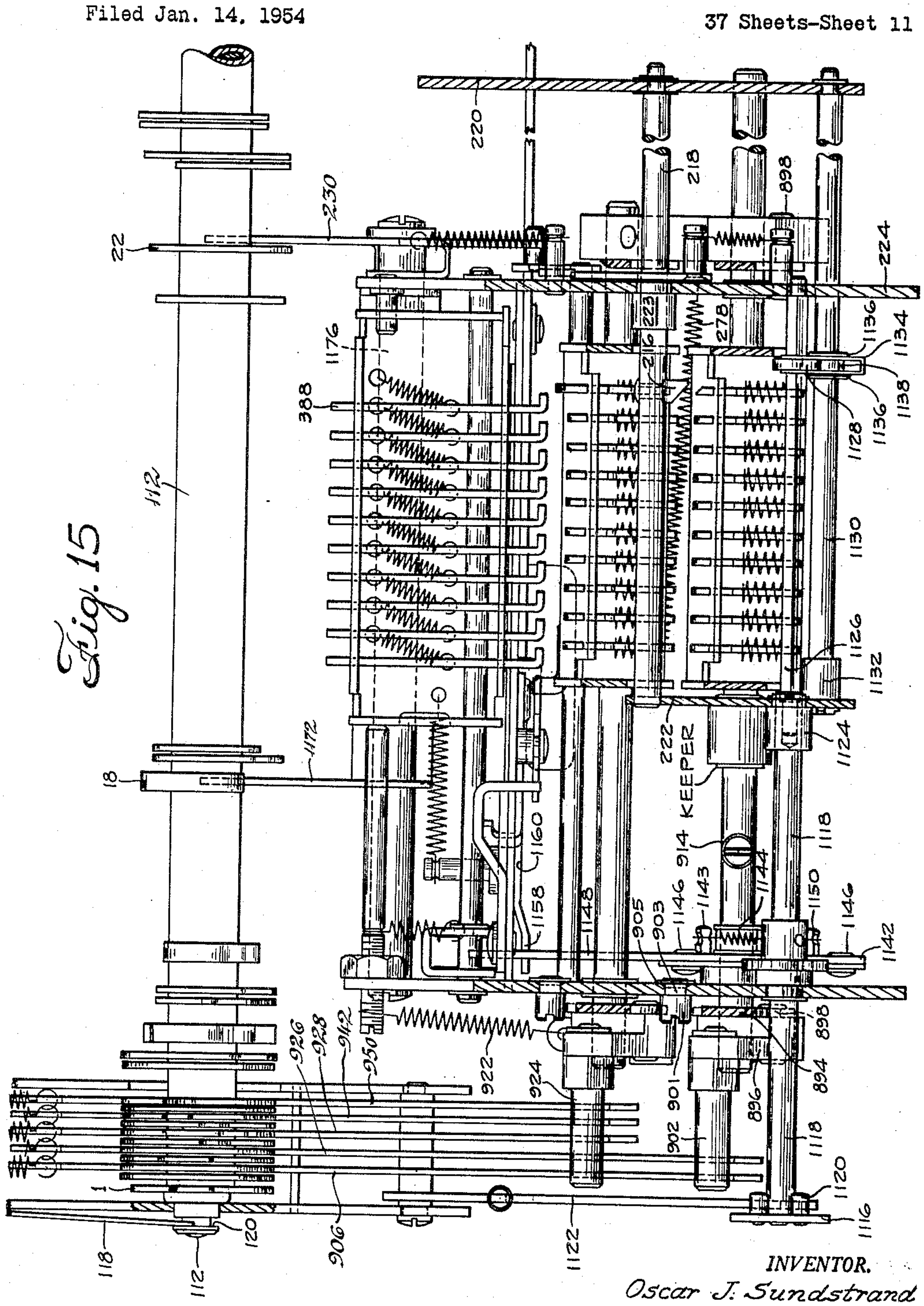
Fig. 15 is a sectional plan view, taken substantially on the line 15—15 of Fig. 8.
Figures 23, 24:
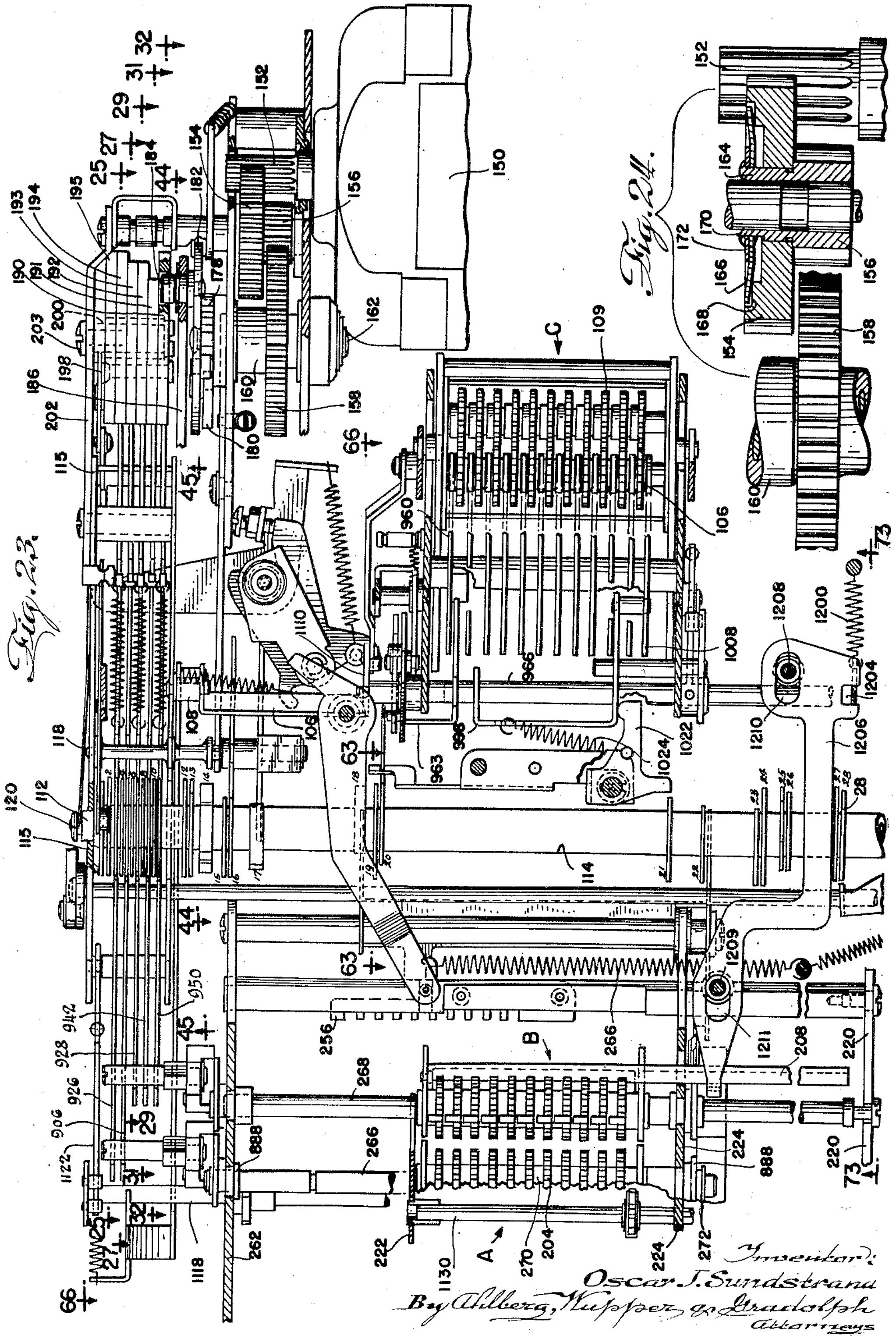
Fig. 23 is a top plan view, taken on the line 23—23 of Fig. 4, showing calculating cams, calculating slides, cam shaft, motor and gear drive, and index control mechanism for "A," "B," and "C" registers.
Fig. 24 is an enlarged sectional view of the frictional gear drive.
Figures 33, 34, 35, 36:
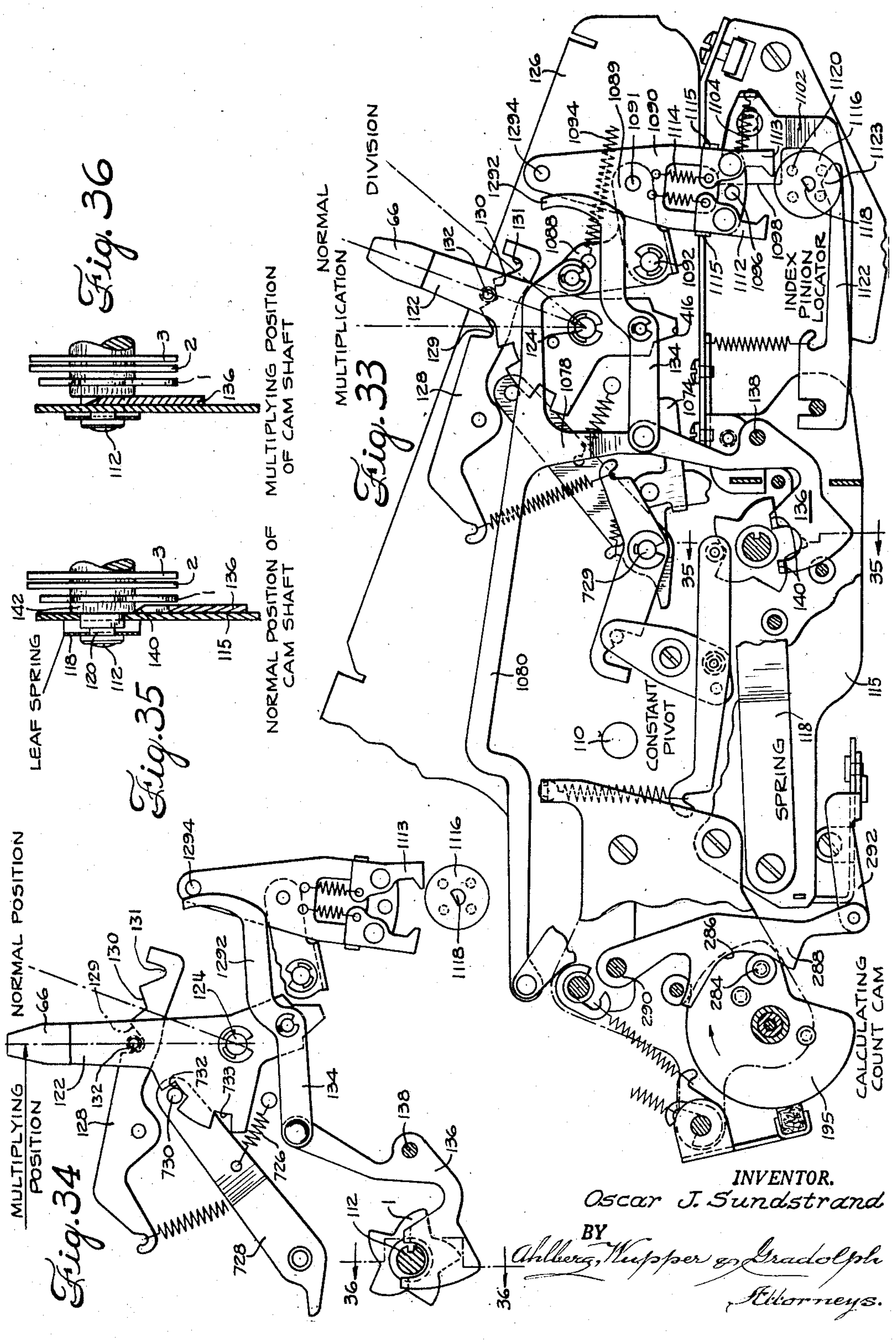
Fig. 33 is an elevational view of the left side of the machine, showing the cam shaft locator, cam shaft shift mechanism, function control key, calculating counter arm, counter arm link, and trip ratchet feed disc.
Fig. 34 is a fragmentary view of the cam shaft shift mechanism, engaged to shift the cam shaft, shown in multiplying position.
Fig. 35 is a partial sectional view, taken on the line 35—35 of Fig. 33.
Fig. 36 is a partial sectional view, taken on the line 36—36 of Fig. 34.

The shaft 112 is biased to move to its leftmost position by a leaf spring 118 suitably secured to the plate 115, the free end of the leaf spring 118 fitting in a suitable groove 120, as best shown in Figs. 3 and 23. This shaft has two effective longitudinal positions (to the left for dividing, to the right for multiplying), it being capable of movement to the right from the position in which it is shown in Figs. 23 and 15, a distance of approximately .050 inch. The means for causing this movement are best shown in Figs. 33, 35, and 36. The control key 66 has a stem 122 pivoted on a stud 124 suitably mounted on the left-hand frame plate 126. The stem 122 is held in any one of three positions by a spring urged detent lever 128 which has three notches 129, 130, and 131 therein for engagement with a sidewardly projecting stud 132 on the key stem. The lower end of the key stem 122 is connected by a link 134 with a lever 136 pivoted on a stud 138. The rear end of the lever 136 is provided with wedging surfaces 140 which, when the key stem 122 is swung to multiplying position (with the stud 132 engaging in notch 129), wedge in between the frame plate 115 and a collar 142 fixed to shaft 112, thereby driving the shaft 112 to the right, as indicated in Fig. 36. In this position some of the cams may engage different follower elements and thus the number of possible combinations or conditions of operation may be controlled with a minimum number of parts.

The cam shaft 112 may be stopped at any one of eleven angular positions and, as above described, may be set at either of two lateral positions, making twenty-two positions that each cam may assume, and since there are thiry-one cams on this shaft (the parts 1 and 17 are in reality cam shaft indexing and ratchet wheels) there is a possibility of using the cams to effect a very large number of different controls. Of course, all of these possibilities are not utilized in the present invention, but it is desired to point out that this simple cam shaft assembly for controlling the operation of the various mechanisms and kinematic trains greatly simplifies and lessens the cost of the machine.

In many instances the movement of the cam shaft does not cause the operation of mechanisms, but instead the cams are utilized as limit stops for parts such as arms, levers, and slides, the power for the movement of which is derived from other cams and mechanisms which are more directly driven from the motor driven main shaft.

It will be helpful to note that the keyway in the cam shaft 112 is directed forwardly when the shaft is in normal position.

*The motor drive and slide operating cams*

As best shown in Figs. 23 and 24, the machine is driven by a motor, the rotor shaft of which is formed as a pinion 152 meshing with a gear 154, the gear being frictionally connected to a pinion 156 which in turn meshes with a gear 158, having a hub 160 which is rotatable on a shaft 162. The frictional driving connection between the gear 154 and pinion 156, as best shown in Fig. 24, is effected by having the gear 154 rotatable upon a hub 164 integral with the pinion 156, and stressing a spring washer 166 between the grooved surface 168 and staked lugs 170 at the end of the hub 164. The hub 164 has a flattened portion at 172 and the spring washer 166 has a D-shaped hole therein complementary to the cross sectional shape of the hub. There is thus a considerable frictional driving torque between the gear 154 and pinion 156, this torque being sufficient to drive the machine under all normal conditions of operation, but permitting the frictional connection to yield if there is any abnormal lock-up of the machine.

Figure 2:
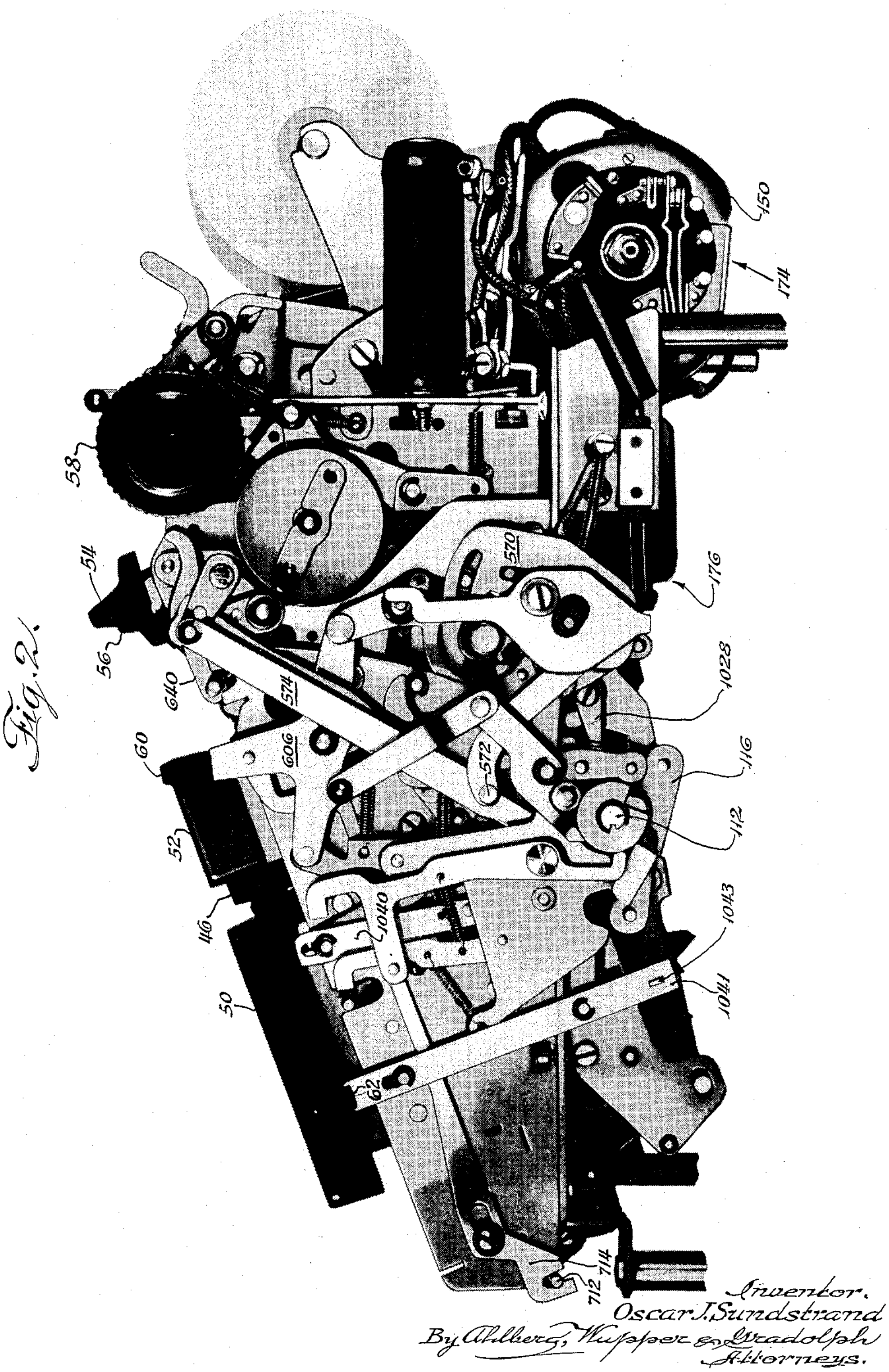
Fig. 2 is a right side elevation, with the case removed.

The motor 150 is provided with a governor mechanism 174 (Fig. 2) and is energized by the closure of a switch 176, in a manner hereinafter to be described.

A one revolution clutch mechanism, including a ratchet wheel 178 fixed to the hub 160, may be of conventional construction and provided with a pawl 180 (Fig. 44) which is secured to a disc 182 to form a driving connection when the pawl is permitted to engage the ratchet wheel 178, the pawl being biased for engagement with the ratchet wheel by a spring 181.

The disc 182 has a shouldered stud 184 which forms a pivot for a main shaft actuating link 186 (Fig. 23), and which also projects into the first of six cams 190, 191, 192, 193, 194, and 195, these cams being secured to each other by one or more rivets 198, and are rotatable on a stub shaft 200 secured by a screw 203 to an outer rear side frame plate 202, as best shown in Figs. 3, 23, and 25 to 32.

These cams 190 to 195 operate various parts of the control mechanism once during each cycle of the machine.

*The A and B registers*

As best shown in Figs. 4, 8, 14, and 23, there are two registers A and B, each comprising eleven 20-tooth pinions 204 for the A register, and pinions 205 for the B register. These registers are not accumulators in that they have no transfer mechanisms. The A register is essentially a counter for the cycles of operation during the performance of multiplication and division problems, and the B register serves mainly as an amount storage device. The pinions 204 are held in operated position by spring pressed detents 206, while the pinions 205 are held in position by an aligner bail 208.

Figure 8:
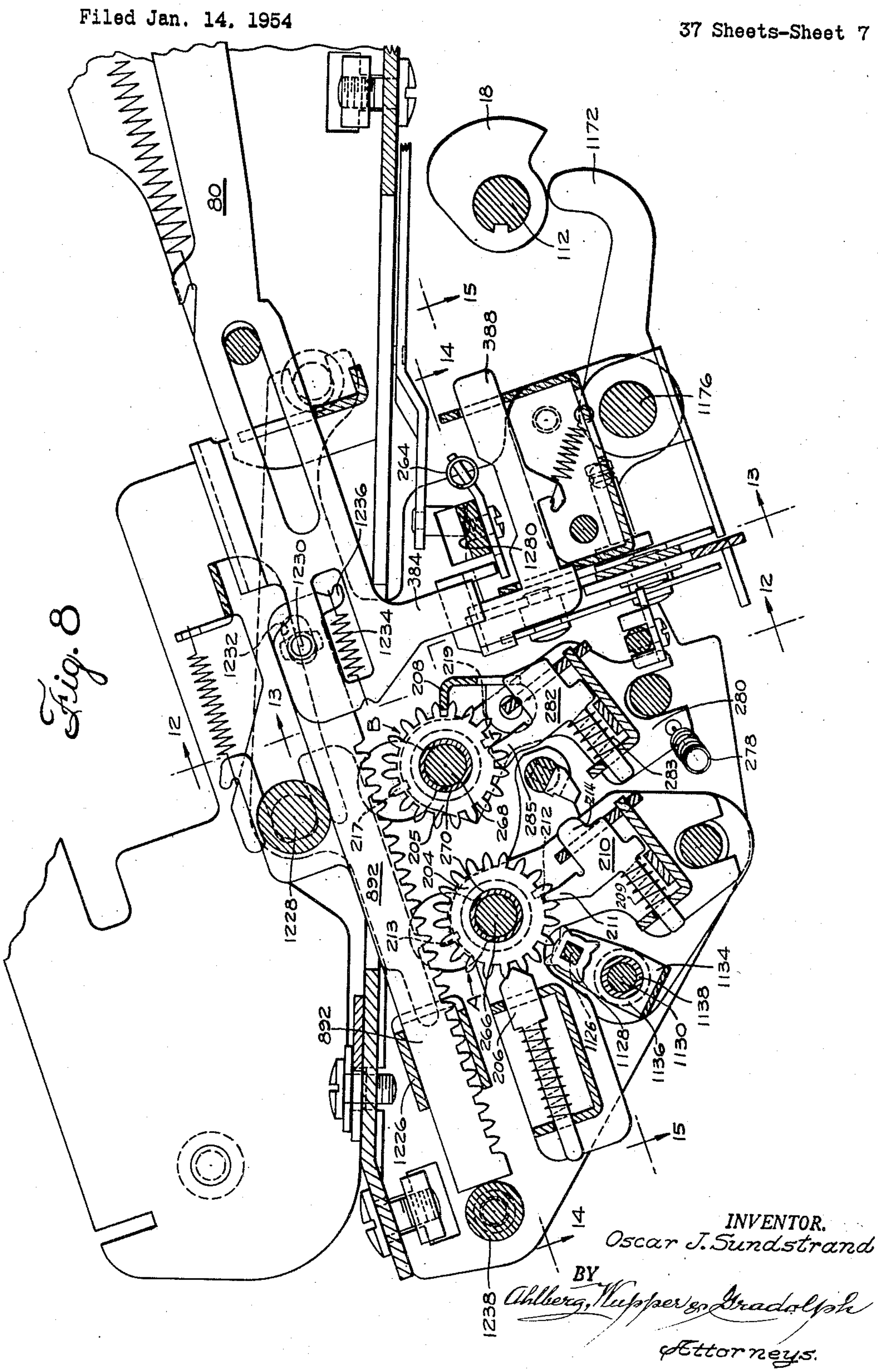
Fig. 8 is a cross sectional view of the calculating section, taken on the line 8—8 of Fig. 5.
Figures 16, 18, 19:
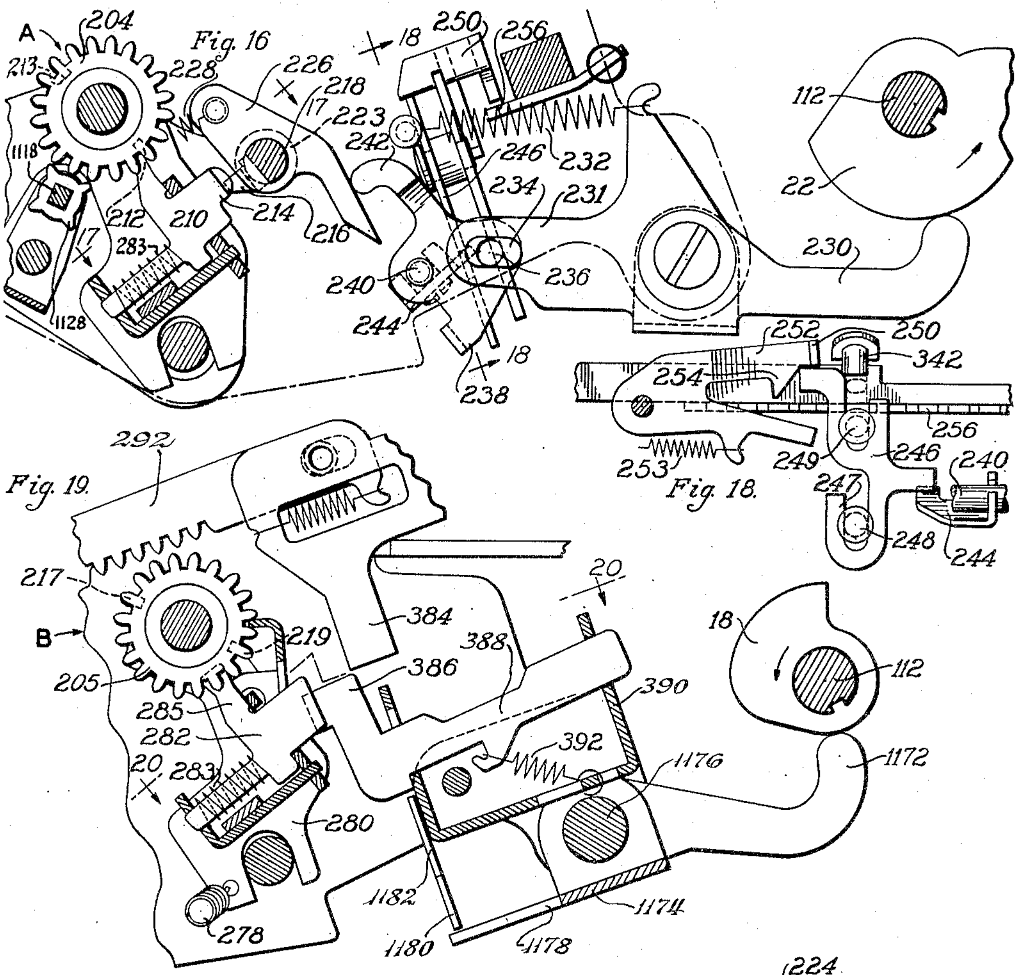
Fig. 16 is a fragmentary sectional view of the "A" register (used for the multiplier or quotient), together with associated operating mechanism.
Fig. 18 is a fragmentary elevational view, taken on the line 18—18 of Fig. 16.
Fig. 19 is a fragmentary sectional view of the "B" register (used for the multiplicand or divisor), together with associated mechanism.
Figure 17:
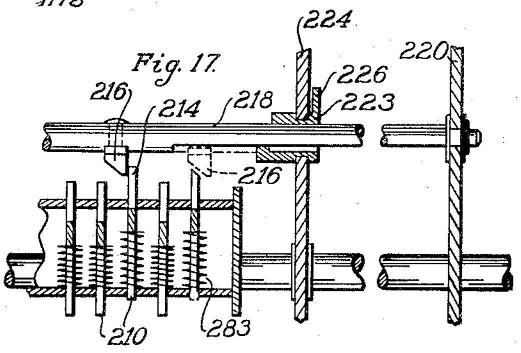
Fig. 17 is a fragmentary sectional plan view, taken on the line 17—17 of Fig. 16.

As best shown in the enlarged views of Figs. 8 and 16, each pinion 204 of the A register has associated therewith a sliding stop element 210 which is biased by a spring 209 to move rearwardly. Each of these stop elements has an upwardly extending nose 211 which is cooperable with a sidewardly extending tooth or lug 212 on the pinion 204. Each pinion 204 has a second lug 213 diametrically opposite its lug 212. Pinions 205 have similar lugs 217 and 219. Thus when, under certain circumstances, the pinion 204 is permitted to move counterclockwise, the angular distance of one tooth to the position shown in Fig. 16, the rearwardly extending nose 214 is projected into the path of a stop lug 216 which is riveted to a shaft 218. This shaft is pivoted in the carriage frame members 220 and 222, and is slidable in a bushing 223 pivotally mounted on side frame plate 224 (Fig. 17).

The bushing 223 (Figs. 15, 16, and 17) is secured to a lever 226 which is biased for counterclockwise movement by a suitably anchored spring 228. The shaft 218, where it passes through the bushing 223, is of D-shaped cross section and the hole in the bushing is effectively likewise D-shaped, so that the shaft 218 may be pivoted by rotary movement of the lever 226.

Figure 6:
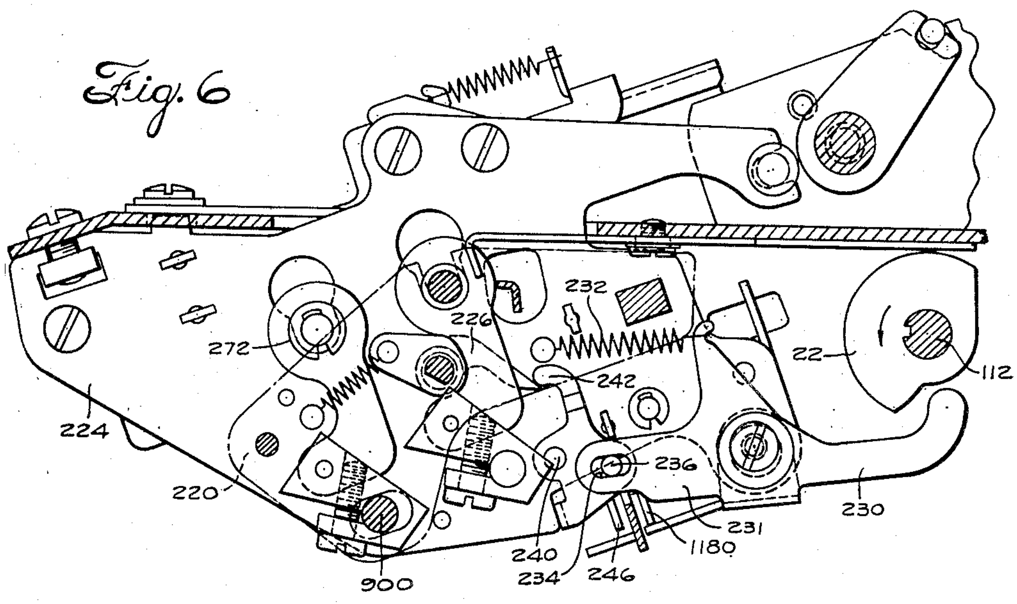
Fig. 6 is a right side elevation of the calculating section, taken on the line 6—6 of Fig. 5.

Under certain conditions the shaft 218 is rotated to the position shown in Fig. 16 by the following mechanism: The cam 22 on the cam shaft 112 is rotated counterclockwise and swings a follower lever 230 clockwise on pivot 233 against the tension of a spring 232 (Figs. 6 and 16). The forwardly projecting arm 231 of the follower lever 230 has an elongated slot 234 into which a stud 236 projects. The stud 236 is fixed to a lever 238 secured to a shaft 240. The lever 238 has an upwardly extending arm 242 which engages the downwardly extending arm of lever 226 and swings the latter clockwise to the position shown in Fig. 16, so that the stop 216 is in position for stopping engagement with the projections 214 of the stop members 210.

Figure 12:
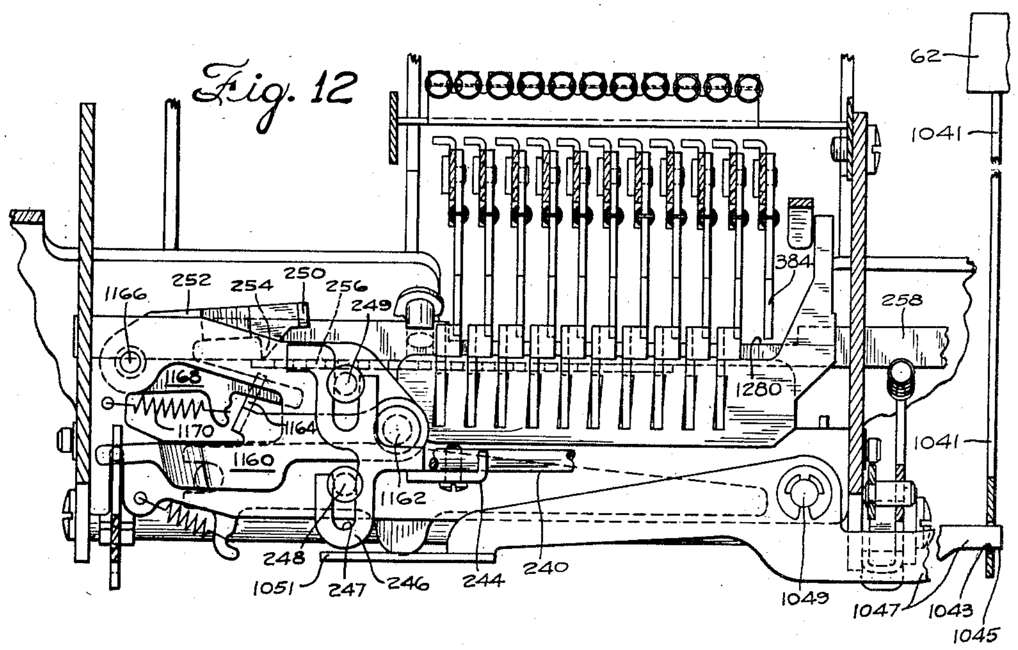
Fig. 12 is a cross sectional view, taken on the line 12—12 of Fig. 8, showing the escapement mechanism, indexing stops and rack bars, indexing stop bracket, and escapement mechanism.

The shaft 240 has a small plate 244 secured thereto, the rearwardly extending portion of this plate lying beneath an escapement disabling member 246 which, as best shown in Figs. 12 and 18, has two U-shaped recesses 247 embracing guiding studs 248 and 249. This escapement disabling member lies beneath a sidewardly bent lug 250 of a pivoted escapement pawl 252, which is biased to move clockwise (Fig. 18) by a suitably anchored spring 253, and has a tooth 254 for engagement with an escapement rack 256. Thus when the escapement disabling member 246 is raised, the tooth 254 is held above the plane of the rack 256 and is ineffective to limit the motion of the rack 256 and parts connected therewith.

Figures 14, 21, 22:
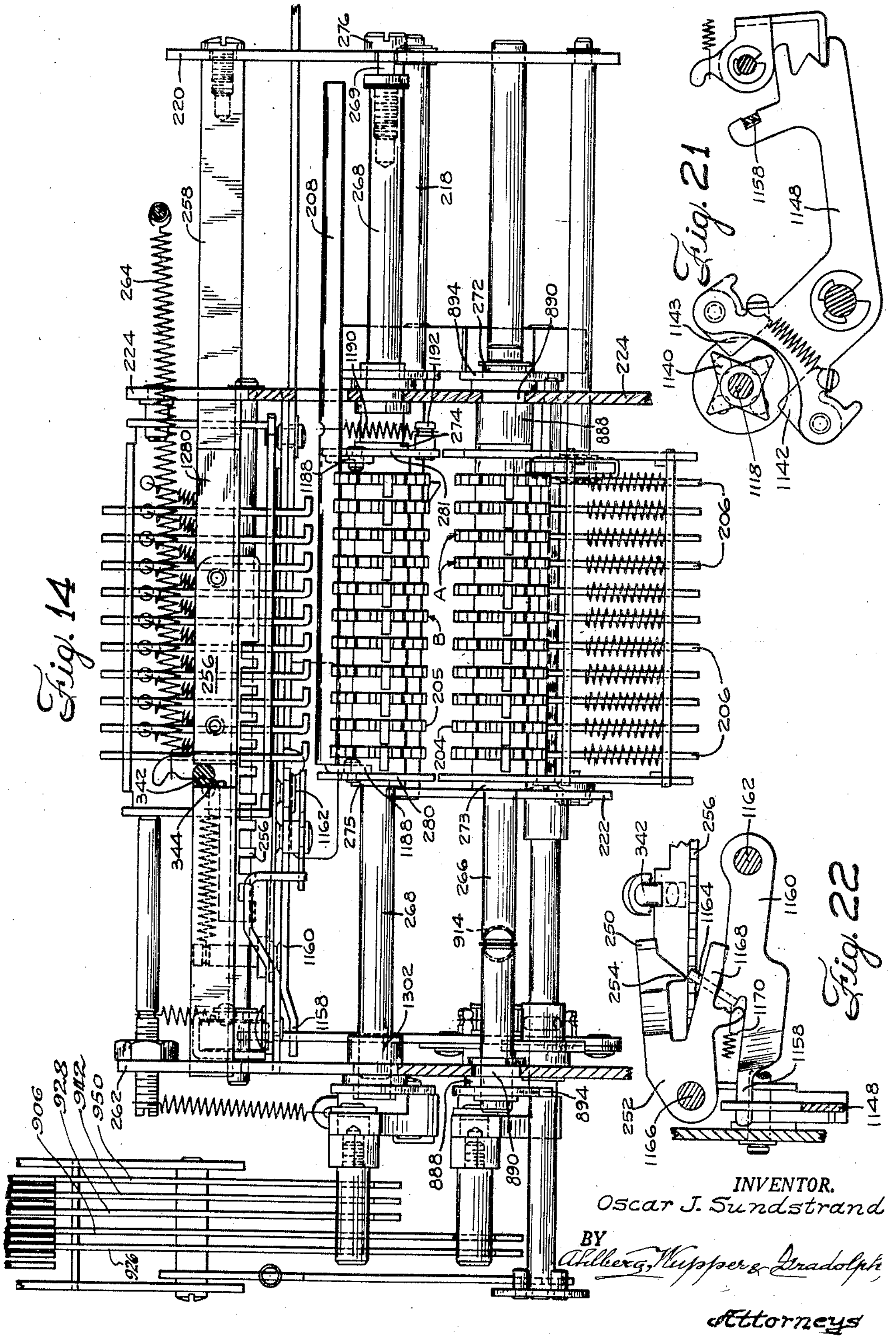
Fig. 14 is a sectional plan view, taken on the line 14—14 of Fig. 8.
Fig. 21 is a fragmentary elevational view of "add-back" escapement control mechanism, the parts being in the positions assumed when an amount is being subtracted from the "C" register during a division operation.
Fig. 22 is a fragmentary view showing the division escapement dog and arm as set by add-back control mechanism, while subtracting from "C" register or accumulator during division operation.

As best shown in Fig. 14, the rack 256 is secured to a square shaft 258 which in turn is secured to the carriage frame member 220. This shaft 258 is mounted for longitudinal sliding movement in plates 224 and 262. The parts carried by the plates 222 and 224 are biased to move to the rgiht (Fig. 14) by a relatively long suitably anchored tension spring 264.

The A and B registers are supported on shafts 266 and 268, respectively, each of the pinions 204 and 205 being rotatable upon a shouldered bushing 270 which acts as a bearing and as a spacer for the pinions. The A register pinions are held against lateral movement by spring keepers 272 and 273, while the B register wheels 205 are mounted on the shaft 268 for lateral movement therewith by spring keepers 274 and 275. The shaft 268 has its righthand end connected to the plate 220 through a lost motion connection including a stud 276 threaded in the end of the shaft and passing freely through the plate 220. A long tension spring 278 (Figs. 8 and 15) has one end anchored to the plate 224 and its other end attached to a bracket 280, which together with a similar bracket 281 form end walls of a frame for holding the pinions 205 and the stop members 282. These stop members are urged rearwardly by springs 283, and all except the rightmost have an upwardly extending stop portion 285 for engagement by the stop teeth 219 on pinions 205.

*B register shifting mechanism*

The frame for the B register is moved to the left (Figs. 14 and 15) against the tension of the spring 264 by the following mechanism: A cam 195 (Figs. 59 and 60) which during each cycle is rotated one revolution counterclockwise by the one revolution clutch mechanism 178, 180, 182, has a stud and roller 284 projecting from the left side thereof which during initial portion of the clockwise rotation (Fig. 33, counterclockwise Fig. 60) engages the curved edge 286 of a follower lever 288 which is pivoted on a stud 290. The free end of this follower lever is pivotally connected to a link 292, the other end of which is pivoted to one arm 294 of a bell crank lever 296. This lever is riveted to a bushing 297 suitably mounted for rotation on a stub shaft 299.

Figures 59, 60:
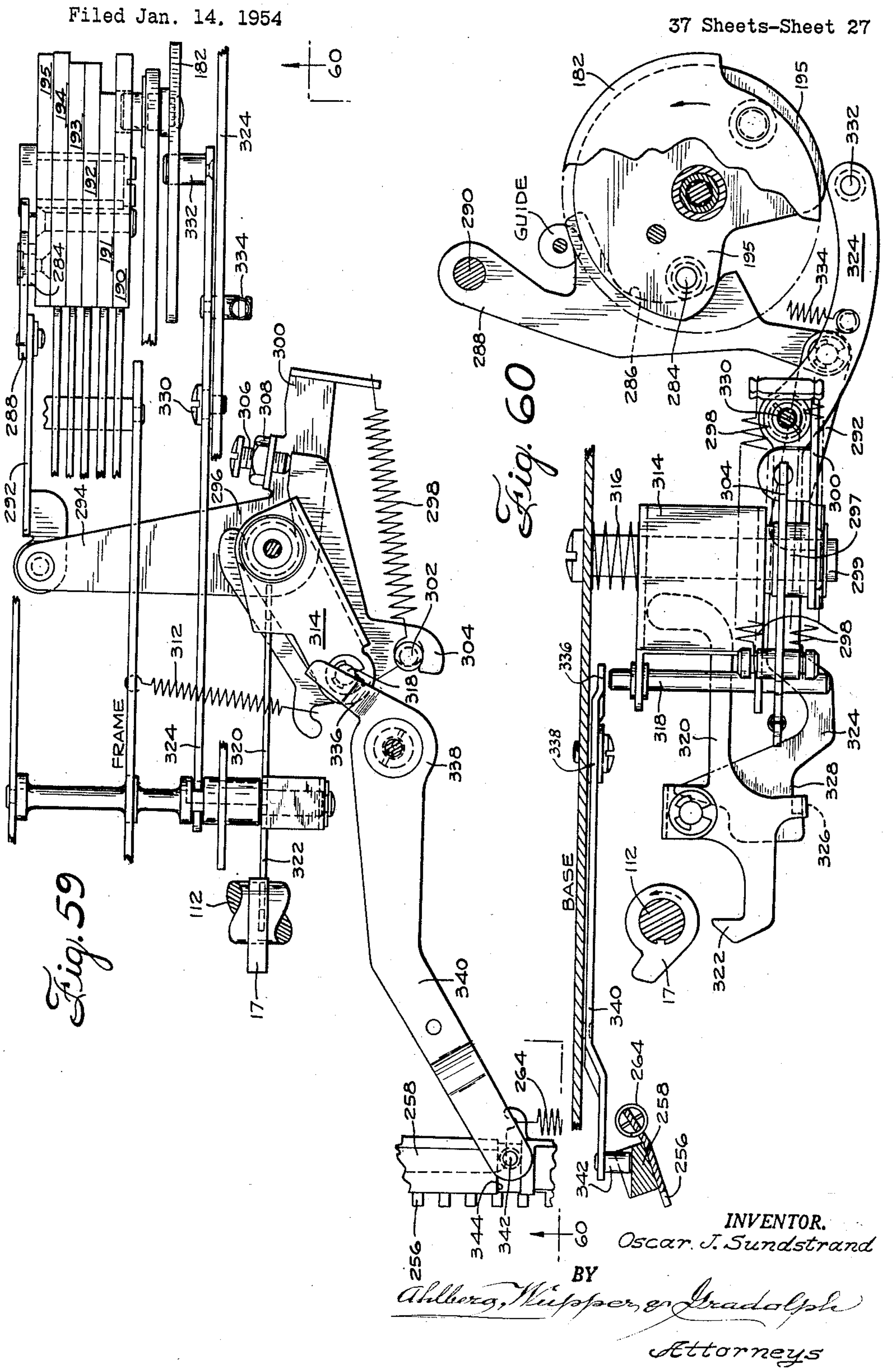
Fig. 59 is a top plan view of the index control mechanism.
Fig. 60 is a vertical sectional view, taken on the line 60—60 of Fig. 59.
Figures 61, 62:
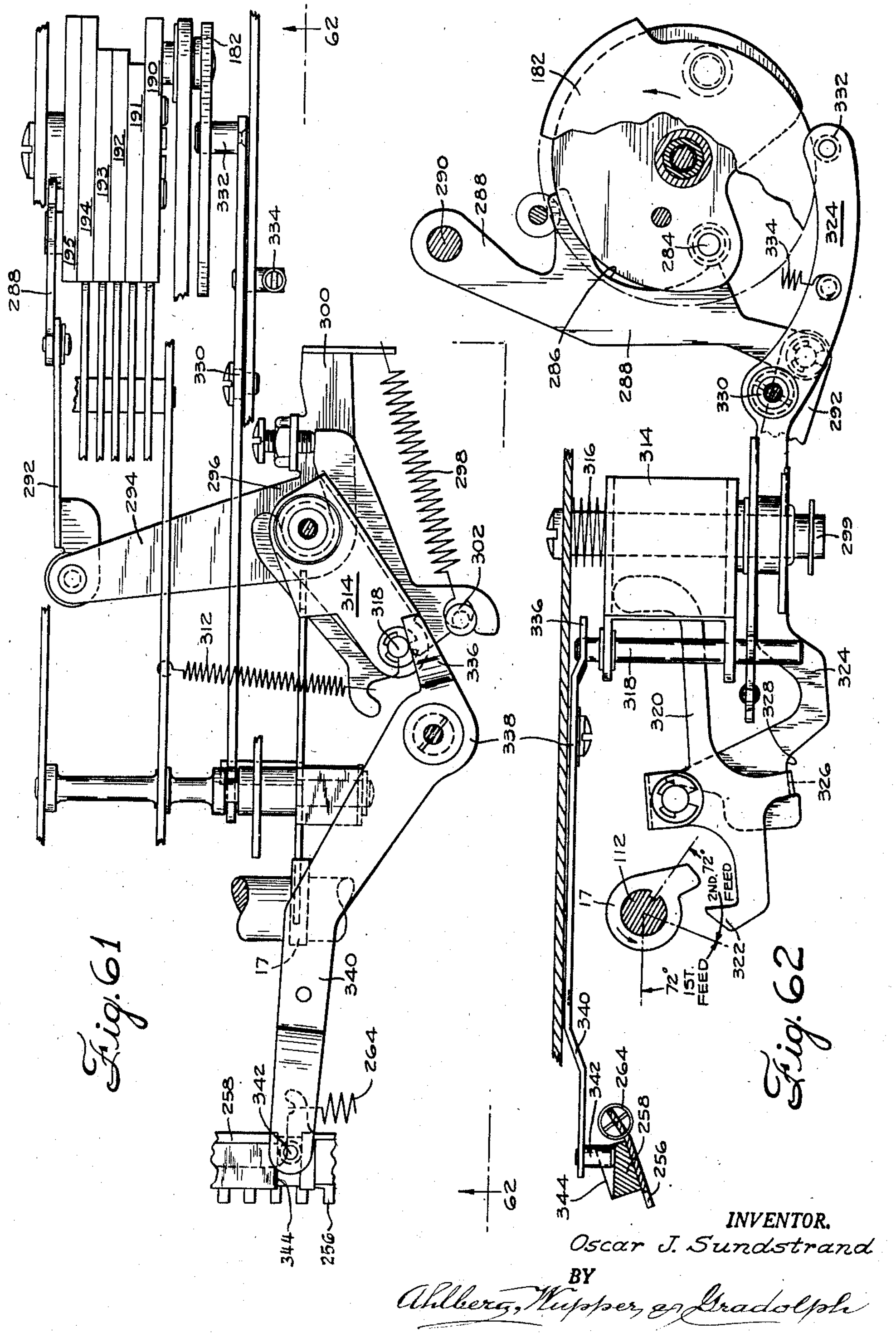
Fig. 61 is a view similar to Fig. 59, showing the parts in operative position, the index control cam being in multiply position.
Fig. 62 is a view taken on the line 62—62 of Fig. 61.

A pair of relatively strong coil springs 298 are tensioned between the other arm 300 of the bell crank 296 and a stud 302, which has a plurality of annular grooves (Fig. 60), two of which receive the ends of the coil springs 298 and the other of which fits in a notch in an index control yield arm 304. The home position of the arm 304 relative to the bell crank 296 may be adjusted by a screw 306 and lock nut 308. The arm 304 is held within a groove formed in a bushing 297 by the spring 298 and by a tension spring 312. The bushing 297 is mounted for rotation on the stub shaft 299. A bail 314 is rotatably and slidably mounted on the stub shaft 299, being urged downwardly by a light compression coil spring 316. This bail has a pin 318 secured thereto which, together with the bail 314, may be raised from the position in which it is shown in Fig. 60 to the position in which it is shown in Fig. 62, by a three-armed lever 320.

This raising action is accomplished by the cam 17 on the cam shaft 112. As the high point of this cam rides past the nose 322 on one of the arms of the three-armed lever 320, it swings the latter counterclockwise to raise the bail 314 and pin 318, and permits a long rearwardly extending lever 324 to swing counterclockwise a distance sufficient to permit a sidewardly bent lug 326 on the three-armed lever 320 to engage in a notch 328. The lever 324 is pivoted on a stud 330. The portion of the lever 324 which extends rearwardly from the pivot stud 330 carries a stud 332 which is cooperable with the edge of the drive plate 182, the lever 324 being biased to swing counterclockwise on its pivot stud 330 by a tension spring 334.

Thus the bail 314 and pin 318 will be latched in raised position by the lever 324 when the lug 326 engages in the notch 328, and the upper end of the pin 318 will extend into the plane of an arm 336 of a lever 338 (Figs. 61 and 62), the other arm 340 of this lever having a stud 342 riveted thereto, this stud extending downwardly into a notch 344 formed in the square shaft 258.

Thus during each cycle of operation, the roller stud 284, through the linkage described, swings the bell crank 296 counterclockwise (Fig. 59) and, provided the cam 17 has previously raised the bail 314 and pin 318, the square shaft 258 will be moved to the left (Fig. 14), the springs 298 being sufficiently stronger than the combined forces applied by the springs 264, 278, and 312, that the springs 298 will not yield until the shaft 258 and the parts associated therewith are stopped by means presently to be described.

The three-armed lever 320 is unlatched near the end of the cycle by engagement of the stud 332 with the rising portion of the cam edge of the drive plate 182.

*Dividend stop frame positioning means*

Figure 4:
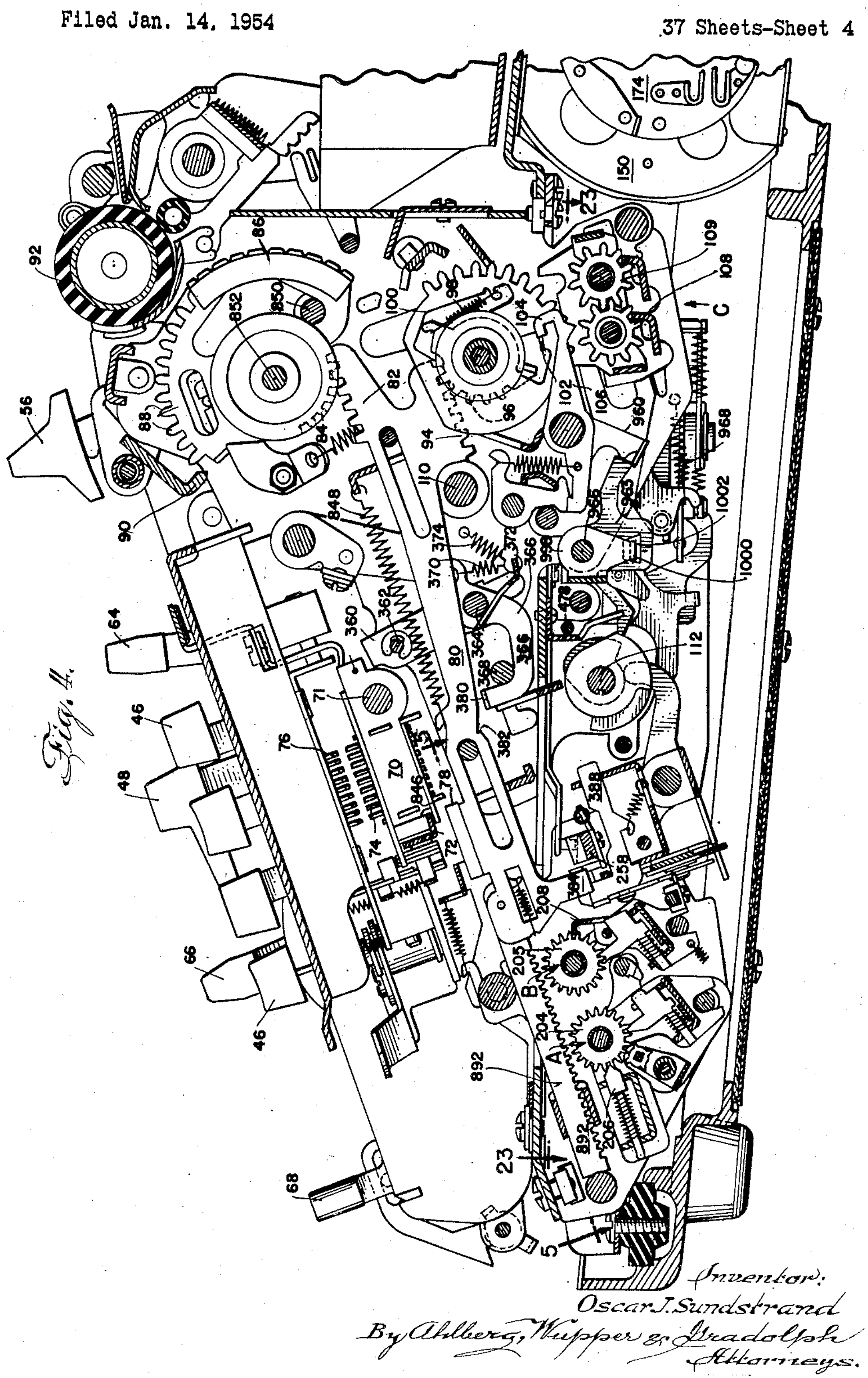
Fig. 4 is a longitudinal sectional view, showing the keyboard, pin carriage, actuating racks, calculating registers, accumulator, and the printing mechanism.

As is customary, means are provided to cause all of the actuators 80 to the left of any significant digit of the amount entered to be arrested in zero position. This means is shown in Fig. 4 as comprising two bail arms 360 pivoted on a rod 362 and carrying a bail rod 364. A plurality of zero eliminating levers 366 are pivoted on the rod 364 and have their forward ends engaging a rod 368, being held in engagement therewith by springs 370. A comb 372 is suitably secured to the bail arms 360 and is biased to swing counterclockwise by springs 374.

During the early portion of the cycle of the machine, cams 376 (Fig. 48) on the main shaft 110 engage rollers 378 to swing bail 360, 364 clockwise, permitting sloping sidewardly bent lugs 380 at the forward ends of the zero eliminating arms 366 to engage in notches 382 formed in the actuators 80. The lugs 380 overlie each other, that is, the higher denominational lugs 380 overlie the corresponding lug of the next lower denominational order, so that the highest significant figure in the amount entered by the numeral keys 46 will cause its actuator 80 and all actuators to the right thereof to be free to move rearwardly, whereas those to the left of the highest order of the first significant digit will be restrained by the engagement of the lugs 380 in notches 382 of such higher order actuators 80.

Figure 13:
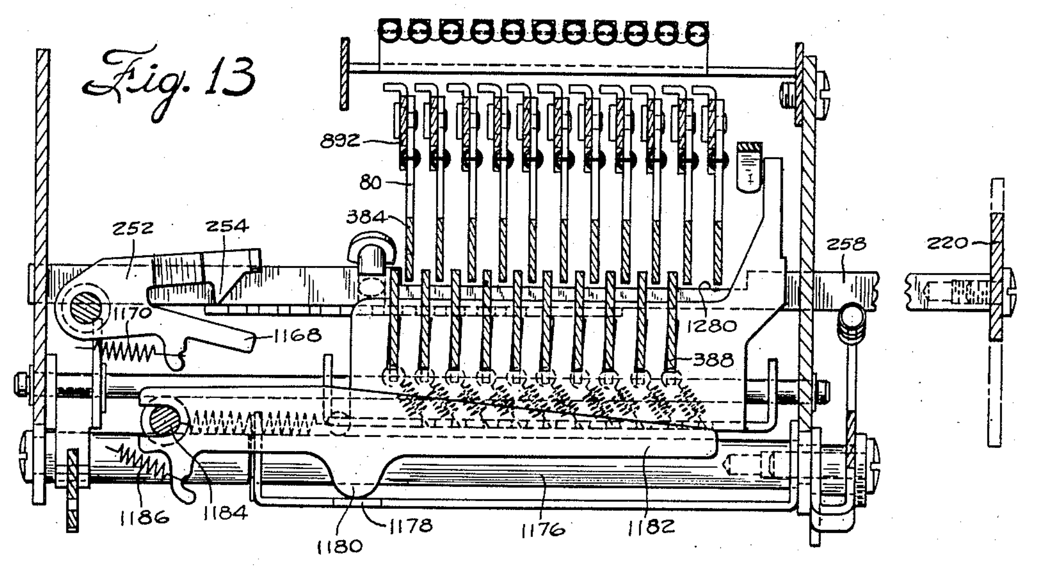
Fig. 13 is a cross sectional view, taken on the line 13—13 of Fig. 8, showing the division escapement and indexing mechanism.

Each of the actuators 80 has a downwardly extending lug 384 (Figs. 4 and 19) which normally lies to the right of the upwardly extending portion 386 of a dividend stop 388. The dividend stops 388 are mounted in suitable slots formed in a U-shaped frame 390 and are biased to move rearwardly by suitably anchored coil springs 392 which extend at a slight angle relative to the stops so as to hold them against the sides of the slots in which they slide, as best shown in Figs. 13 and 20.

Figure 20:
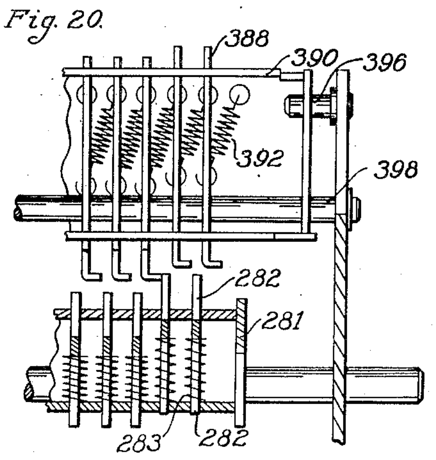
Fig. 20 is a fragmentary sectional plan view, taken on the line 20—20 of Fig. 19.
Figures 48, 49, 50:
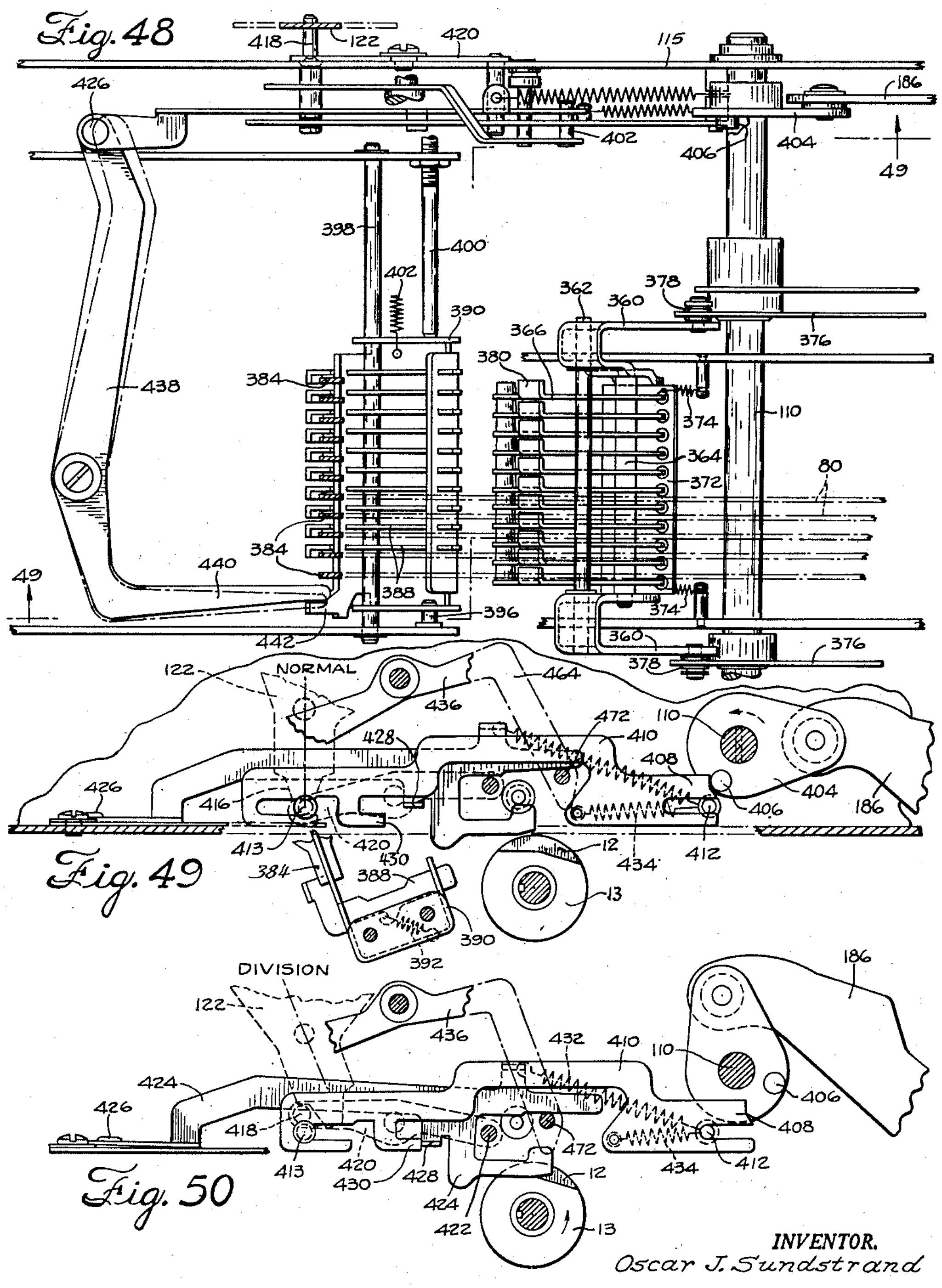
Fig. 48 is a top plan view, taken on the line 48—48 of Fig. 9, showing the index stop control mechanism, index stops, and index stop bracket.
Fig. 49 is an elevational view, taken on the line 49—49 of Fig. 48, showing the index stop control mechanism in normal position.
Fig. 50 is an elevational view of the index stop control mechanism in operative position, at the commencement of a dividing operation.

As shown in Figs. 20 and 48, the end member of the frame 390 is slidable on a short pin 396 and upon a rod 398. The frame 390 is biased to move to the left against an adjustable stop 400 by a suitably anchored tension spring 402.

As shown in Figs. 4, 48, and 49, the depending lugs 384 of the actuators normally lie to the right of their associated dividend stops 388, and it is necessary to move the frame to the right to bring the dividend stops 388 into alignment with the depending lugs 384 after the actuators 80 have been moved rearwardly. This movement of the frame 390 is accomplished by the mechanism shown in Figs. 48, 49, and 50. An arm 404, the free end of which is connected to the driving link 186, is secured to the main shaft 110 and carries a stud 406 which, as the main shaft aproaches the end of its return stroke (Fig. 49), engages the end 408 of a slide 410 which is guided by a pair of studs 412, 413 suitably secured in the frame plate 115.

When the stem 122 of the selector key 66 is swung to division position, that is, from the position in which the stem 122 is shown in dotted lines in Fig. 49, to the position in which it is shown in dotted lines in Fig. 50, the lower end projection 416, which normally engages a stud 418 (Fig. 48) on a lever 420 is disengaged and the lever 420 is permitted to swing clockwise through a small angle to permit pin 422 to move downwardly, thereby permitting arm 424 to swing downwardly, this arm being pivoted loosely on a shouldered rivet 426, and moves from the position shown in Fig. 49 to the position in which it is shown in Fig. 50, thereby allowing a sidewardly bent lug 428 on the arm 424 to drop in position in front of a projection 430 on the slide 410, thus holding the latter in the position shown in Fig. 50. Upon initial depression of a numeral key, as will appear hereinafter, a member 436 swings clockwise, lowering the stud 472 thereon and permitting spring 432 to swing the arm 424 clockwise from the position in which it is shown in Fig. 49 to the position in which it is shown in Fig. 50. The slide 410 is biased to move rearwardly by a tension spring 434.

In order that the arm 424 may swing downwardly, as described, it is necessary that a member 436 swing clockwise (Fig. 49). As will hereinafter appear, the member 436 is swung clockwise whenever an amount is entered into the keyboard, and whenever a total entered in the C accumulator is to be divided.

As the main shaft 110 starts moving counterclockwise, the spring 434 pulls the slide 410 to the right from the position shown in Fig. 49 to the position shown in Fig. 50. By virtue of the fact that the lug 430 is in engagement with the lug 428, the arm 424 will be moved to the right and pivot a bell crank 438 (Fig. 48) clockwise, and due to the fact that the end of the arm 440 of the bell crank is in engagement with an upwardly and forwardly extending projection 442 on the forward and right-hand end of the frame member 390, will move the frame a short distance to the right to bring the dividend stops 388 in alignment with the downward projections 384 on the actuators 80.

It was stated above that the member 436 is swung clockwise whenever an amount or a total is to be divided, and the mechanism for accomplishing this will now be described. Whenever an amount is entered into the machine, the pin carriage 70 (Figs. 51 to 55) is moved at least one step to the left. One arm 444 of bell crank 445, pivoted on a stud 446, is swung counterclockwise by virtue of its connection to the pin carriage by a link 448. The other arm 450 of the bell crank 445 is at a higher elevation than the arm 444, but is secured to the latter by a bushing 451. A member 452 is secured to the arm 450 and has a depending bracket 454, which has a further depending lug 456 at its lower extremity. A swinging pawl 458, having sidewardly extending lug 459, is pivoted on the depending bracket 454 and urged to swing clockwise (Fig. 53) by a spring 460.

Figures 51, 52, 53, 54, 55:
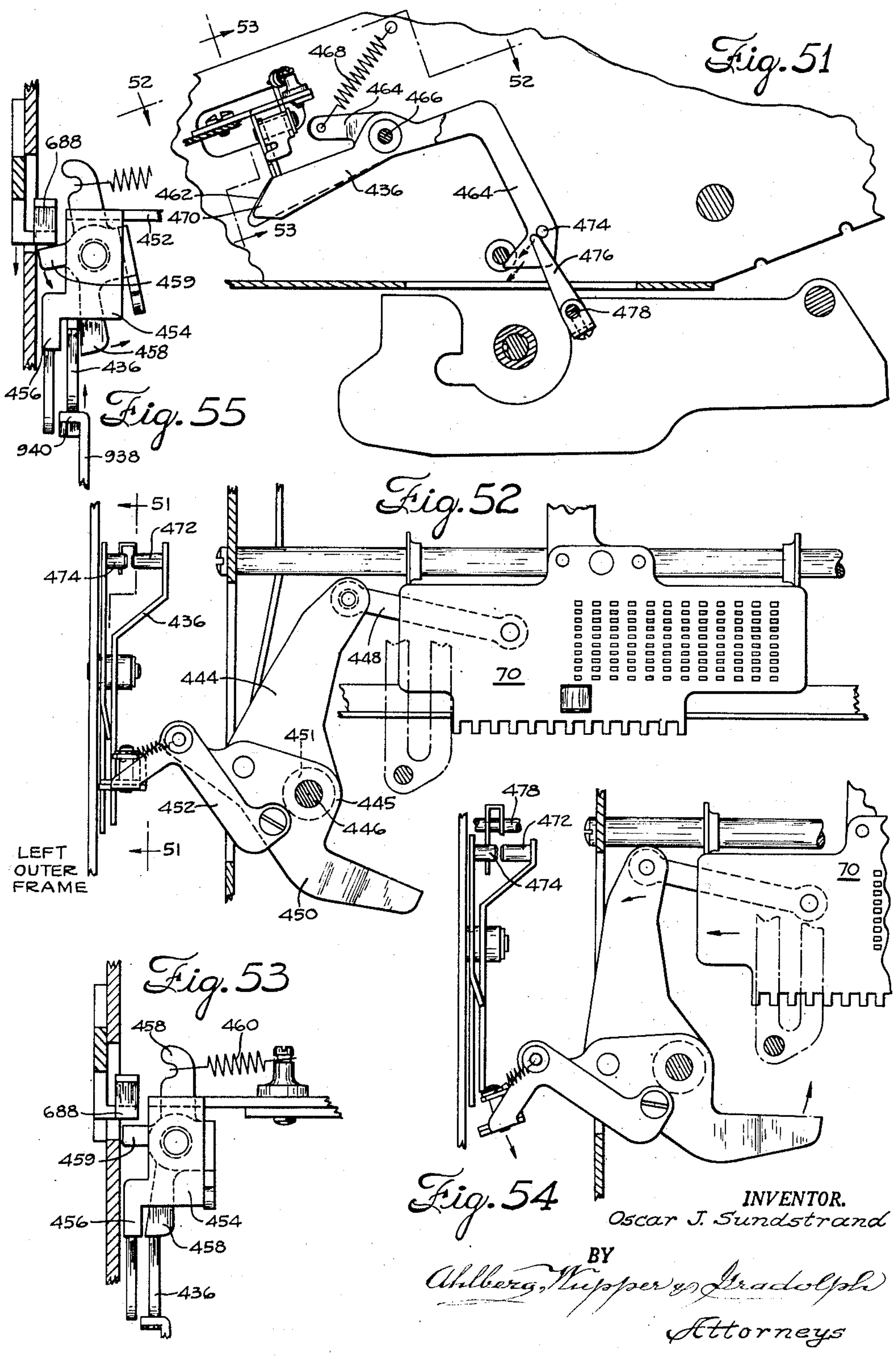
Fig. 51 is an elevational view of the automatic total mechanism, showing automatic total drive link, pivot arm, and pivot arm control.
Fig. 52 is a plan view of the automatic total mechanism as taken on the line 52—52 of Fig. 51, and showing its connection with the stop pin carriage.
Fig. 53 is a front elevational view of the pivot arm control, taken on the line 53—53 of Fig. 51.
Fig. 54 is a view similar to Fig. 52, with the parts shown in operative position.
Fig. 55 is a view similar to Fig. 53, with the parts shown in operative position.

The parts are normally in the position shown in Figs. 51 and 53, so that when the bell crank 445 is swung counterclockwise (Fig. 52) due to the leftward movement of the pin carriage 70, the depending lug 456 rides downwardly on the sloping forward edge 462 of a bell crank 464 (Fig. 51) pivoted on a stud 466, and urged to swing clockwise by a spring 468. At the same time the lower end of pawl 458 rides downwardly on the forward edge 470 of the member 436, thereby permitting the latter to swing clockwise a short distance sufficient to lower a stud 472 (Figs. 48, 50 and 52).

The depending arm of the bell crank 464 carries a stud 474 which extends behind an arm 476 secured to a shaft 478, and when the bell crank swings clockwise, rotates the shaft 478 counterclockwise to disable the total-taking mechanism of the machine, as will be hereinafter described with reference to Fig. 79.

*Manual and automatic total-taking mechanism*

Figures 80, 81, 83:
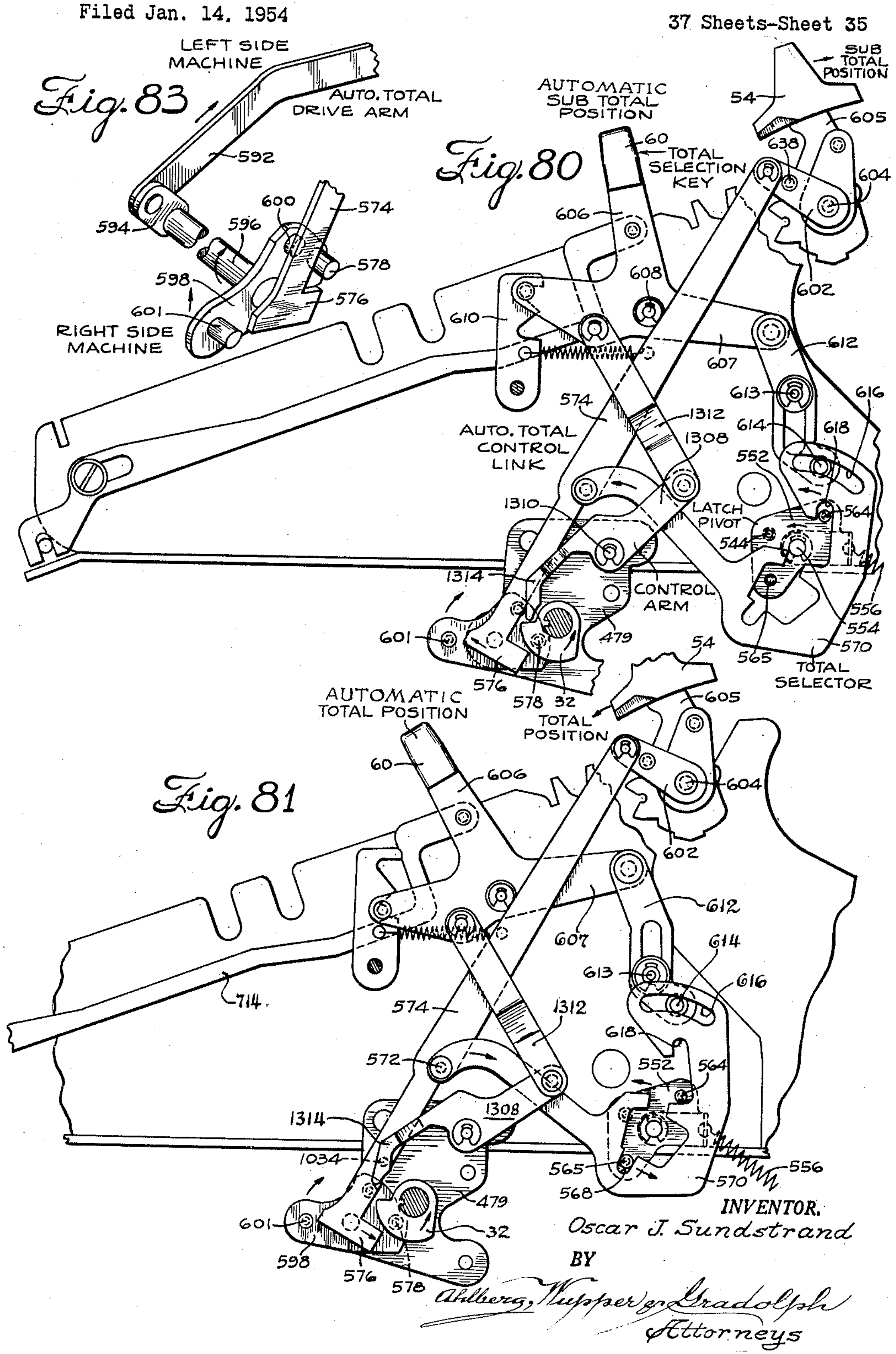
Fig. 80 is an elevational view, taken on the line 80—80 of Fig. 75, showing the automatic total and subtotal mechanism in subtotal taking position.
Fig. 81 is a view similar to Fig. 80, with the mechanism in total taking position.
Fig. 83 is a perspective view of the automatic total drive link and automatic total control plate.

The machine is designed to take a total or a subtotal automatically, merely by holding the motor control bar 50 depressed after the completion of the last adding or other operating cycle of the machine. The machine will automatically take a subtotal if the key 60 is swung to the rearward position (Fig. 80) and will automatically take a total if this key 60 is in its forward position (Fig. 81). In order to render the understanding of the automatic taking of a subtotal and a total more clear, the means by which manual subtotals and totals are taken will first be described.

The motor bar 50 has a depending stem 480 (Fig. 76) which is suitably guided for substantially vertical movement by studs 482, and is urged upwardly by a tension spring 484. Similarly, the subtract key 52 has a key stem 486 which is guided by stud 488 and two of the studs 482. An interlock member 490 is pivoted on the lowermost stud 482 and has sloping surfaces 492 at its upper end for cooperation with stud 494 on the total key stem 480, and a similar stud 495 on the subtract key stem 486, so that both keys 50 and 52 cannot be depressed at the same time.

The key stems 480 and 486 have ears 496 which overlie a sidewardly projecting stud 498 formed on a lever 500. The lever 500 is pivoted on a stud 502 and at its rearward end has a stud 504 which rides in an open end slot 506 formed in the end of the lever 508. Thus, when either of the keys 50 or 52 is depressed, the lever 500 swings counterclockwise and the lever 508 swings clockwise. The rearward arm of the lever 508 overlies a stud 510 on a switch operating and one revolution clutch releasing link 512. The lower end of this link has an insulating disc 514 eccentrically secured thereto for purposes of adjustment. The link 512 is guided for substantially vertical movement by studs 516 and a stud 518 secured to the end of an arm 520. A spring 522 permits lost motion between the arm 520 and the link 512. The arm 520 is secured to the end of a transverse shaft 523 by a screw 524.

Figures 44, 45:
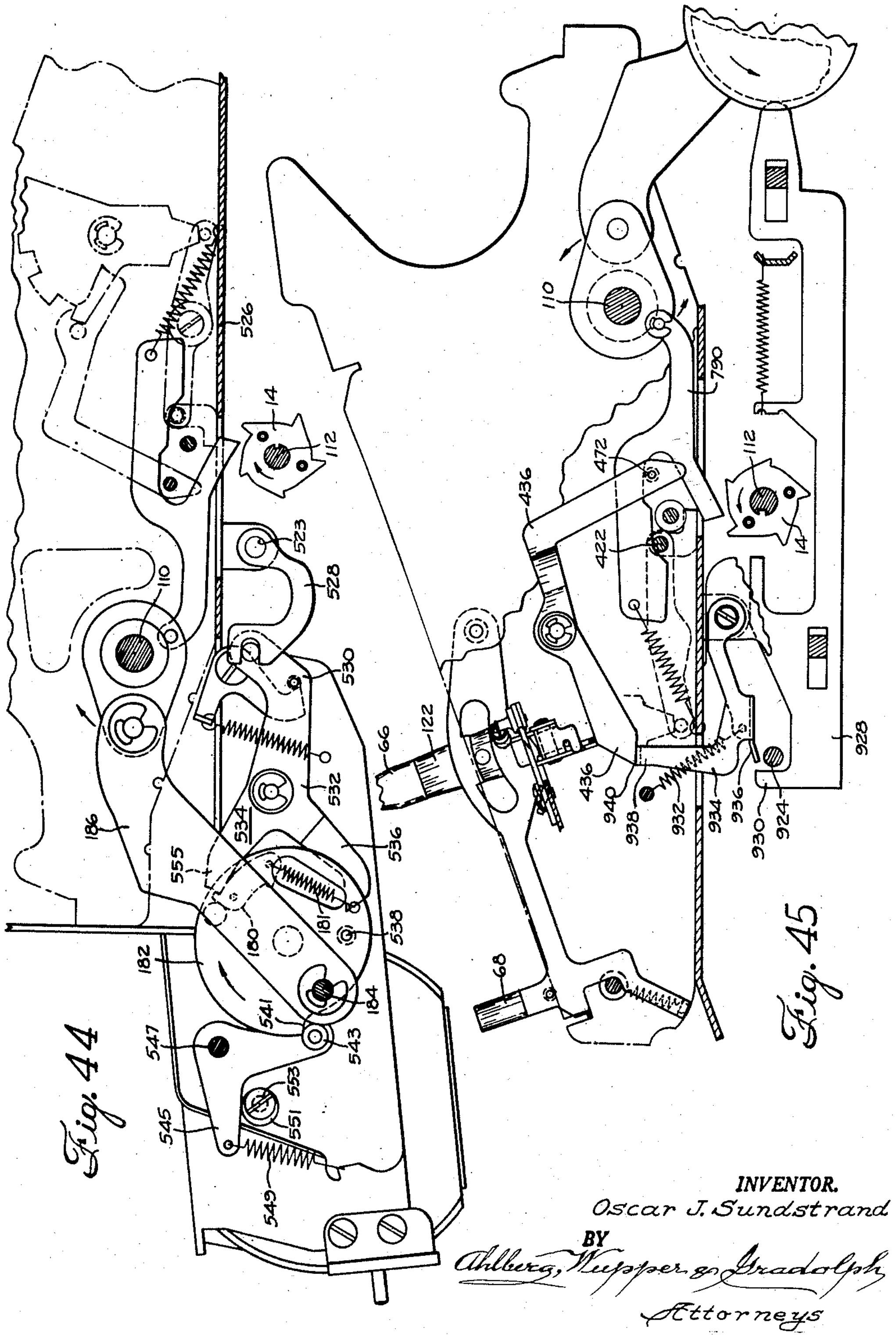
Fig. 44 is a sectional view, taken on the line 44—44 of Fig. 23, showing the drive plate, one revolution clutch mechanism, cam shaft feed ratchet, and the cam shaft feed pawl.
Fig. 45 is a sectional view, taken on the line 45—45 of Fig. 23, showing the calculating cam shaft feed mechanism, feed pawl control mechanism, and total transfer key.

This shaft 523 is suitably journaled beneath the horizontal plate 526 and, as shown in Fig. 44, has an arm 528 riveted thereto. This arm has a pin and slot connection with an arm 530 of a three-armed trip lever 532. One arm is normally in engagement with the pawl 180 so that when the trip lever 532 is moved clockwise, the pawl 80 is permitted to engage with the driving ratchet wheel 178, and if the key 50 or 52 is held depressed for more than one cycle, the third arm 536 of the trip lever 532 will be engaged by a stud 538 and momentarily disengage the clutch.

The clutch disc 182, as shown in Fig. 44, has a cam edge surface including a drop portion 541, which cooperates with a roller 543 carried by a bell crank 545 pivoted on a stud 547, the roller 543 being urged against the edge of the cam 182 by a tension spring 549. Such counterclockwise movement of the lever 545 is limited by an adjustable eccentric collar 551 secured in adjusted position by a screw 553. Thus, upon the completion of a cycle, the roller 543 being in engagement with the portion 541 of the edge of the cam, applies a force in a direction tending to rotate the clutch plate 182 clockwise (or to prevent retrograde movement of the plate 182), but this force is not sufficient to cause the tooth of the pawl 180 to bindingly engage the tooth 555 of the clutch tripping lever 532, thus greatly reducing the force required to move the tripping lever to disengaging position. The spring 549 may be relatively strong so as to insure against retrograde or clockwise movement of the disc 182. However force actually applied by the spring 549 to the disc 182 is, in essence, zero under static conditions so that the frictional binding force between the pawl 180 and the tooth 555 of the tripping lever 532 is determined by the strength of the spring 181, which may be a relatively very weak spring.

Referring again to Fig. 76, when the manual total and subtotal taking button 54 is swung either forwardly or rearwardly from its normal central position, an arm 540 is moved counterclockwise by suitable well known mechanism, to depress the link 512 and cause engagement of the clutch and to effect starting of the motor, as previously described.

Referring to Figs. 51 and 52, it will be recalled that when the pin carriage 70 moves to the right to its home position, the bell crank 464 moves counterclockwise and the arm 476 and shaft 478 move clockwise. This shaft 478 is shown in Fig. 78 and the manner in which such clockwise movement of the shaft 478 is effective will now be described.

Figures 78, 79:
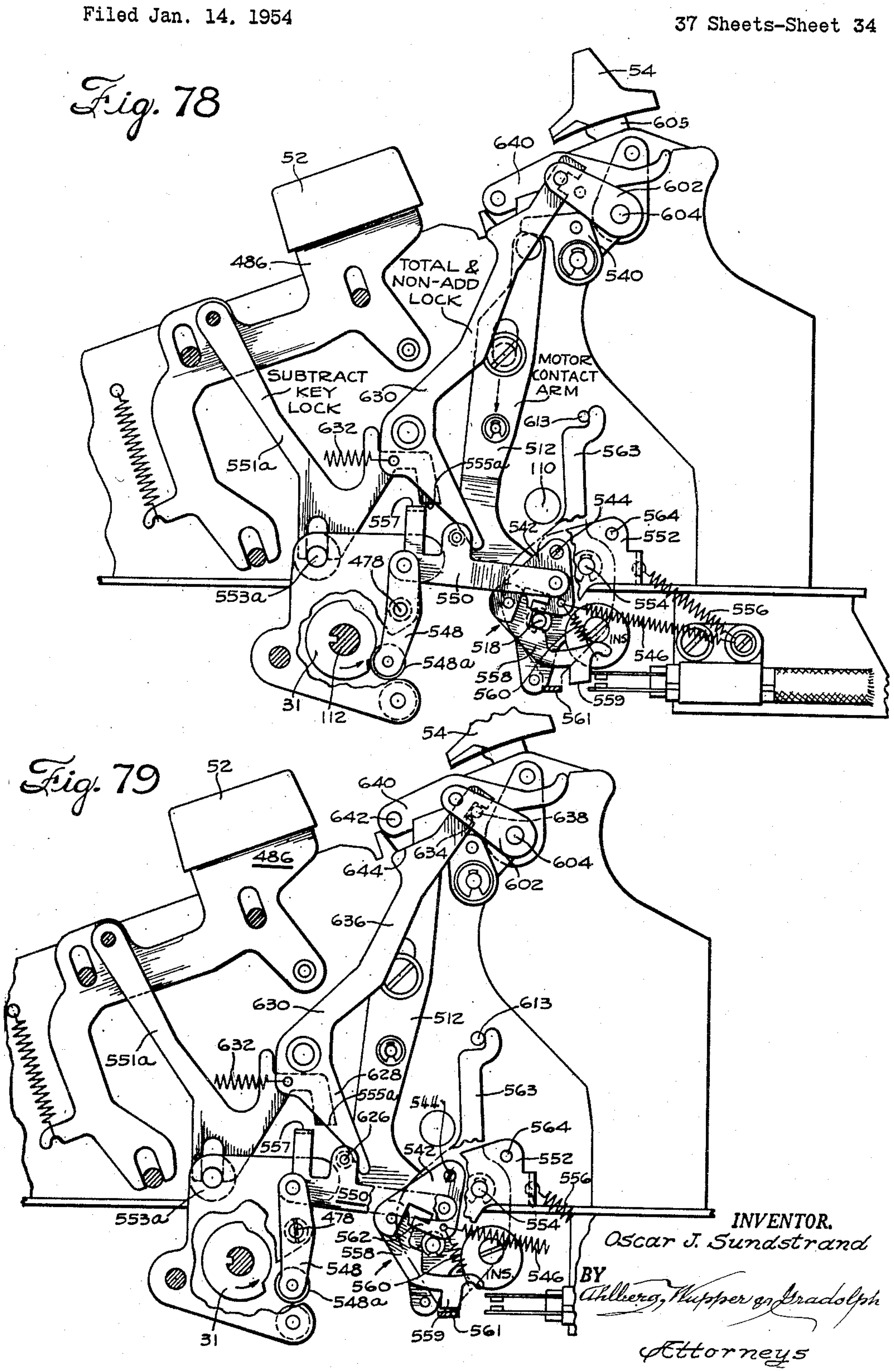
Fig. 78 is an elevational view on the right side of the machine, taken on the line 78—78 of Fig. 75, showing the automatic total and subtotal cam pivot arm, automatic total cam, motor contact latch mechanism, and latch lock.
Fig. 79 is a view similar to Fig. 78, showing the mechanism in position after an amount has been entered into the keyboard.
Figures 84, 85, 86, 87:
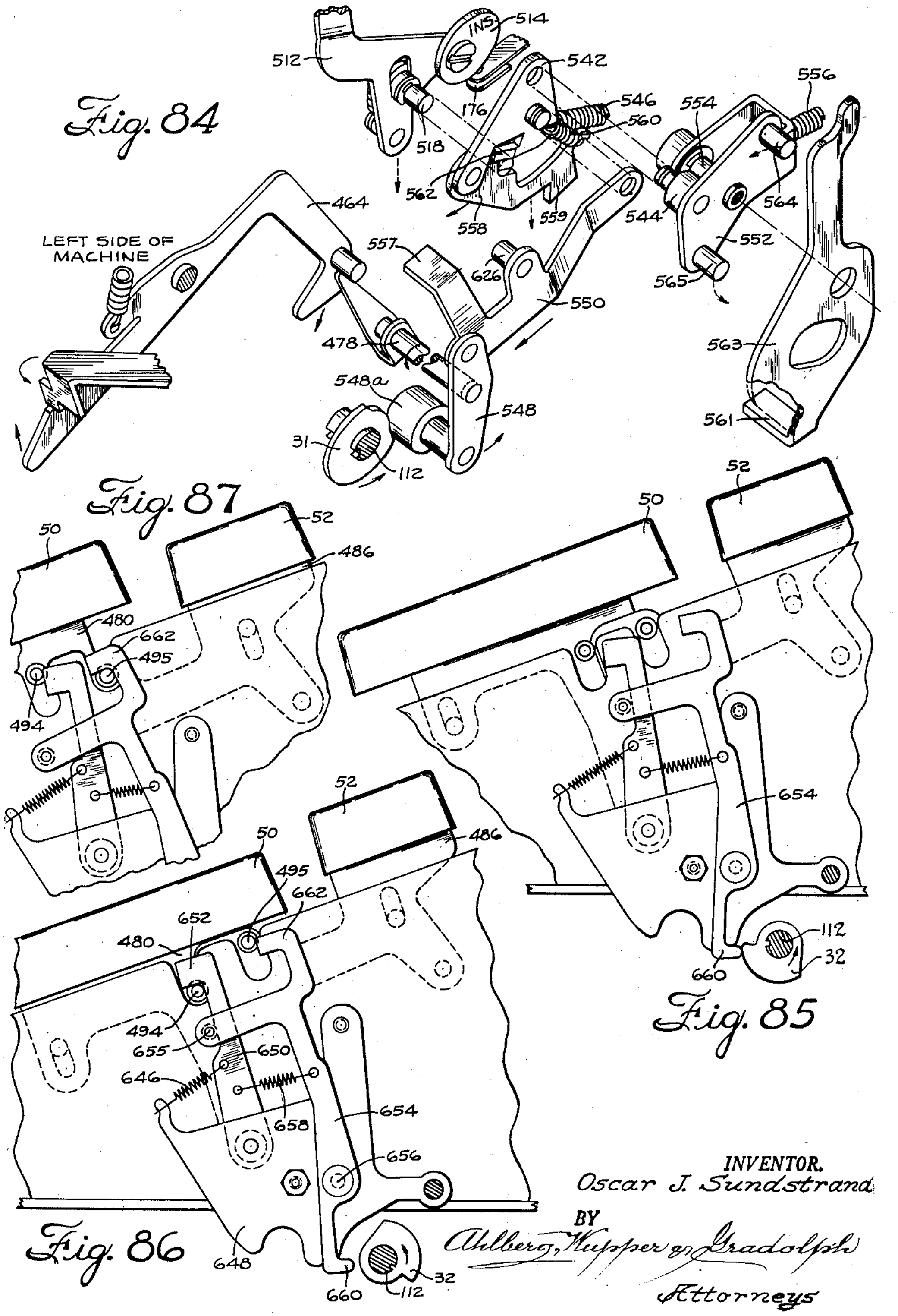
Fig. 84 is a perspective view of the automatic total control mechanism.
Fig. 85 is an elevational view of the subtract key latch, the motor bar latch, and the subtract key latch cam, shown in normal position.
Fig. 86 is a view similar to Fig. 85, the motor bar being locked.
Fig. 87 is a fragmentary view similar to Fig. 85, with the subtract key locked.

Referring to Figs. 78, 79, and 84, a generally triangular arm 542 is pivoted on a stud 544 and is biased to move counterclockwise by a spring 546. The arm 542 is connected to a lever 548 by a link 550. The lever 548 is secured to the shaft 478 so that when the bell crank 464 swings counterclockwise, the lever 548 will move from the position in which it is shown in Fig. 79 to that in which it is shown in Fig. 78.

It will be observed that the lever 548 carries a follower roller 548*a* which lies adjacent cam 31 on the cam shaft 112. If this shaft is rotated to a position in which the machine should not take a total or subtotal, the roller will be on the high surface of the cam 31 and the shaft 478 will not be permitted to rotate clockwise, and therefore the machine will not be in condition for taking a total or subtotal.

It is, of course, undesirable to depress the subtraction key 52 when there is no amount set up in the pin carriage 70. The stem 486 for the subtract bar 52 is therefore connected to a key lock arm 551*a* (Fig. 78)

which is guided on a fixed stud 553*a* and has a rearward projection 555*a* which may abut against a sidewardly projecting ear 557 formed on the link 550, and thus prevents depression of the subtract bar 52 when the mechanism shown in Fig. 78 is in position to effect a total or subtotal operation.

The stud 544 is not fixed, but is secured to a latch pivot plate 552 which may pivot about a fixed stud 554 (Fig. 84). The latch pivot plate is biased to move clockwise by a tension spring 556.

A latch 558 is pivoted to the generally triangular-shaped plate 542. A spring 560 urges the latch 558 counterclockwise, such movement being limited by engagement of the latch with a sidewardly bent part 562 of the generally triangular plate 542. This permits the triangular plate and latch to swing counterclockwise under the influence of the spring 546, so that pin 518 may be held in the relative position of the parts shown in Fig. 78.

As shown in Figs. 78 and 84, the latch 558 has a depending lug 559 which is adapted to cooperate with an inwardly bent lug 561 formed on a locking arm 563. This is shown in Fig. 79, wherein the lug 559 is directly above the inwardly bent lug 561, preventing the automatic total control link 550 accidentally moving into total-taking position.

Figures 76, 77:
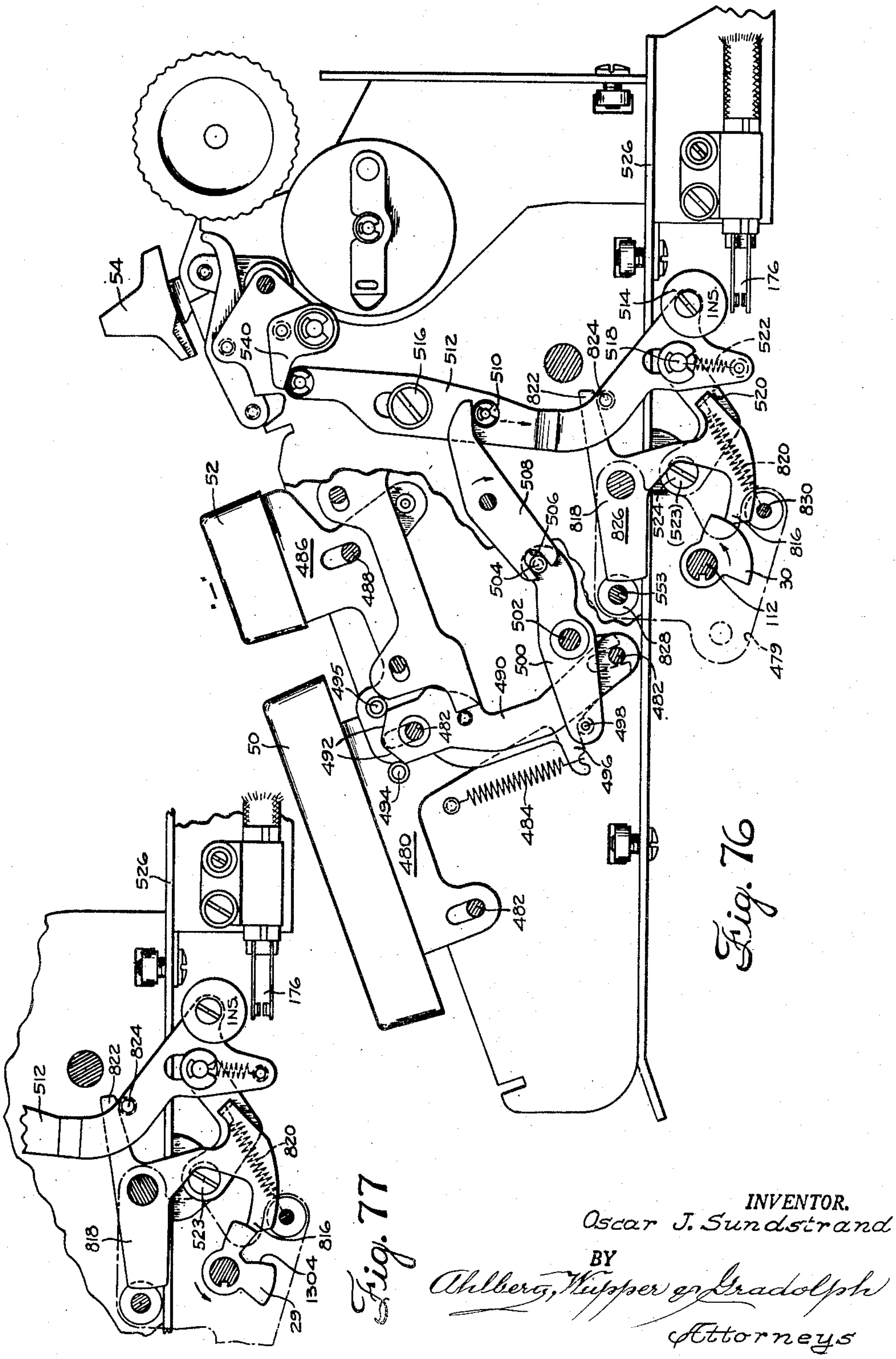
Fig. 76 is an elevational view, taken on the line 76—76 of Fig. 75, showing the motor trip mechanism and motor trip cam, set for division.
Fig. 77 is a fragmentary elevational view of the motor trip cam used during multiplying operations.

As previously described with particular reference to Fig. 76, when the motor bar 50 is depressed it operates through a linkage to depress the switch operating link 512, allowing pin 518 to move downwardly. Such downward movement causes the latch pivot plate 552 to swing counterclockwise. This plate 552 has a pair of studs 564 and 565 secured thereto, and when this counterclockwise movement occurs the stud 565 (Fig. 81) will be in a notch 568 formed in a total selector arm 570, which is pivotally secured to a stud 572 on a total control link 574. It will be seen that the counterclockwise movement of latch pivot plate 552 will swing link 574 rearwardly and bring a rearwardly projecting lug 576 at the lower end thereof beneath a pin 578.

Upon engagement of the one revolution clutch mechanisms, the cams 190 to 195 are rotated counterclockwise (as viewed from the right). The cam 194 of this group (Fig. 89) has a follower arm 580 pivoted on a stud 582 and held in engagement with the cam by a spring 584. As the cam 194 turns counterclockwise, it cams the follower arm 580 counterclockwise. A lever 586 is pivoted on the stud 582 and held against stop stud 588 by a tensioned spring 590. The spring 590 normally is inactive, but is inserted merely for the purpose of safety in the event there should be some temporary lockup of the machine.

The lever 586 has an automatic total drive link 592 pivotally secured thereto, the other end of this link being pivoted to an arm 594 secured to the end of a shaft 596. This shaft carries a plate 598 which has the stud 578 and two additional studs 600 and 601 secured thereto. It will be recalled that when the motor bar is depressed, the rearward projection 576 (Fig. 81) is moved beneath the stud 578 as shown in Fig. 83. Thus, when the machine starts a cycle the cam 194 (Fig. 89) through the linkage described will pull the automatic total control link 574 downwardly. The upper end of link 574 is pivoted to an arm 602 which is secured to a shaft 604 to which the key stem 605 of the total and subtotal key 54 is operatively connected. The key 54 will therefore be moved from its normal position counterclockwise into total taking position. The machine will therefore go through a total-taking cycle.

The means for engaging and disengaging the accumulator C may be of any well known construction, preferably such as disclosed in the aforesaid patent to Thomas O. Mehan, No. 2,486,959.

The stem for the automatic total and subtotal key 60 is in the form of a three-armed lever 606 pivoted on a stud 608 and held in either of two positions by a detent 610. This stem is shown in its subtotal position, as seen in Fig. 80. A rearwardly extending arm 607 of the stem 606 is connected by a link 612 with the total selector arm 570, the connection being effected by a stud 614 in the lower end of the link 612, with a slot 616 formed in the arm 570. The link 612 is guided by a fixed stud 613. Thus when the automatic total-subtotal key 60 is swung from its total taking position, shown in Fig. 81, to its subtotal position shown in Fig. 80, the arm 570 is moved downwardly to bring a notch 618 into registry with the stud 564 on the latch pivot plate 552 and to cause the link 574 to swing clockwise, whereupon the lower end thereof will overlie the stud 601. Thus upon commencement of an operating cycle the stud 601 will be moved upwardly through the previously described mechanism shown in Fig. 89, and raise the automatic control link 574 and through arm 602 swing the shaft 604 and key 54 clockwise to a subtotal taking position.

INTERLOCKS

*Total and subtotal key lock*

Suitable interlocks are provided to prevent misoperation of the control keys and bars. It is, of course, necessary to prevent the taking of a total when an amount is set up in the pin carriage. It will be recalled that when the pin carriage is moved from its home position the shaft 478 is rotated counterclockwise, moving the lever 548 to the position shown in Fig. 79. The link 550 has a sidewardly projecting stud 626 against which one arm 628 of a total and nonadd lock lever 630 bears. The lever 630 is biased for clockwise movement by a spring 632 so that a notch 634 in the upper arm 636 of the lever 630 engages over a stud 638. The stud 638 is secured to arm 602, which in turn is secured to shaft 604. Shaft 604 is operated by the total-subtotal key 54. Thus when the notch 634 engages over the stud 638, operation of the total-subtotal key 54 is prevented.

*Nonadd-repeat key lock*

It is also desirable to prevent the taking of a total when the nonadd-repeat key 56 is in nonadd position. This is effected by an arm 640 which is suitably connected to the nonadd key by mechanism more clearly disclosed in the copending application of Lippert et al., Serial No. 247,491, filed September 20, 1951, now Patent No. 2,731,206, and therein shown as an arm 98 in Fig. 8.

The arm 640 (Fig. 79) is arranged to be swung counterclockwise when the key 56 is swung rearwardly for a nonadd operation, and this lever carries a stud 642 which engages a surface 644 on the arm 636 and moves the latter to the position in which it is shown in Fig. 79.

*Motor and subtract bar locks*

It is necessary to lock the motor bar 50 in depressed position while performing multiplying operations. The means for accomplishing this is shown in Figs. 85 and 86. It will be recalled that the key stem 480 for the motor bar has a stud 494 extending sidewardly therefrom. When the cam shaft 112 is set for a multiplying operation, a cam 32 thereon will have been rotated counterclockwise to the position shown in Fig. 86, and a spring 646 anchored to a fixed plate 648 pulls a locking arm 650 counterclockwise to cause a hook lug 652 at the end thereof to latch over the pin 494, thereby holding the motor bar 50 depressed. A second locking arm 654 has a stud 655 lying in front of the arm 650. The arm 654 is pivoted at 656 and is biased for counterclockwise movement by a spring 658 hooked between the two locking arms. The arm 654 has a toe 660 at the lower end thereof which normally engages the cam 32 as shown in Fig. 85, thereby holding the locking arms 650 and 654 in normal position. The arm 654, when the cam 32 is moved to the position shown in Fig. 86, will, as indicated in Fig. 87, have the lug 662 at the upper end thereof lie over the stud 495 on the subtract bar 52 when the latter is depressed in subtracting-multiplying operation. In ordinary multiplying operations, the end of the lug merely abuts the stud 495 as shown in Fig. 86. This holding down of the subtract bar is utilized when the product of two numbers is to be subtracted from another amount in the C accumulator.

*Multiply-divide key and nonadd key interlock*

The multiply-normal-divide key 66 must be in normal position if the nonadd-repeat key is to be operated. Conversely, the nonadd-repeat key must be in normal position when the key 66 is in either multiplying or dividing position. These keys are therefore interlocked by the following mechanism shown in Fig. 37.

Figures 37, 38, 39, 40:
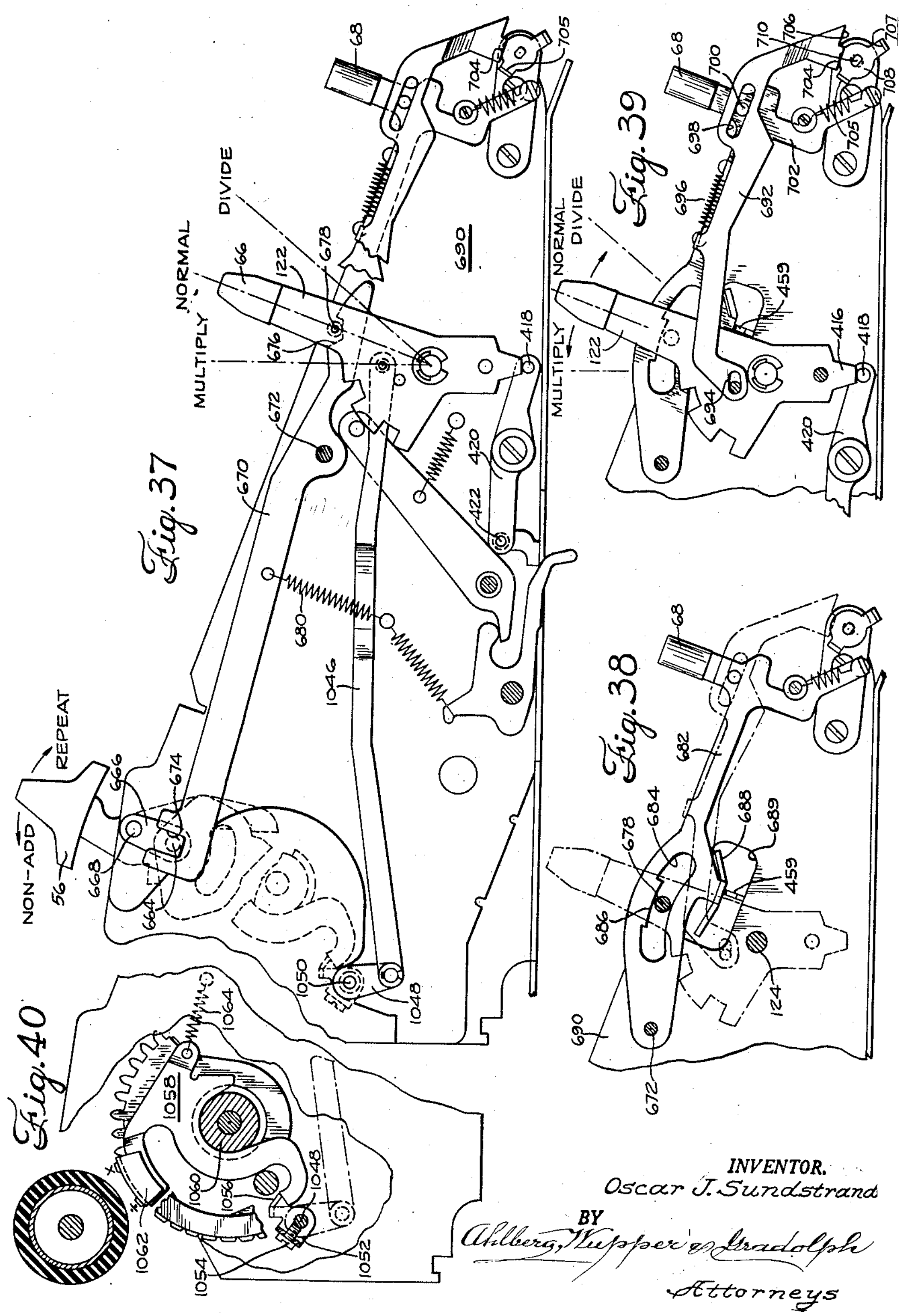
Fig. 37 is a left side view of the left outer frame, showing the function control key, nonadd key lock, and the multiplying and division signal type operating mechanism.
Fig. 38 is a side elevational view of the total transfer key and associated mechanism.
Fig. 39 is a side elevational view of the automatic total selection dog trip mechanism.
Fig. 40 is a side view of the multiplication and divisional signal type sector.

The nonadd-repeat key 56 is secured to a shaft 664 and the left-hand end of this shaft has secured thereto an upwardly extending arm 666 with a sidewardly extending stud 668 thereon. A lever 670 is pivoted on a stud 672 and at its rearward end has a notch 674 for engagement with the stud 668. In the upper edge near the forward end of the lever 670 is a notch 676 for engagement with an inwardly extending stud 678. The lever is normally urged counterclockwise to the position in which it is shown in Fig. 37 by a spring 680. It will therefore be clear that when the key 66 is swung from normal, either to multiplying or dividing position, the stud 678 will cam the forward end of lever 670 downwardly sufficiently to have the notch 674 at the rear end of this lever in position to restrain movement of the stud 668, and hence the nonadd-repeat key 56 will be locked.

On the other hand, if the key 56 is either in its nonadd or in its repeat position, the stud 668 will lie over the end portions of the lever 670 adjacent the notch 674, and, as a result, the key 66 will be locked against operation.

*Lock for push button 68*

As best shown in Fig. 38, means are provided to prevent operation of the total transfer-multiply stop push button 68. Button 68 is secured to an arm 682, which is pivoted on the stud 672. The arm 682 has an irregular arcuate slot 684, the upper edge of which has a central depending part 686, making the central portion of the slot 684 relatively narrow. This slot embraces the stud 678 on the stem 122 for key 66. It will therefore be seen that when the key 66 is in its normal position it will prevent effective movement of the button 68.

*Operation of pawl 458*

The arm 682 has a portion 688 extending inwardly through an opening 689 formed in the left side main frame plate 690. This part has forwardly and rearwardly sloping projections and is adapted to engage the lug 459 (Figs. 38 and 53) on the pawl 458 so as to move its lower end out of the path of the arm 436, to the position shown in Fig. 55.

*Interlock between push button 68 and key 60*

Means are provided to cause the automatic total-subtotal key 60 to be moved to the proper position when the button 68 is depressed.

Figures 46, 47, 82:
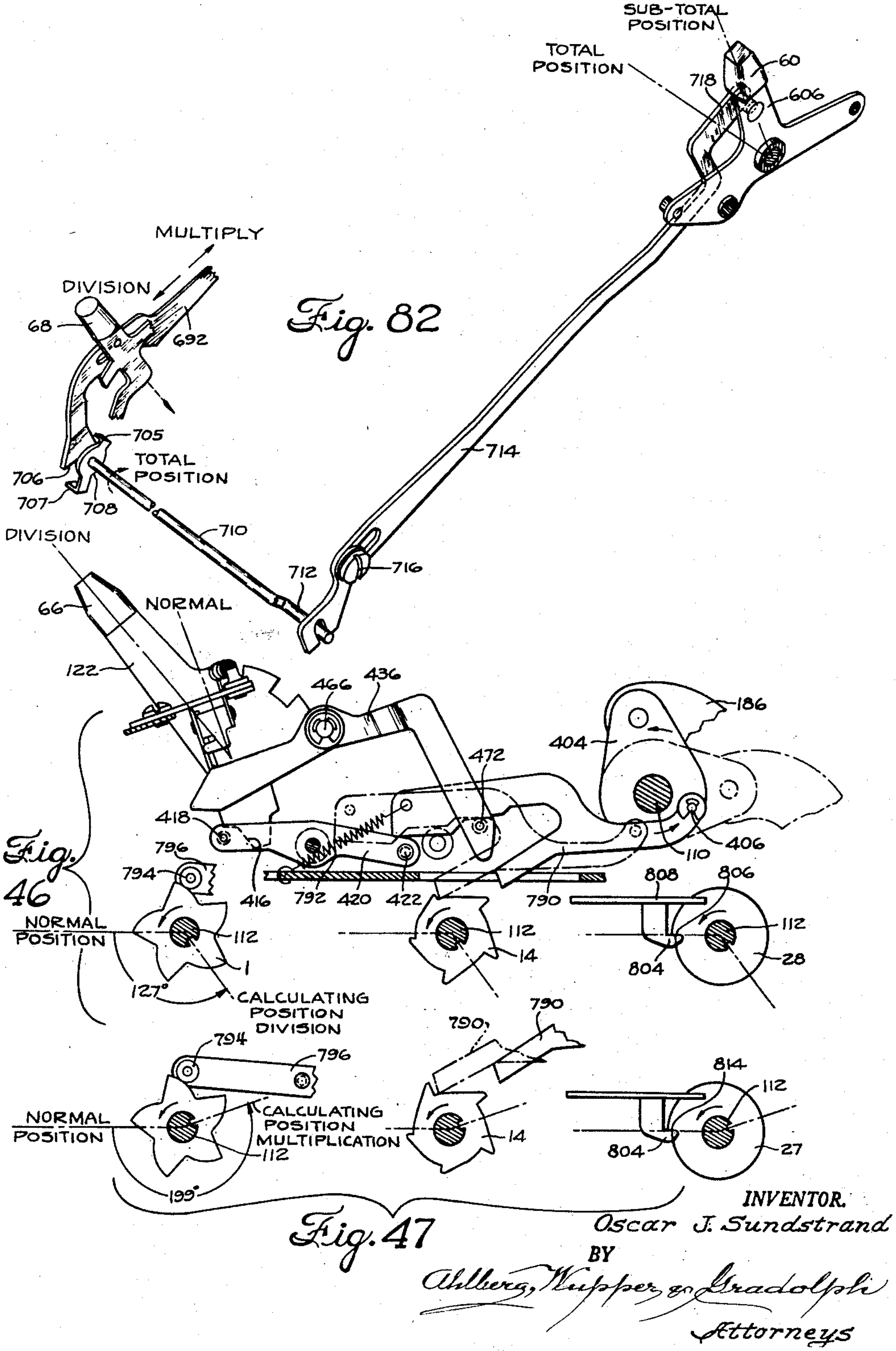
Fig. 46 is a view of the cam shaft feed mechanism during a dividing operation, showing the position of the feed ratchet, the cam shaft locator, and the division stop cam.
Fig. 47 shows the position of the cam shaft locator, feed ratchet, and multiply stop cam, in positions assumed during multiplication operation.
Fig. 82 is a perspective view of the total transfer key, the total selection key, the total selection dog, and the dog shaft.

Referring to Figs. 39 and 82, a control slide 692 has its rearward end connected to key stem 122 through a stud and slot connection 694, and is biased to move to the right by a relatively weak spring 696. The forward end of the slide 692 is provided with an elongated slot 698 through which projects a stud 700 secured to the stem 702 of the push button 68. The forward extremity of the slide 692 has edges 704 and 706 respectively, for engagement with outwardly bent lugs 705 and 707, on a lever 708. The lever 708 is secured to a rock shaft 710 which extends transversely across the front of the machine and has its right end portion 712 offset slightly to form a crank. This end portion extends through a slot formed in a link 714 which is guided on a stud 716 and has an upwardly offset rearward end portion 718 pivotally connected to the stem 606 of the automatic total-subtotal key 60.

Thus when the key 66 is shifted to multiplying position, the slide 692 will be drawn rearwardly and the edge 704 will overlie the lug 705. Under these conditions, if the button 68 is depressed, the shaft 710 will be rotated counterclockwise, as viewed in Fig. 39, and clockwise as viewed in Fig. 82, and the link 714 will therefore be pulled forwardly, causing the key 60 to move from subtotal to total position.

On the other hand, if the key 66 (Fig. 39) is in its dividing position, the edge 706 will be positioned above the lug 707 so that when the button 68 is depressed, under these conditions the shaft 710 will be rotated clockwise, as viewed in Fig. 39, or counterclockwise, as viewed in Fig. 82, and will therefore return the key 60 to subtotal position.

*Lock for key 66*

Figures 29, 30:
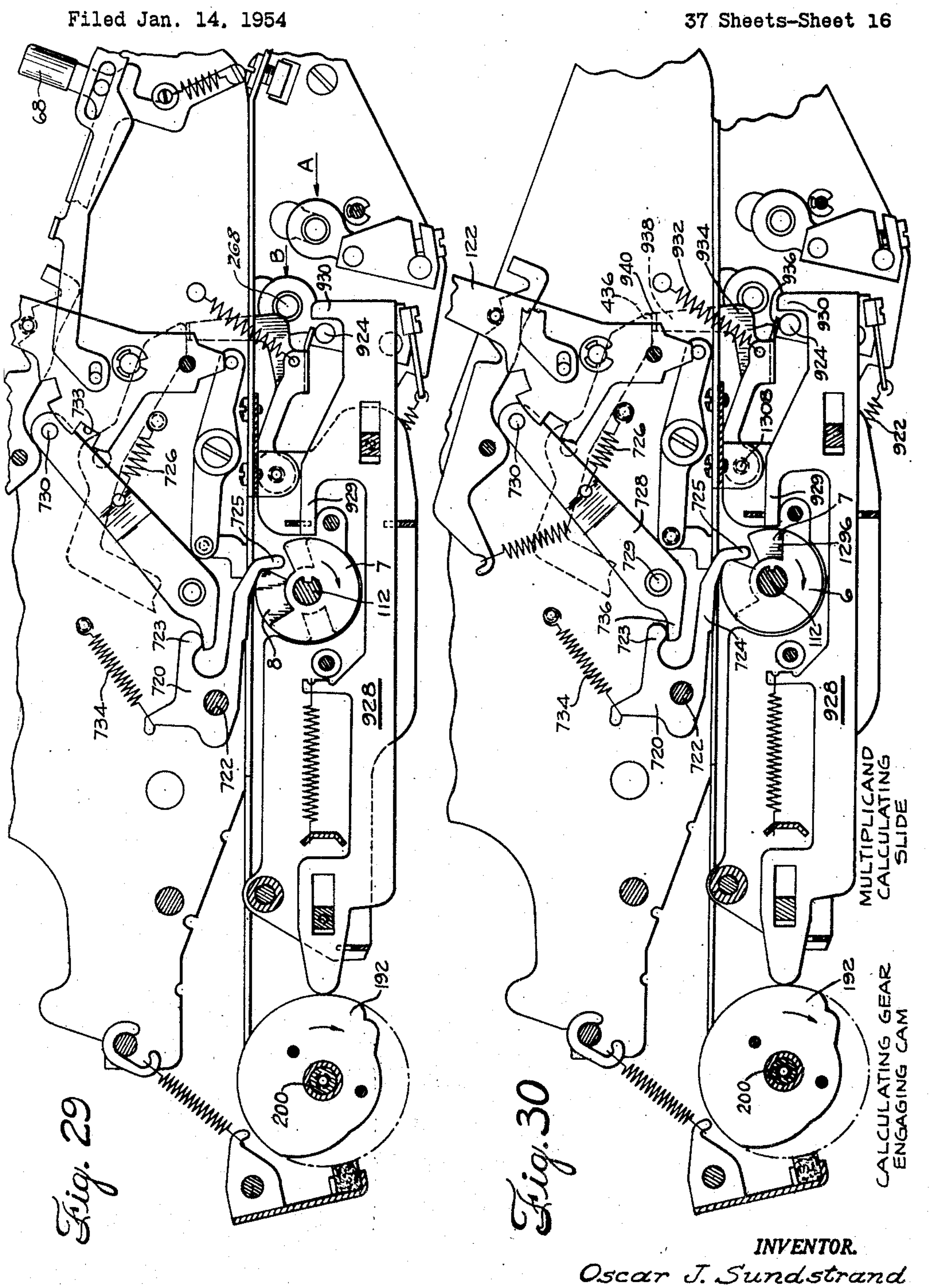
Fig. 29 is a sectional view, taken on the line 29—29 of Fig. 23, showing the divisor add cam, multiplicand slide, function control key lock mechanism, and associated parts, in dividing position.
Fig. 30 is a view similar to Fig. 29, showing the multiplicand add cam with the cam shaft in multiplying position.

Means are provided to lock the key stem 122 shortly after the machine starts the first cycle of a multiplying or dividing operation, that is, when the key 66 is in either multiply or divide position. This means is best shown in Figs. 30 and 34, and comprises a member 720 pivoted on a stud 722. A downwardly sloping arm 724 has its toe portion 725 in alignment with cam 6 on cam shaft 112, when the key 66 is in multiply position, and in alignment with cam 8 (Fig. 29) when the key 66 is in normal or in dividing position.

Thus, during the initial portion of the cycle, with the key 66 in either multiplying or dividing position, the toe 725 of the arm 724 is swung upwardly and a relatively weak spring 726 swings a lock arm 728 clockwise on its pivot stud 729 to cause a stud 730 to lock into a notch 732 (Fig. 34) if the key 66 is set for multiplying, or into the notch 733 if the key is set for a dividing operation. When the operation has been completed and the cam 6 returned to the position in which it is shown in Fig. 30, a relatively strong spring 734 operating on the member 720 will cause the upper arm 723 to press against the tail 736 of the arm 728 and swing the latter counterclockwise to move the stud 730 from either the notch 732 or the notch 733.

*Numeral key lock during multiplying and dividing operations*

Figures 68, 69, 70, 71, 72:
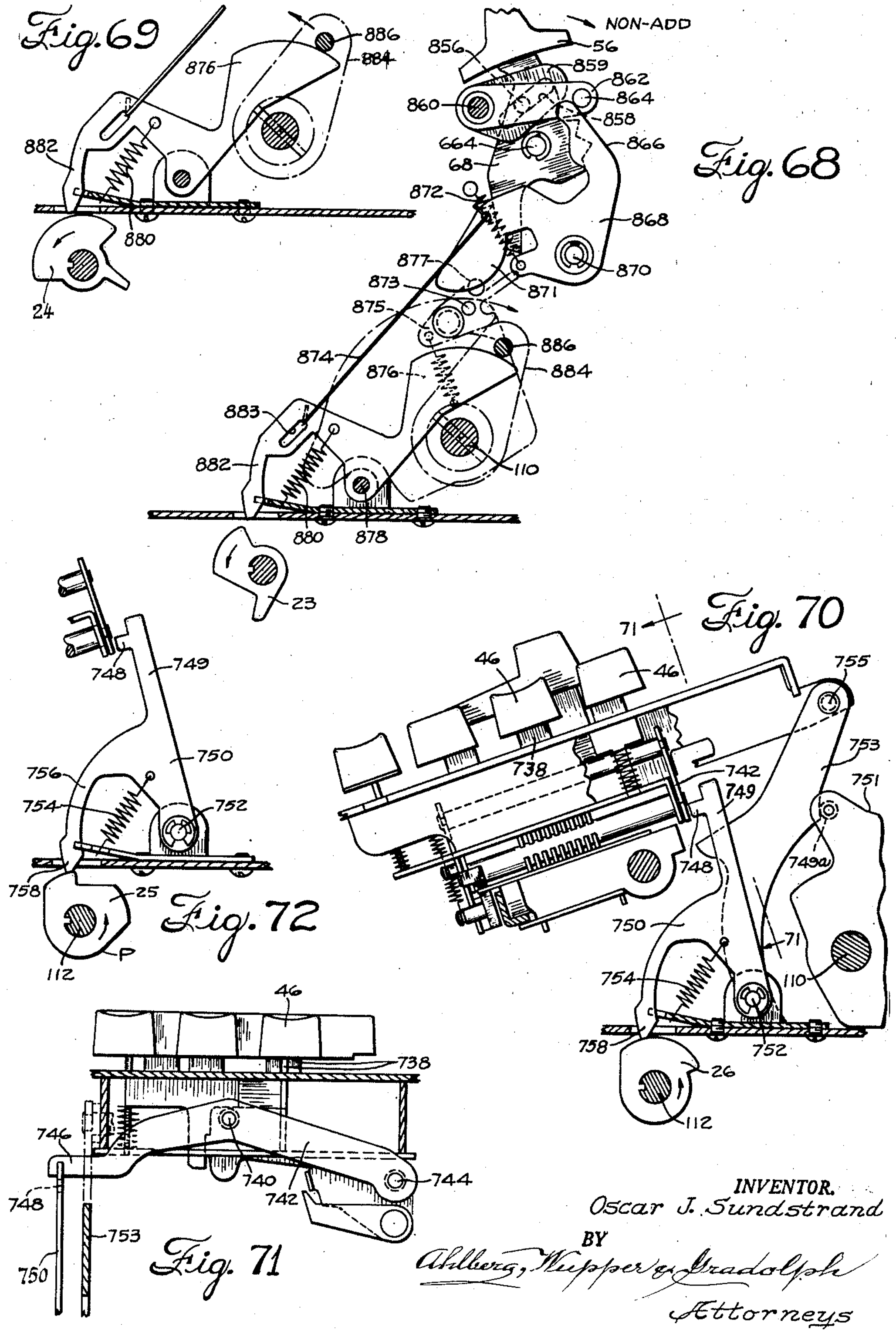
Fig. 68 is an elevational view, showing the nonadd control mechanism and nonadd cam in position for a multiplying operation.
Fig. 69 is a view similar to Fig. 68, with the nonadd cam positioned for a dividing operation.
Fig. 70 is an elevational view of the keyboard locking mechanism, with the lock cam positioned for a dividing operation.
Fig. 71 is a rear view of the keyboard and keyboard lock lever, taken on the line 71—71 of Fig. 70.
Fig. 72 is a fragmentary view similar to Fig. 70, showing the lock cam positioned for multiplication.

When the machine is performing a multiplying or dividing operation, it is not operating under the control of the stop pins in the pin carriage, and of course it would introduce error if, during this period, any of the numeral keys 46 were depressed. To lock the keys against depression, interlocking means, shown in Figs. 70, 71, and 72, are provided.

Each of the keys 46 has a stem 738 which has an offset portion overlying a bail rod 740 which is carried between a pair of bail arms 742 which are secured to a rotatable shaft 744. The free end portion 746 of one of the bail arms 742 (the one positioned at the right-hand side of the machine) is adapted to cooperate with a stop lug 748 at the upper end of the arm 749 of a lever 750 which is pivoted on a fixed stud 752 and is biased for counterclockwise movement by a spring 754. The other arm 756 of the lever 750 is generally arcuate in shape and terminates in a nose 758 which cooperates with cam 25 on the cam shaft 112 (Fig. 72) during multiplying operations, and with cam 26 during dividing operations (Fig. 70).

After the second cycle of a multiplying operation has been completed, that is, after the multiplicand and multiplier have been entered into the machine, the cam 25 will be so positioned that the nose will be approximately at the point marked "P" (Fig. 72) and the two-armed lever 750 will have swung counterclockwise a sufficient distance to cause the lug 748 to lie below the end portion 746 of the bail arm 742, thus preventing downward swinging movement of the bail arm, and hence preventing the depression of the numeral keys 46. As will hereinafter be described, the cams 25 and 26 are so shaped that the lug 748 will be in key locking position during the first cycle in multiplying by a constant, and in the second cycle when dividing by a constant, because the keyboard is unlocked in multiplication to insert a different multiplier, and it is released in dividing operation in the first cycle in order to put in a different dividend.

*Numeral key lock during add and subtract operations*

In normal operation, a roller 749a (Fig. 70) mounted on an arm 751 secured to the main shaft 110, engages the arcuate edge of a lever 753 pivoted on a stud 755 and swings the lever clockwise into engagement with the lower edge of the bail arm 742 to raise the latter and thus push upwardly any numeral keys 46 which may be inadvertently held depressed by the operator, and to prevent depression of the keys 46.

*Nonprint mechanism*

Figures 56, 57, 58:
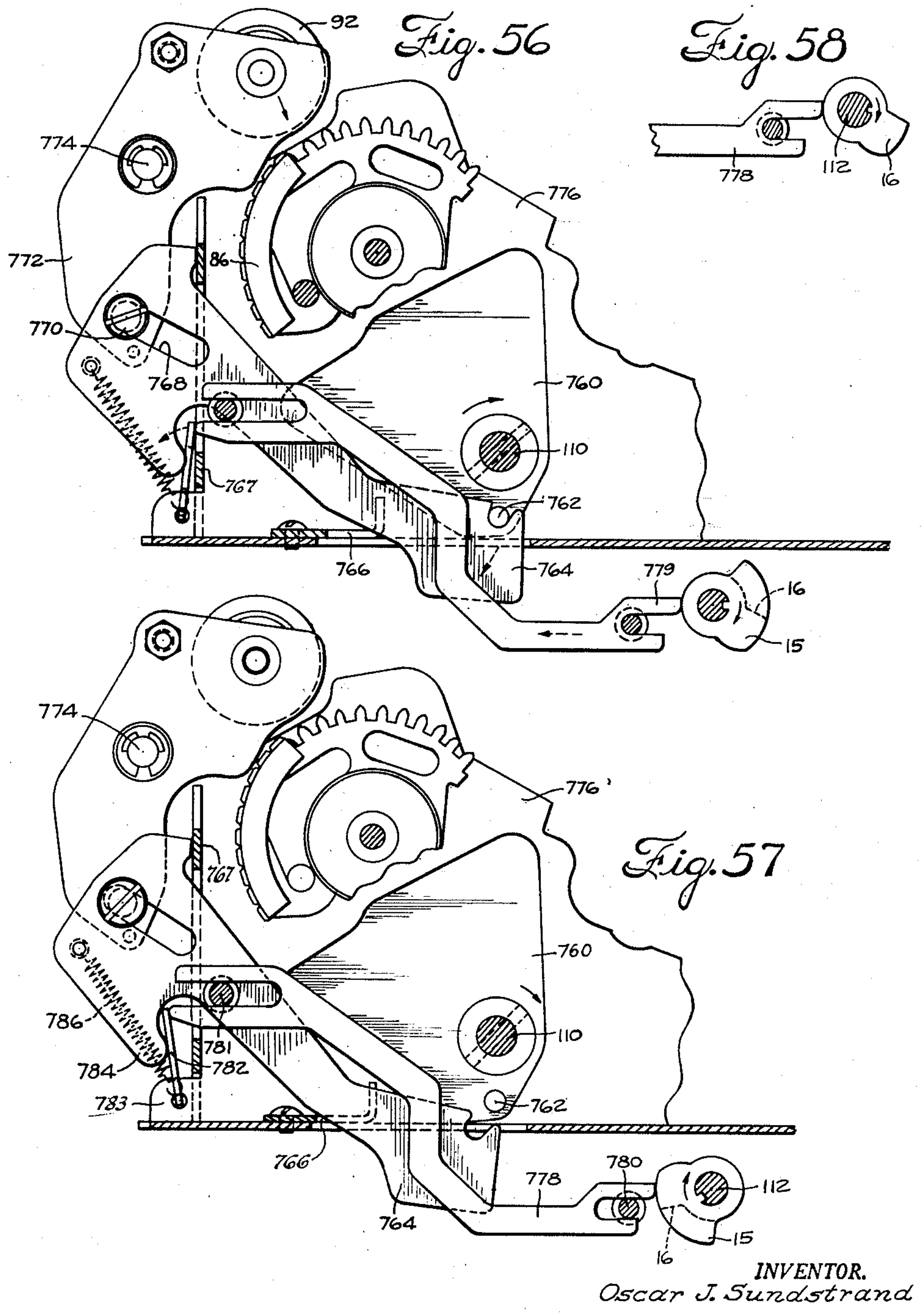
Fig. 56 is an elevational view, taken on the line 56—56 of Fig. 43, showing the nonprint mechanism in normal position.
Fig. 57 is a view similar to Fig. 56, showing the nonprint mechanism in operative position during a multiplication operation.
Fig. 58 is a fragmentary view showing the nonprint cam in normal position used during a dividing operation.

In performing multiplying and dividing operations, it is, of course, desirable not to print the amounts on the registers during successive calculating operations, but instead, merely to print the factors and final product or quotient. The means for preventing printing during the intermediate operations is best shown in Figs. 56, 57, and 58.

As more fully shown and described in the aforesaid patents to Thomas O. Mehan, printing in this machine is effected by moving the platen 92 against the type. A pair of plates 760, only one of which is shown, are secured to the main shaft 110 and have sidewardly extending studs 762. The studs 762 are adapted to engage in notches formed in platen actuator links 764 which are guided in a slotted angle 766 and extend freely through a vertical plate 767, and are provided with elongated slots 768 receiving studs 770 threaded in platen supporting side frames 772 which are pivoted on a shaft 774 which is carried by the frame plates 776. The platen 92 is carried by the side frames 772.

When the main shaft 110 is rocked clockwise, the links 764 are moved rearwardly until the lost motion due to the elongated slot 768 has been taken up. The links 764 then swing the platen frames 772 clockwise to bring the platen 92 into impression engagement with the type on the type segments 86. Incidental to making the printing impression, the record tape is retracted upon the clockwise movement of the platen frame 772 and advanced upon the counterclockwise movement thereof, by the customary mechanism.

During multiplying operations, by successive addition, and during dividing operations by successive subtraction, it is, of course, undesirable to print the calculating operations. Means are therefore provided to disable the printing and paper feed mechanisms. This comprises a cam 15 which, in multiplying operations, is moved to the position shown in Fig. 57, and engages a slide 778 moving the latter rearwardly. The slide 778 is guided upon a pair of studs 780 and 781. The rearward end of the slide 778 engages a plate 782 pivoted on lugs 783 which are parts of the plates 776. This plate engages downwardly extending portions 784 of the links 764, and swings the latter clockwise to disengage them from the studs 762 against the bias provided by tension springs 786.

In dividing operations, cam 16 (Fig. 58) engages the end of slide 778 by virtue of the fact that the cam shaft 112 is displaced from its normal position, and moves the slide 778 rearwardly to effect nonprinting in the same manner as in the multiplying operation described.

*Cam shaft rotating mechanism*

When the key 66 is shifted to division position from the position shown in Fig. 45 to the position shown in Fig. 46, and an amount is set up in the pin carriage, the lever 436 moves clockwise a sufficient distance to position a pawl 790 for engagement with a ratchet wheel 14. It will be noted that the ratchet wheel has three large teeth and two smaller teeth, for a reason which will subsequently be stated.

The pawl 790 is held from engagement with the ratchet wheel 14 by either of two elements, namely, the stud 422 on lever 420 or the stud 472 on the bell crank 436. Both the studs 422 and 472 must be lowered in order to permit engagement of the pawl 790 with the ratchet wheel. It will be recalled that the bell crank 436 is swung counterclockwise whenever an amount is entered in the keyboard, i. e., amount pin carriage 70 is displaced from normal position, and it will be recalled that the stud 422 is lowered whenever the key 66 is moved to either multiplying or dividing position. When an amount has been entered and the key 66 moved to dividing position, as shown in Fig. 46, spring 792 pulls the pawl 790 counterclockwise, and during the return stroke of the main shaft 110 moves the pawl 790 from its full line position (Fig. 46) to its dotted line position, and advances the cam shaft 112 counterclockwise through an angle of approximately 55°, an angle sufficient to bring a roller 794 carried by a lever 796 past the high point of a star-shaped cam shaft positioner 1.

Figure 42:
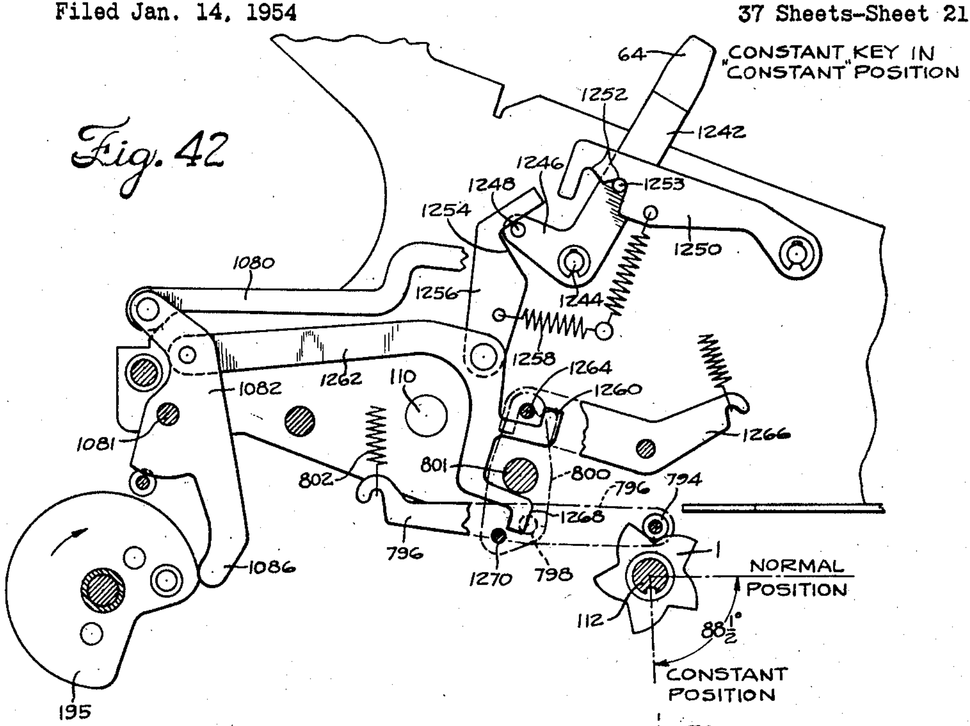
Fig. 42 is a side elevational view of the constant key mechanism in "constant" position.
Figure 43:
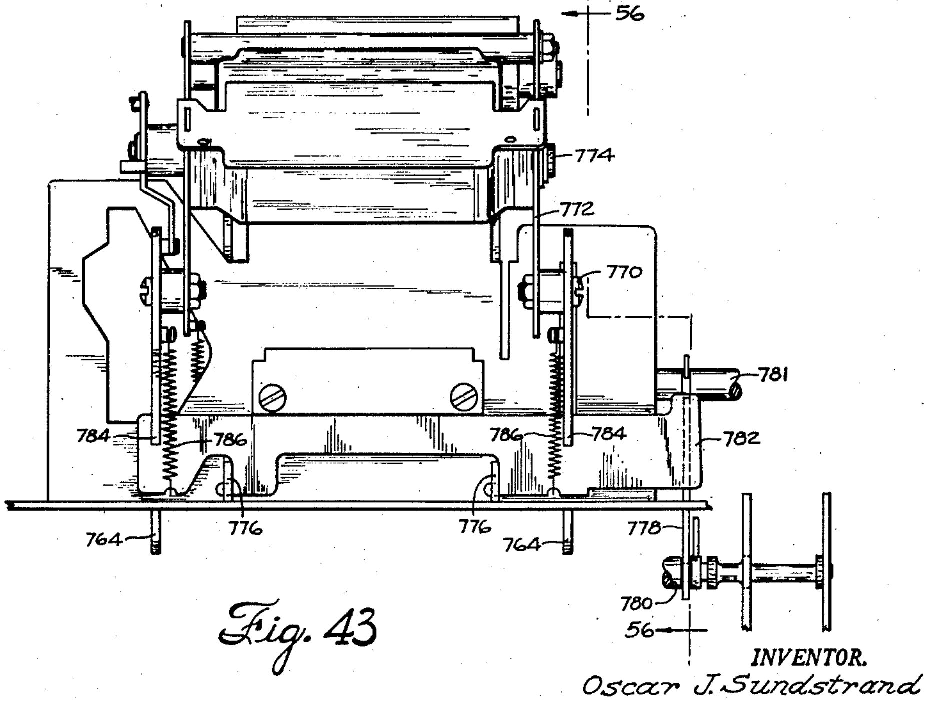
Fig. 43 is a rear view, showing the nonprint control plate printing links and printing frame.

As best shown in Fig. 42, the lever 796 is pivoted on a stud 798 carried by a rock plate 800, the lever 796 being biased for clockwise movement by a relatively strong spring 802. The plate 800 is pivoted on a stud 801. As will be set forth more fully hereinafter, the spring 802 swings the lever 796 clockwise as shown in Fig. 42, and counterclockwise as shown in Fig. 46, and advances the cam shaft 112 counterclockwise through an angle of approximately 16° to the position in which it is shown in Fig. 46.

The star wheel 1 and cam shaft 112 are shown in Fig. 46 in the position to which these parts are advanced after two cycles of operation of the machine, namely, the operation in which the dividend was entered and the operation in which the divisor was entered. During the first cycle, the cam shaft 112 is rotated counterclockwise through an angle of approximately 56° by the pawl 790. Thereafter it is rotated an additional 16° by the roller 794 biased by the spring 802. During the second cycle, the shaft 112 is advanced an additional 55° to the position shown in Fig. 46, by the pawl 790. When advanced to this position the roller 794, actuated by the spring 802, is not able to advance the shaft 112 through the additional 16°, because a stop nose 804 engages the stop face 806 of cam 28. The stop nose 804 is a part of a bell crank 808 (Fig. 75) which is pivoted on a stud 810 and biased for clockwise movement by a tension spring 812. One arm of this bell crank 808 bears against the plate 220 which forms part of the frame for supporting the registers A and B, and is moved to the left by spring 298 (Fig. 59) which occurs during the return stroke of the divisor setup cycle. As shown in Fig. 46, the cam 28 (as well as the shaft 112) is shown in the position in which it is stopped during the process of performing division.

As will hereinafter more fully appear, during a multiplying operation the first cycle comprises setting up the multiplicand. The second cycle is utilized in setting up the multiplier, and the third cycle is a nonadd cycle, which provides time for positioning the B register. Thus in multiplying operations, the cam shaft 112 is rotated through an angle of approximately 199° to the position in which it is shown in Fig. 47, in which operation the nose 804 is in alignment with cam 27, and in engagement with the shoulder 814 thereof, to prevent rotation of the shaft 112 by the spring 802.

During cycles of the machine in a multiplying operation, after the multiplicand and multiplier have been introduced, the cam 29 is moved from the position shown in Fig. 77 counterclockwise approximately 144° so that the toe 816 of a three-armed lever 818 will be at the low edge of the cam 29. This lever 818 is actuated by a tension spring 820 and has a rearwardly extending arm 822 which overlies a sidewardly extending stud 824 on the switch actuating link 512. Thus, when the toe 816 moves to the short radius portion of the cam 29, spring 820 pulls the link 512 downwardly to close switch 176, and trips the one revolution clutch mechanism by virtue of the connection of the link 512 with the arm 520 and shaft 523, arm 528 (Fig. 44), and tripping lever 532. Close to the end of each operating cycle the stud 538 engages the arm 536, and swings the lever 520 counterclockwise (Fig. 76) and through spring 522 opens switch 176. The switch 176 is reclosed by the three-armed lever 818 as soon as the stud 538 passes the arm 536.

The forwardly extending arm 826 is guided by a slotted collar 828 mounted on the stud 553 and the downwardly extending arm thereof is guided in a slotted stud 830 secured to the support plate 479. Thus, during multiplying operations, the machine will continue to cycle until the problem is completed, as will be described hereinafter.

Similarly in dividing operations, when the cam shaft 112 is in normal position the cam 30 will be in alignment with the toe 816 of the three-armed lever 818, and after the shaft has moved through an angle of approximately 78° counterclockwise (Fig. 76) the spring 820 will pull the three-armed lever 818 clockwise and depress the switch actuating link 512 to cause repeated operating cycles, until the problem is completed.

*Pin carriage lock plate operation*

As is customary in ten-key adding machines, the pin carriage is provided with a lock plate 832 (Fig. 63) which has a loose pivot connection with the frame of the pin carriage at 834 and is biased to swing clockwise by a spring 836. This plate normally restrains the actuators 80 from rearward movement beyond the zero position.

In multiplying operations, a cam 19 is rotated clockwise (Fig. 63) through about 199° so that a follower toe 838 of a lever 840 rests upon the reduced radius edge of the cam plate 19, being moved to this position by a tension spring 842 hooked to the forwardly extending arm of the lever 840. The forwardly extending arm of the lever 840 has an upwardly extending projection 844 which is in position to engage a depending flange 846 formed along the forward edge of the lock plate 832 to raise the latter a sufficient distance above the stop shoulders 78 of the actuators to permit them to move rearwardly by their springs 848 (Fig. 4) as the bail rod 850 is swung counterclockwise about the shaft 852.

Similarly during dividing operations, the toe 838 of lever 840 will lie in the plane of cam 20 and after the shaft 112 has been moved clockwise (Fig. 64) through approximately 127°, the lever 840 will swing counterclockwise to raise the lock plate 832 above the stop shoulders 78 of the actuators 80.

*Nonadd mechanism*

The nonadd and repeat key 56 is secured to a stem 68 (Fig. 68) pivoted at 664 and has a stud 856 extending sidewardly therefrom, this stud riding in a slot 858 formed in an arm 859. When the key 56 is swung rearwardly to effect a nonadd operation a shaft 860, to which the arm 859 is secured, is swung clockwise. A second arm 862 is secured to the shaft 860 and has a sidewardly extending stud 864, this stud operating against the upwardly and rearwardly facing edge 866 of a nonadd rocker plate 868 which is pivoted upon a stud 870. This rocker plate is biased for clockwise movement by a very weak spring 872.

The nonadd rocking plate 868 has a downwardly and forwardly projecting portion 871, the rounded lower edge of which is adapted to engage a stud 873 on a wipe pawl 875 to prevent the latter from engaging a stud 877 which is a part of the accumulator engaging and disengaging mechanism. In Fig. 68 the wipe pawl 875 is illustrated in the position it assumes at the beginning of the return stroke; that is, the beginning of the clockwise movement of the main shaft. This mechanism prevents the engagement of the C accumulator with its gear segments, with a resulting nonadd operating cycle.

The plate 868 is connected by a wire link 874 with a cam member 876 which is suitably pivoted at 878. This member is biased for counterclockwise movement by a relatively strong spring 880 and has an arcuately and downwardly extending arm 882 which is adapted to cooperate with the edge of cam 23. The main shaft 110 has an arm 884 secured thereto, this arm carrying a stud 886 which, when the main shaft is rocked counterclockwise (Fig. 69), permits the spring 880 to swing the lever 876 counterclockwise to bring the lower end of depending arm 882 into engagement with the reduced radius edge of cam 23 when a nonadd operation is necessary during multiplying operations.

Similarly, the depending arm 882 is in alignment with cam 24 (Fig. 69) during dividing operations, and will be swung to engage the short radius edge of this cam whenever nonadd cycles are required in a dividing operation.

The lost motion connection provided between the rocker plate 868 and arm 882 by the elongated slot 883 and the hooked end of wire 874 makes it possible to operate the nonadd controls manually as well as automatically.

*A and B register engaging and disengaging mechanism*

Figure 5:
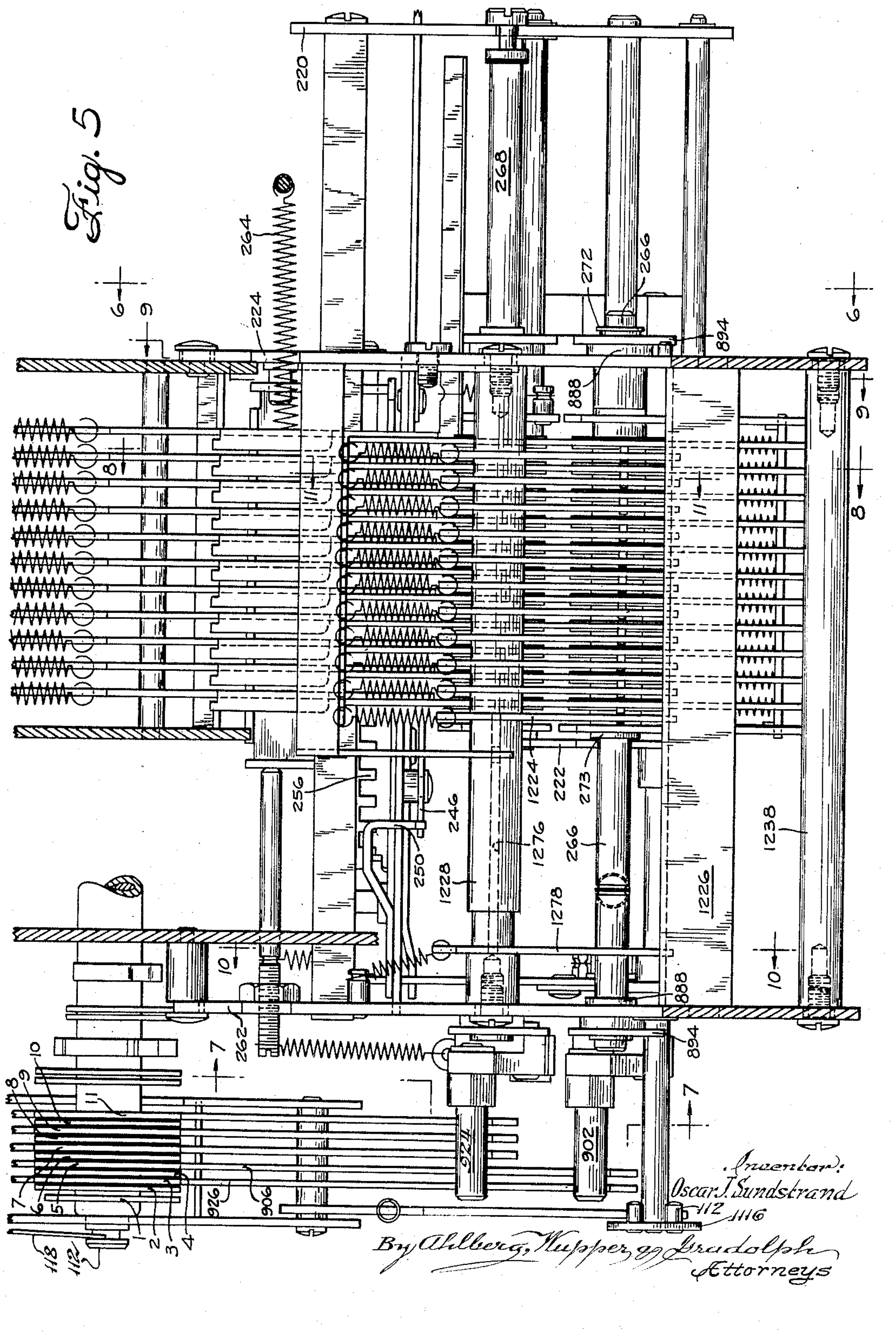
Fig. 5 is a top plan view of the calculating section, taken substantially on the line 5—5 of Fig. 4.

The A register shaft 266 has bushings 888 at the ends thereof which bear in slots 890 formed in frame plates 224 and 262. These slots, shown in Figs. 5, 6, and 7, are keyhole-shape, merely for convenience in assembly, the lower portions of the slot being straight sided for guiding the shaft for substantially vertical movement to bring the register pinions 204 into mesh with racks 892 and serve as down stops for the shaft 266 upon disengagement of the pinions.

A pair of toggle links 894 are pivoted on the bushings 888 at each end of the shaft 266, and these toggle links respectively cooperate with toggle links 896. The toggle links 896 are pivotally joined to the toggle links 894 respectively, by shouldered rivets 898. The toggle links 896 are of relatively thick metal and are clamped to a shaft 900 suitably mounted for pivotal movement.

Figure 7:
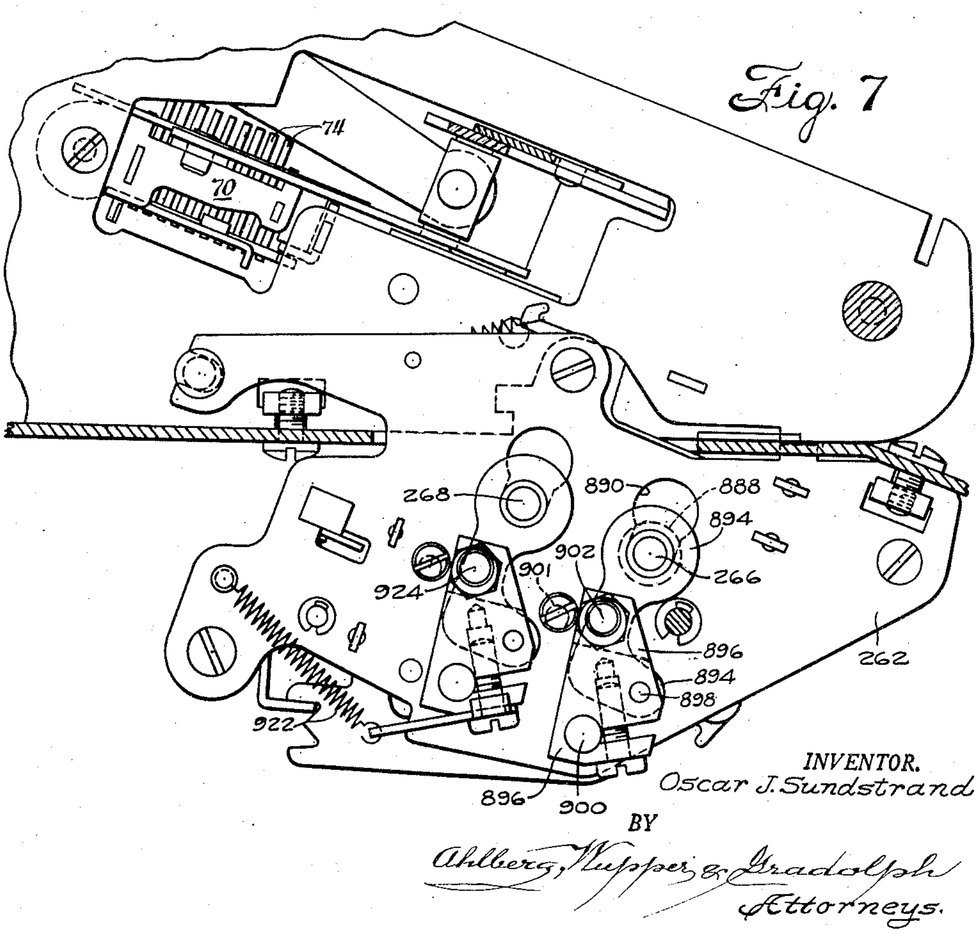
Fig. 7 is a left side elevation of the calculating section, taken on the line 7—7 of Fig. 5.

As shown in Figs. 7 and 15, the stroke of the toggle mechanism is limited by a rivet 901 which has an eccentric smaller diameter portion 903 riveted over a friction washer 905. Thus by rotation of this stop stud, adjustment may be made for the extent of permissible throw of the toggle link 894 which swings in the plane of this stud. In operation, this toggle linkage moves substantially to the position in which the center of rivet 898 is substantially in alignment with the centers of shafts 266 and 900, such that but a small force is required to hold the shaft 266 in its upward position, in which the pinions 204 are in mesh with the racks 892.

Figures 9, 10, 11:
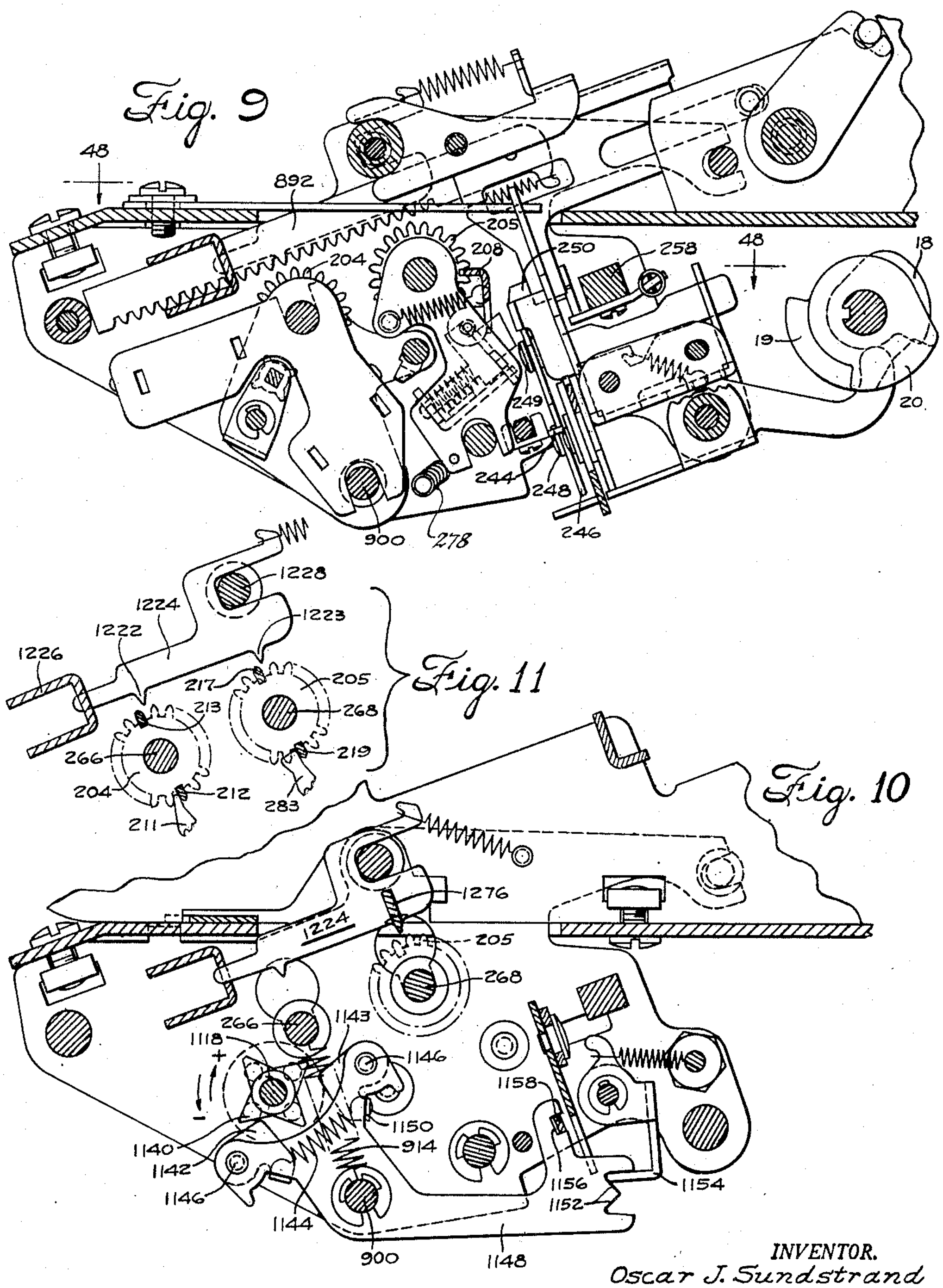
Fig. 9 is a cross sectional view of the calculating section, taken on the line 9—9 of Fig. 5.
Fig. 10 is a cross sectional view of the calculating section, taken on the line 10—10 of Fig. 5, showing the add-back control mechanism.
Fig. 11 is a fragmentary cross sectional view of the calculating gears and their stops, taken on the line 11—11 of Fig. 5.

An eccentric pin 902 is secured to the left-hand toggle link 896, this pin being cooperable with the hook portion 904 (Fig. 28) of an adding slide 906 for the A register, which is pulled rearwardly by a suitably anchored spring 908 to maintain its nose portion 910 in engagement with the adding cam 193 when the slide is not restrained by engagement of a feeler portion 912 thereof with cam 4. The shaft 266 is biased to slide downwardly by a tension spring 914 (Fig. 10). The slide 906, just as the other slides hereinafter to be described, has a pair of elongated slots 916 near the ends thereof to receive supporting bars 918 and the slides are spaced by suitable combs 920.

The B register shaft is raised by a toggle linkage similar to that employed for the A register. The B register shaft 268 is lowered by a tension spring 922 (Fig. 7) and is raised to bring the pinions 205 in mesh with the racks 892 by a force applied to an eccentric pin 924 which corresponds to the eccentric pin 902 associated with the A register engaging and disengaging means.

Figure 25:
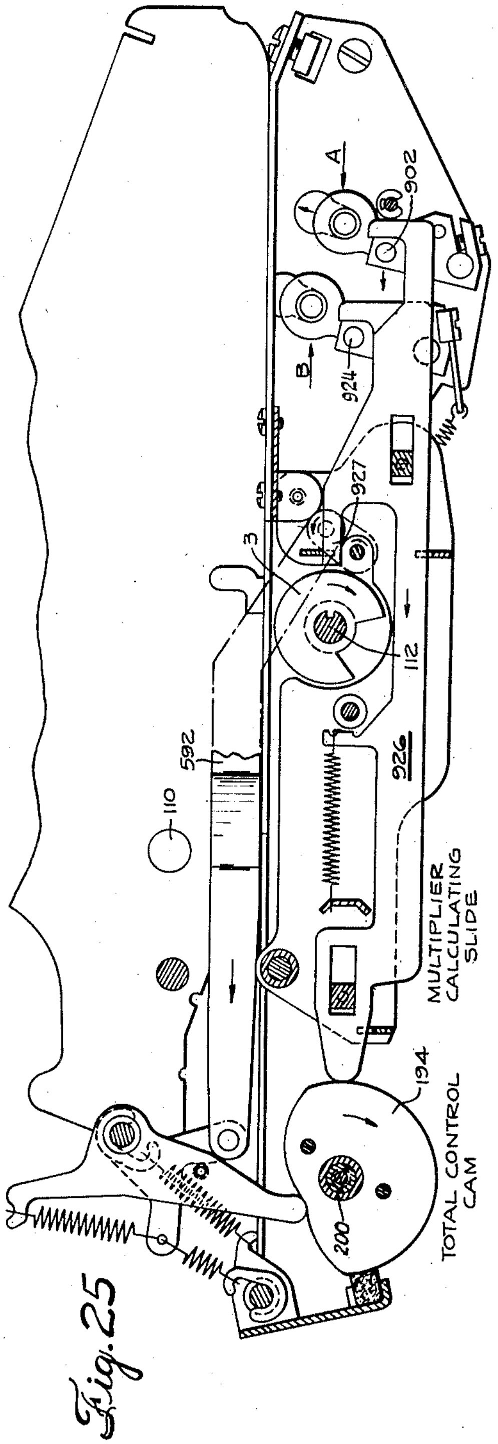
Fig. 25 is a sectional view, taken on the line 25—25 of Fig. 23, showing the total control cam, the multiplier calculating slide, the quotient clear cam, the automatic total drive arm, and the automatic total cam arm, the cam shaft being in dividing position.
Figure 26:
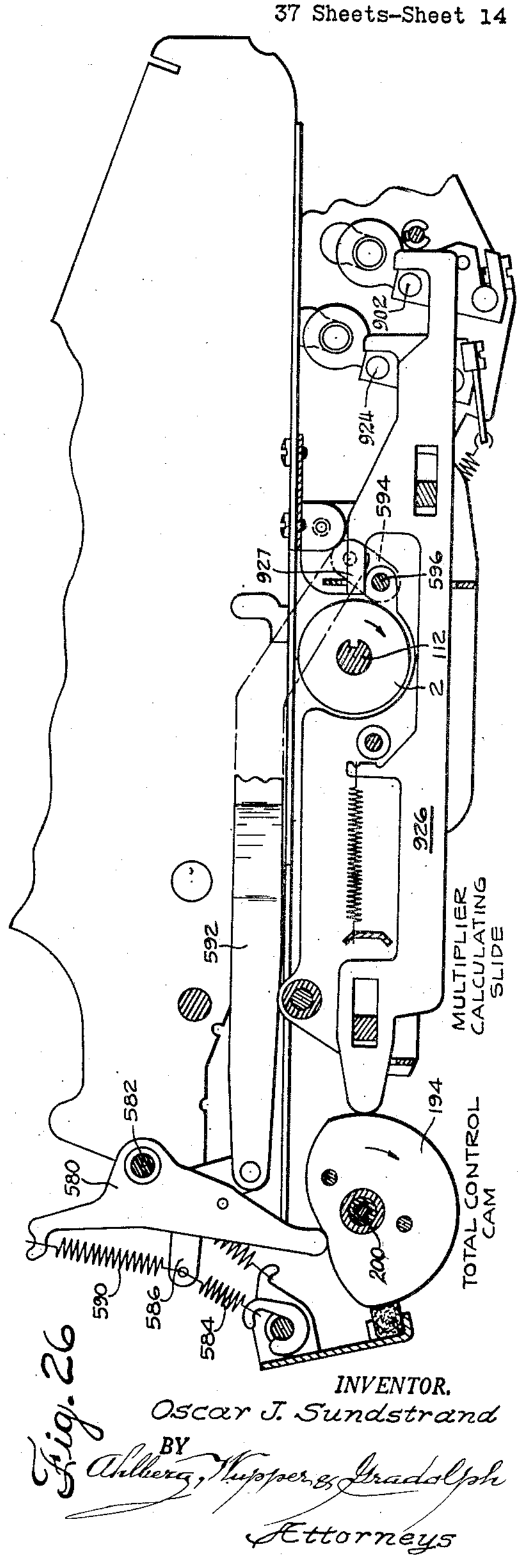
Fig. 26 is a view similar to Fig. 25, showing the multiplier clear cam and cam shaft in multiplying position.
Figures 27, 28:
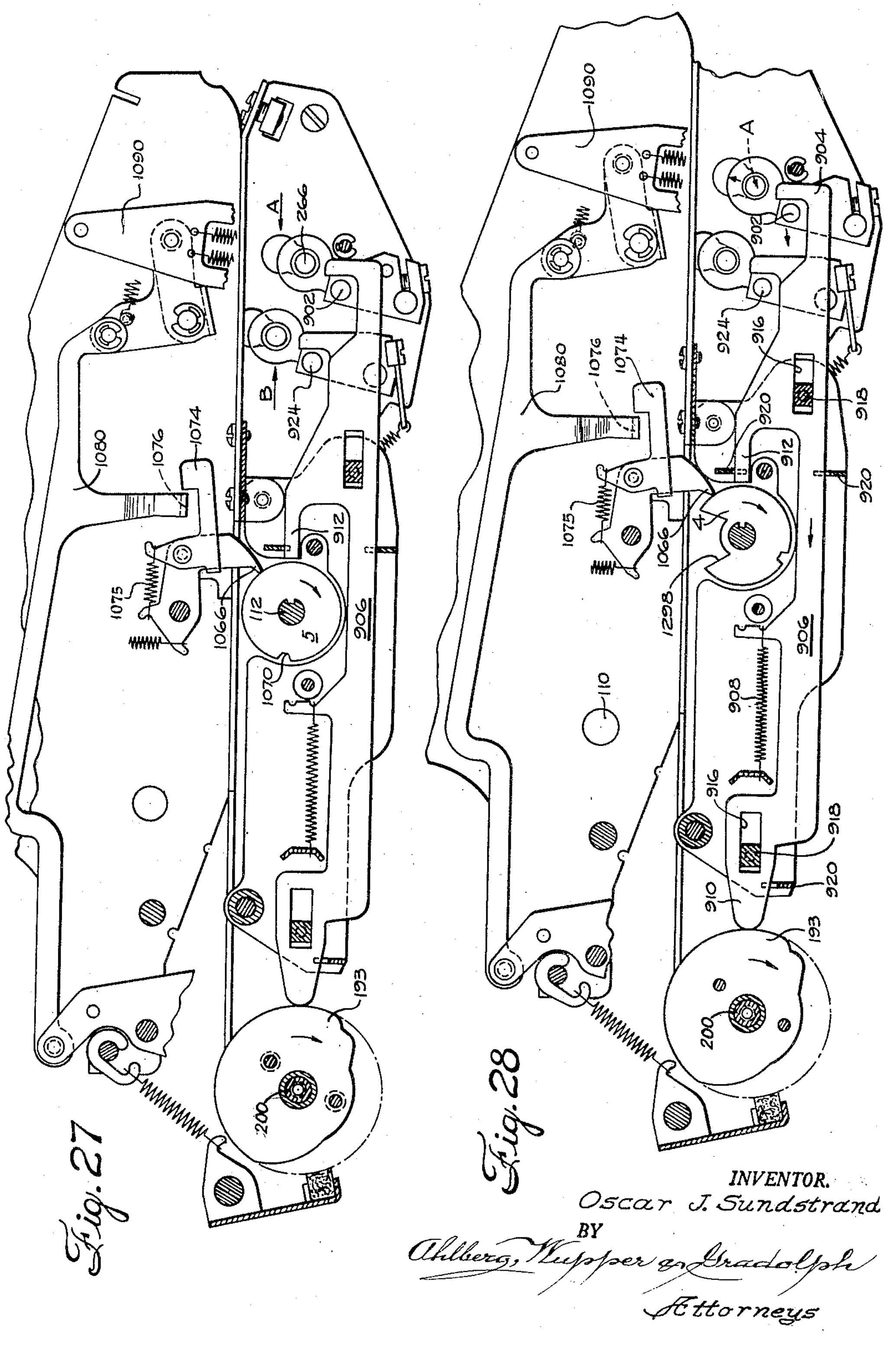
Fig. 27 is a sectional view, taken on the line 27—27 of Fig. 23, showing the calculating gear engaging cam, multiplier calculating slide, quotient add cam, calculating counter arm link latch, and lever, with the cam shaft in dividing position.
Fig. 28 is a view similar to Fig. 27, showing the multiplier add cam and cam shaft in multiplying position.

The A register engaging and disengaging mechanism may be operated not only by the adding slide 906, but by a total taking slide 926 (Figs. 25 and 26). During dividing operations the feeler 927 of the slide 926 has a cam 3 in the plane thereof. After the cam shaft 112 has moved through approximately 288° (clockwise, Fig. 25), the notch of this cam will be in alignment with the feeler so that the slide 926 may move to the left, acting as a follower on the cam 194, or until it is limited by the engagement of the arm 894 with the eccentric adjustable limit rivet 901 (Fig. 7).

When the cam shaft 112 is shifted to the right for a multiplying operation, cam 2 is in alignment with the feeler 927 (Fig. 26). As a matter of fact, cam 2 prevents the slide 926 from causing engagement of the A register pinions 204 with the racks 892 until a total is to be taken from the A register during a multiplying operation. In other respects the slide 926 has associated with it the elements similar to those associated with the slide 906, and the slide 926 operates in substantially the same manner as does the slide 906.

A divisor adding slide 928 is shaped similar to slide 906 and has similar parts associated therewith for its operation.

Referring to Figs. 29 and 30, the slide 928 has its hook portion 930 positioned to engage the stud 924 of the accumulator engaging toggle linkage for the B register. The feeler 929 of the slide 928 is in the plane of cam 7 when the cam shaft 112 is in position for a dividing operation.

Referring to Figs. 51 to 55, it will be recalled that whenever an amount is entered in the stop pin carriage the member 436 moves clockwise, as shown in Fig. 51, and moves counterclockwise, as shown in Fig. 30. Such pivotal movement of the member 436 permits a spring 932 to swing counterclockwise a multiplying slide stop member 934 having a transverse portion 936 which normally lies in the path of the hook portion 930 of the slide 928, and has an upwardly extending arm 938 with a sidewardly extending lug 940 underlying the forward end of member 436. Thus when the pin carriage 70 is displaced from its home position by entry of an amount therein, the member 436 will be permitted to swing counterclockwise (Fig. 30) and the spring 932 will swing the pivoted stop member 934 counterclockwise a sufficient distance to permit the hook portion 930 of the slide 928 to pass beneath the transverse stop portion 936 of the stop member 934.

The feeler 929 of the slide 928 is in alignment with cam 6 when the shaft 112 is shifted to the right for the purpose of effecting a multiplying operation.

*Mechanism used in transferring an amount from the C register to the B register*

In a cycle of transferring a total from the C accumulator to the B register when such total is to be used as the multiplicand of a multiplying problem succeeding one of addition, the total transfer button 68 is depressed. It will be recalled that the stem 682 (Figs. 38 and 39) of this key will swing clockwise and the portion 688 of the stem or arm 682 will engage the lug 459 of the pawl 458 (Figs. 53 and 55) and move the pawl from the position in which it is shown in Fig. 53 to the position in which it is shown in Fig. 55, thereby permitting the member 436 to swing counterclockwise as viewed in Fig. 30. This will likewise permit the transverse stop portion 936 of the stop member 934 to be raised above the end of the hook portion 930 of the slide 928.

A slide 942 (Fig. 31), generally similar to slide 906, is mounted for movement in the same manner as the former slide, and has its nose portion cooperable with the subtotal control cam 191. Its feeler 943 lies in the plane of cam 9 on cam shaft 112 during dividing operations, and its hook portion 945 lies in front of stud 924 of the toggle linkage for causing engagement of the B register. During multiplying operations the feeler 943 will lie in the plane of the cam 8.

Thus, in multiplying operations the cam 8 will be rotated clockwise through an angle of approximately 199° to bring its notch 946 into alignment with the feeler 943 so that upon rotation of the cam 191 the slide 942 may be drawn to the left and its hook portion engage the stud 924 and through the toggle linkage cause engagement of the B register.

A slide 950 (Fig. 32) similar to slide 906, and similarly mounted, has a feeler 951 cooperable with cam 11 during dividing operations and with cam 10 during multiplying operations. The cams 10 and 11 have notches 954 and 955 respectively. This slide 950 has a hook portion 953 which cooperates with stud 924 of the toggle link accumulator engaging and disengaging mechanism for the B register. It will be noted that the notch 954 in the cam 10, used in multiplying operations, is wider than the notch 946 in cam 8. Thus when the cam shaft 112 has rotated clockwise 199° during a multiplying operation, both slides 942 and 950 may be moved to the left, as permitted by their respective cams 191 and 190. Therefore, the combined forces of their two springs 908 are available to hold the B register pinions 205 in mesh with their associated racks 892. During the final cycle of a calculating operation it is necessary to have the B register pinions 205 in mesh with their racks 892 so that this register may be cleared and in condition for a succeeding calculating operation.

*Disabling mechanism for "fugitive 1" inserting means*

Figure 65:
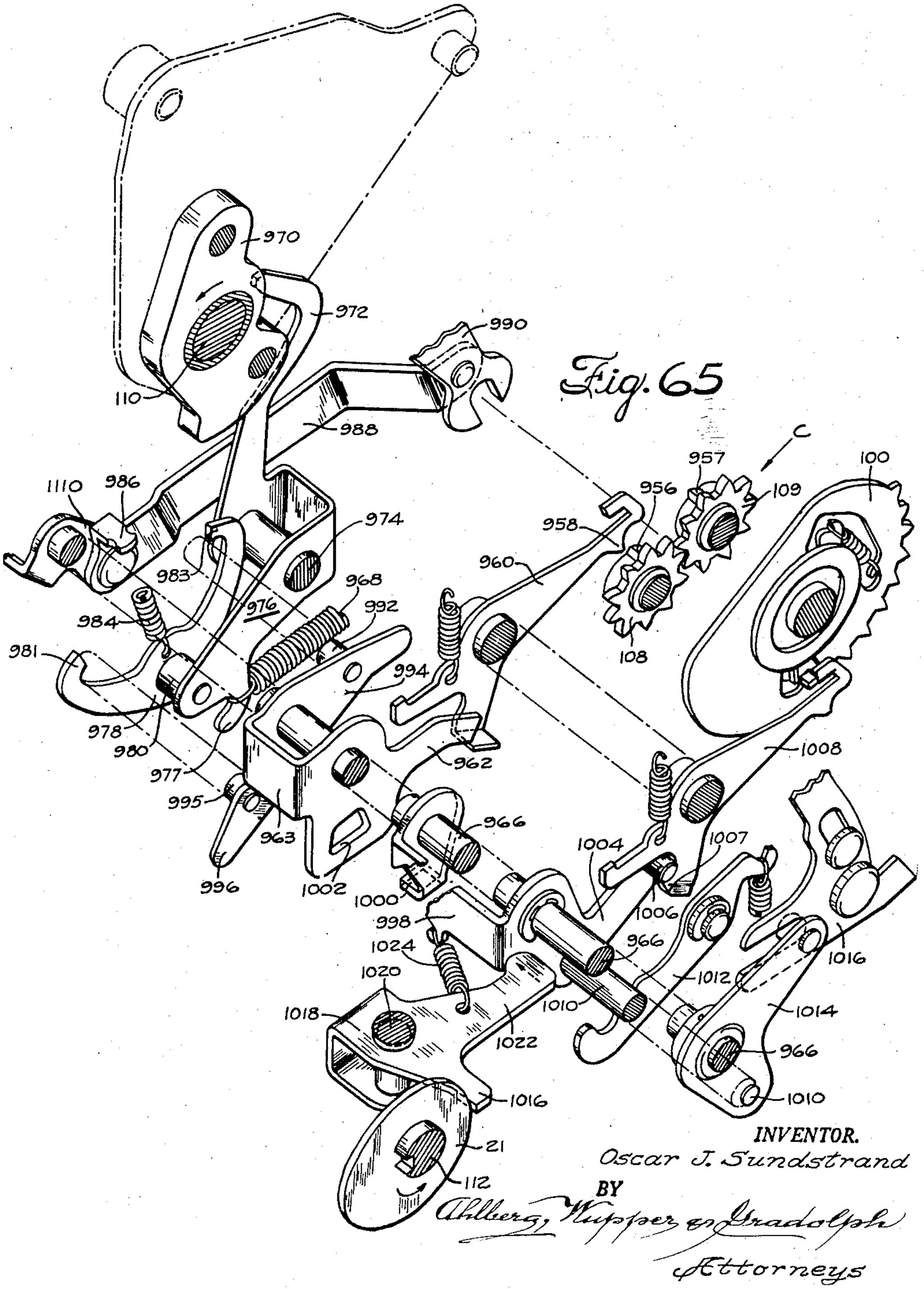
Fig. 65 is an exploded perspective view of the credit balance mechanism, including the fugitive one blockout cam and blockout mechanism.

As best shown in Figs. 4, 63, 65, 66, 67, and 89, the highest order pinions 108 and 109 of the C accumulator, as shown in Fig. 65, have their transfer lugs 956 and 957 adapted to cooperate with a nose 958 on a trip lever 960. The nose is adapted to be engaged by the lug 757 when the pinions 108 and 109 are positioned for a subtracting operation, in the usual well known manner. The trip lever is therefore pivoted counterclockise (Fig. 65), permitting one arm 962 of a U-shaped operating member 963 to swing clockwise on its shaft 966. The force required for effecting this movement of the U-shaped operating member 963 is stored in a spring 968 during the forward or first half of each operating cycle, by a cam 970 fixed to the main shaft 110, a follower arm 972 pivoted on a stud 974 being integral with a forwardly and downwardly sloping arm 976. A depending portion 977 of this arm is formed to receive one end of the spring 968, the other end of which is suitably secured to the frame of the machine.

A generally U-shaped member 978 is pivoted on a stud 980 secured to the forward end of arm 976. The member 978 has a forward hook portion 981 and a rearward hook portion 983. A spring 984 is connected to the central portion of the member 978 and has its other end connected to a lug 986 formed at the forward end of a link 988. This link is connected to the left-hand accumulator shifting levers 990, only one of which is shown in Fig. 65. The levers 990 are swung forwardly in preparation for a subtracting operation, by customary means as shown in the aforesaid patents.

When the accumulator C is thus moved to a subtracting position, the hook 983 will be in engagement with a pin 992 secured to an arm 994 forming part of member 963. When the accumulators are in adding position, hook 981 engages a stud 995 secured to an arm 996 forming part of member 963. A control slide 998 is longitudinally slidable on the shaft 966, the left-hand arm of the control slide having a leftwardly projecting lug 1000 which at all times projects through a rectangular opening 1002 in member 963 so that the slide 998 will be rotated with the member 963. The slide 998 at its right-hand end has an arm 1004 formed integrally therewith, this arm carrying a sidewardly projecting stud 1006 which normally rests against the upper sloping surface of projection 1007 of the transfer trip pawl 1008 associated with the gear segment 100 of the lowest denominational order. This gear segment will then operate in the usual manner to insert the "fugitive 1" in the lowest order accumulator pinions 108, 109.

When the member 963 turns clockwise, as a result of the hook 983 being in engagement with the stud 992, the stud 1006 will be swung to the lower portion of the front edge of projection 1007 and a stud 1010 will swing forwardly from one rounded notch in a detent lever 1012 to the other thereof, and at the same time the stud 1010 will operate through a bell crank 1014 to swing the accumulator shifting link 1016 downwardly to condition the machine to take a negative or credit total.

When performing a division problem it is not practical to have the fugitive 1 inserted in the accumulator. For this purpose a cam 21 on the cam shaft 112 has its edge adjacent a follower arm 1016 formed on a U-shaped member 1018 pivoted on a stud 1020, this member having a second arm 1022 which is held to bear against the end of the control slide 998 by a coil spring 1024. The cam 21 bears upon the arm 1016 so close to the end of the latter that when the cam shaft 112 is shifted to the right, as it is to condition the machine for the performance of multiplying operations, the cam 21 will be clear of the arm 1016 and the control slide 998 will therefore be pulled to the right (Fig. 65) by the spring 1024 so as to reposition the stud 1006 in front of the edge 1007 of the arm 1008, thereby reconditioning the machine to insert the fugitive 1 upon an overdraft.

The bell crank 1014 is suitably pinned or keyed to the shaft 966 so as to cause this shaft to rotate with it. It is also connected to the arm 1004 by the stud 1010.

*Add-back cycle*

In performing a problem in division, the machine subtracts the divisor successively from the dividend which has been entered into the C accumulator, commencing at the highest denominational order of the dividend.

After the machine has subtracted beyond its capacity, the trip lever 960 will be operated to rotate shaft 966 clockwise, as previously described. The shaft 966 is extended to the right beyond the portion shown in Fig. 65, as is clearly shown in Fig. 89. The end of this shaft has an arm 1026 rigidly secured thereto, this arm having a rightwardly bent lug 1028 which lies beneath the rearward toe portion 1030 of a lever 1032 pivoted on a stud 1034 riveted to mounting place 479 (Fig. 81).

Referring again to Fig. 89, the lever 1032 has a sidewardly extending stud 1036 which cooperates with cam 33 on cam shaft 112. The lever 1032 has a U-shaped bend 1038 at its upper end, the upper portion of which abuts the rearward edge 1039 of a subtraction control link 1040 which is attached by a tension spring 1042 (Fig. 88) to the stem 486 of the subtraction key 52. This link 1040 is swung rearwardly by spring 632, the other end of which is secured to the total and nonadd link 630 (Fig. 78).

The U-shaped bend 1038 of the lever 1032 holds the toe 1044 at the lower end of the link 1040 out of the path of the pin 600 on the rocking plate 598. When, however, the cam 33 is in the position assumed when a dividing operation is being performed (approximately 127° counterclockwise from the position shown in Fig. 88) the stud 1036 will be lodged in the notch of this cam and the spring 632 will pull the link 1040 rearwardly (counterclockwise) a sufficient distance such that the toe 1044 of the link is positioned beneath the stud 600, whereupon the clockwise rocking of the plate 598 will cause the link 1040, together with the subtract key stem 488, to be pulled downwardly, thereby initiating a subtract control.

Figures 88, 89:
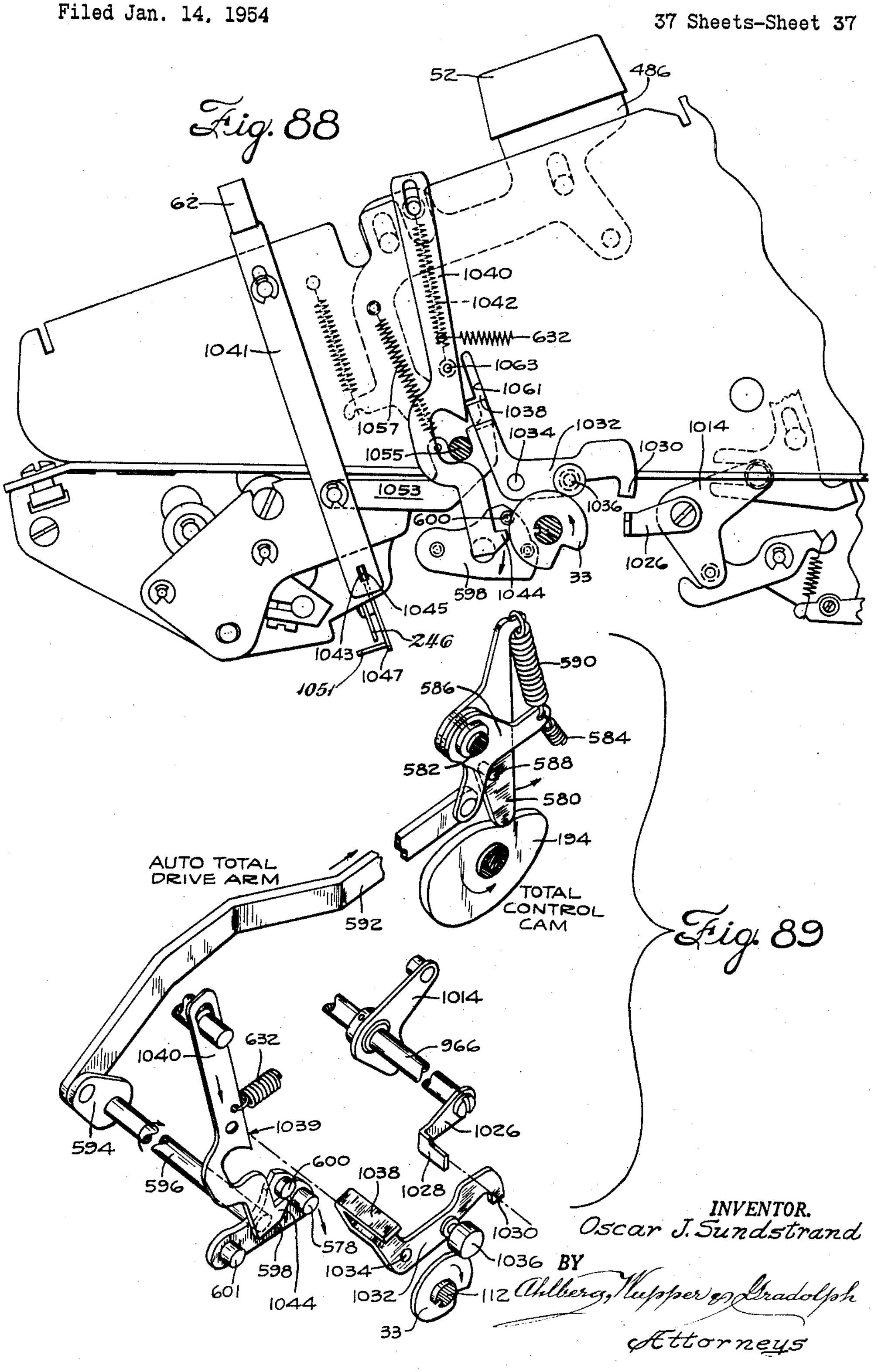
Fig. 88 is an elevational view showing the automatic subtract cam, the automatic subtract trip mechanism, and the division stop key, all shown in normal position.
Fig. 89 is a perspective view of the subtract trip and automatic add-back mechanisms.

If, under these circumstances, an overdraft takes place, the arm 1026 will have been moved clockwise from the position in which it is shown in Figs. 88 and 89, to engage the toe 1030 of the lever 1032, and swing the latter to the position in which it is shown in Fig. 88, in which position the toe 1044 is held away from the stud 600, in which condition the machine may go through an adding cycle, to add back the divisor and to condition the machine to print the quotient and thereafter to print the remainder.

*Division stop*

The division stop button 62 is secured to the end of a stem 1041 (Figs. 12 and 88) suitably guided for substantially vertical movement. This stem has a slot 1043 near its lower end for the reception of the end 1045 of a lever 1047. The lever 1047 is pivoted on a stud 1049 and at its left-hand end has a forwardly extending portion 1051 which, upon depression of the key stem 1041, engages the depending part 246 of the slide to raise the latter and thereby raise the escapement pawl so that its tooth 254 is above the rack 256. The escapement will thus be in the position shown in Fig. 22, with the tooth 1164 in engagement with the rack 256.

Also upon depression of the button 62, the subtract key is released by the following mechanism. Pivotally joined to the stem 1041 (Fig. 88) is a lever 1053 which is held against a stud 1055 by a spring 1057. Thus when the button 62 is depressed, the upwardly extending finger 1061 of lever 1053 engages a stud 1063 on the subtract key operated link 1040, swinging the latter clockwise a sufficient distance to remove the toe 1044 from beneath the stud 600 so that the next operation will be an adding operation.

As will be more specifically described hereinafter, the star wheel 1140 (Fig. 21), as it rotates counterclockwise, will have one of its teeth strike wipe pawl 1143 and move detent lever 1148 clockwise, thereby through the end finger portion 1158 of lever 1160 swinging the latter downwardly to disengage the tooth 1164 (Fig. 22) from the rack 256, and thereby permitting the rack to be pulled to the right by its spring 264. As the frame 220 reaches its rightmost position (Fig. 75), it strikes the forwardly extending arm of lever 808 and thus removes the lug 804 from the stop face 806 of cam 28 (Fig. 46), so that the machine may perform the cycles exactly the same as the hereinafter described cycles 11, 12, and 13 of automatic division, and the machine will come to a stop in normal dividing position.

*Divide and multiply signal printer*

As best shown in Figs. 37 and 40, the stem 122 for the multiply and divide key 66 has a long rearwardly extending link 1046 pivoted thereto, the rearward end of this link being pivoted to an arm 1048 secured to a shaft 1050 which extends transversely through the left-hand side plate 690 of the machine. This shaft has a U-shaped bracket 1052 clamped thereto by a screw 1054. The bracket also has an upwardly extending arm which is bent toward the right in a horizontal plane, and has a lug 1056 sloping forwardly from the sidewardly bent portion. This lug engages a curved type carrier 1058 which rests in a groove formed in a bushing 1060 which is riveted in the side frame of the machine.

A logotype segment 1062 carrying multiply and divide symbol type, is mounted on the carrier 1058 and the latter is maintained in firm seating engagement with the bushing 1060 by a tension spring 1064.

In Fig. 40 the printing parts are shown in normal position, as is the key 66 in Fig. 37, but it will be apparent that upon moving key 66 to dividing position or to multiplying position, the appropriate signal will be presented toward the platen.

*General method of dividing*

In performing dividing operations, the dividend is entered into the C accumulator in the first cycle. In the second cycle, the divisor is entered into the B register, and the B register is positioned properly for commencing the highest order subtraction. In the third, and as many subsequent operations as are necessary, depending upon the problem being solved, the divisor in the B register is successively subtracted in the highest denominational order position which is assumed by the B register automatically.

During each of these cycles, one of the pinions of the A register is operated until an overdraft occurs, whereupon the divisor is automatically added into the C accumulator (the add-back cycle), at the same time rotating the pinion of the A register reversely (in a substract direction). Then the B register is shifted to the next lower denominational order and the cycles are automatically repeated until the final lowest denominational position of the B register, the last overdraft and add-back of the series of cycles performed when the B register is in this position, causes the taking of an automatic total, first printing the quotient and then printing the remainder, if any, with appropriate signal indicia, thus completing the problem, having printed both the dividend, divisor, and quotient, together with any remainder.

*General method of multiplying*

During the first cycle the multiplicand is set up in the keyboard and transferred to the B register, the C accumulator being conditioned for nonadd. In the second cycle, the multiplier is set up in the A register, the B register is properly positioned laterally, and the multiplication problem is performed by the usual method of successive addition under the control of the A register, commencing with the highest order digit in the A register. In other words, the A register operates as a subtracting counter to control the movement of machine cycles in each denominational position of the B register, and the latter is shifted transversely after each group of successive additions in each denominational order.

*Mechanisms used principally in dividing operations*

As was previously described with reference to Figs. 48, 49, and 50, when the key 66 is shifted from normal position (Fig. 49) to divide position (Fig. 50) the stud 422 is lowered, and after the amount is set in the keyboard the stud 472 is likewise lowered so that lever 424 will drop into the low portion of cam 13, thus conditioning the machine for setting the stops 388.

Upon completion of the second cycle of a dividing operation, the cam shaft 112 will have moved clockwise (Fig. 41) through 127°, being stopped by the stop lug 804 engaging with the shoulder 806 on cam 28 (Fig. 46). Under these circumstances the toe 1066 (Fig. 41) of a lever 1068 drops into a notch 1070 formed in cam 5. Lever 1068 is pivoted on stud 729 and is urged to swing clockwise by a spring 1072. The lever 1068 has a stop latch 1074 pivoted thereto, this latch being biased for counterclockwise movement to the position shown in Fig. 41, by a spring 1075, and being cooperable with a sidewardly bent lug 1076 formed on the depending arm 1078 of an A register actuating link 1080. The rearward end of this link is pivoted to a follower lever 1082 pivoted on a stud 1084 and which has a follower toe portion 1086 cooperable with the edge of cam 195. The forward end of link 1080 is pivoted to the upwardly extending arm of a bell crank 1088, the lower U-shaped double arm 1089 being pivotally connected to A register actuating slide 1090 by a stud 1091. The lever 1088 is pivoted on a suitable stud 1092. The lever 1088 is biased to move clcokwise by a spring 1094.

Figures 63, 64, 66, 67:
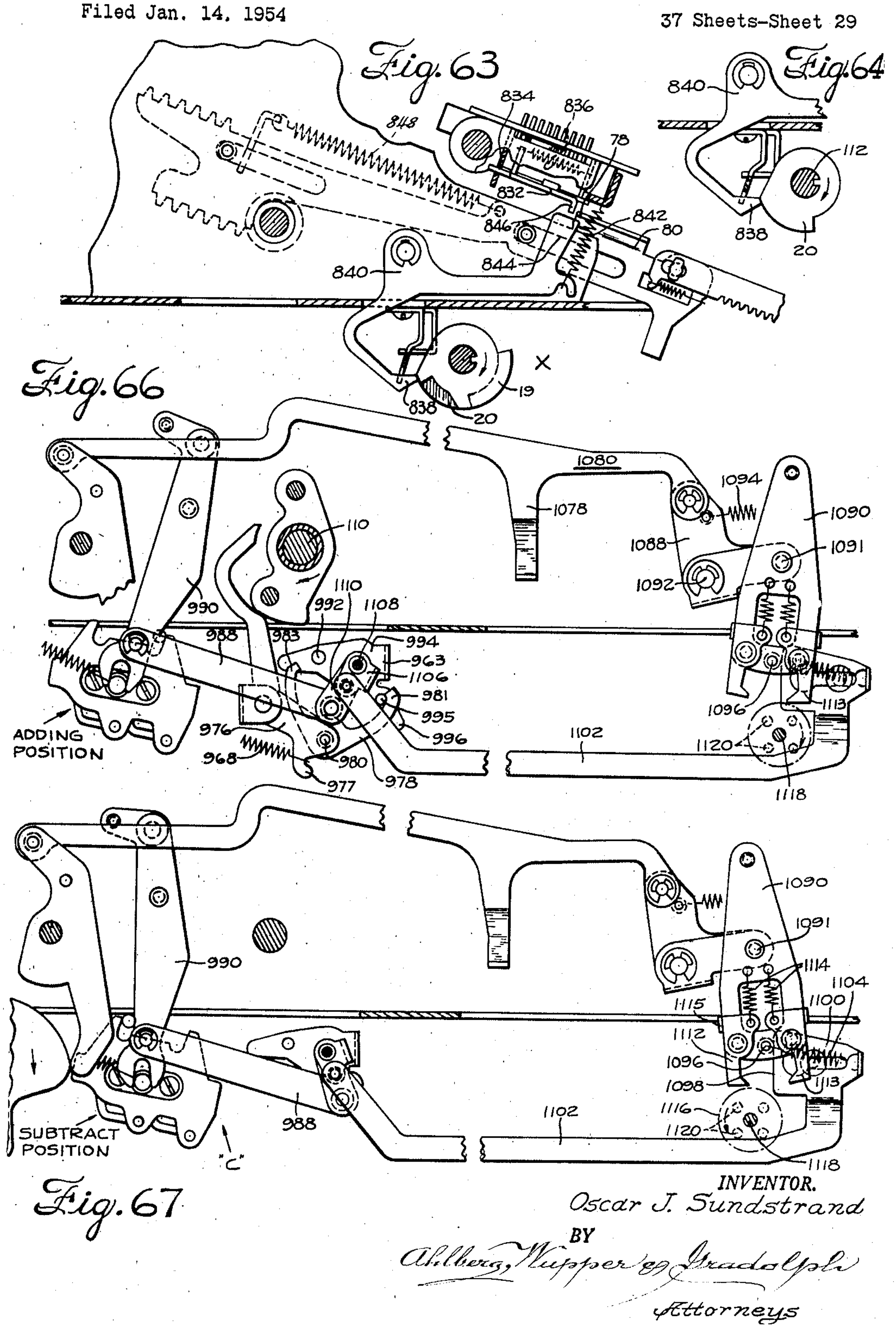
Fig. 63 is an elevational view, taken on the line 63—63 of Fig. 23, showing the rack stop raising lever, and the stop pin carriage lock plate cam.
Fig. 64 is a fragmentary view, showing the rack stop raising lever and lock plate cam.
Fig. 66 is a view taken on the line 66—66 of Fig. 23, showing the calculating counter mechanism and connecting link to accumulator, the accumulator being in add position, the counter arm in multiplying position, or add-back position in dividing operations.
Fig. 67 is a view similar to Fig. 66, showing the accumulator in substract position and the counter arm in dividing position.

The A register actuating slide 1090 has a pin 1096 secured near its lower end and, as best shown in Figs. 66 and 67, this pin 1096 slides against the rearwardly facing edge 1098 of the upwardly extending forward end portion 1100 of a link 1102, the pin 1096 being held against the edge 1098 by a tension spring 1104 which is connected between the pin 1096 and the forward end portion of the link 1102. The rearward end of the link 1102 is pivotally secured to one arm of a bail 1106 (Fig. 66), and the latter is pivoted not only to stud 1108 but has its other arm 1110 pivoted on the left-hand end of shaft 966 (Fig. 23) which forms part of the overdraft mechanism described with reference to Fig. 65.

Thus when the C accumulator is shifted from adding position (Fig. 66) to subtracting position (Fig. 67) by counterclockwise movement of the arms 990, the A register or counter operating slide 1090 is moved counterclockwise from the position shown in Fig. 66 to the position in which it is shown in Fig. 67, about the pivot stud 1091, by virtue of the spring 1104 connecting the forward end of the link 1102 to the stud 1096 on the slide 1090.

As shown in Fig. 66, the slide 1090 is in subtract position, and as shown in Fig. 67 this slide is in adding position of register A.

Figure 41:
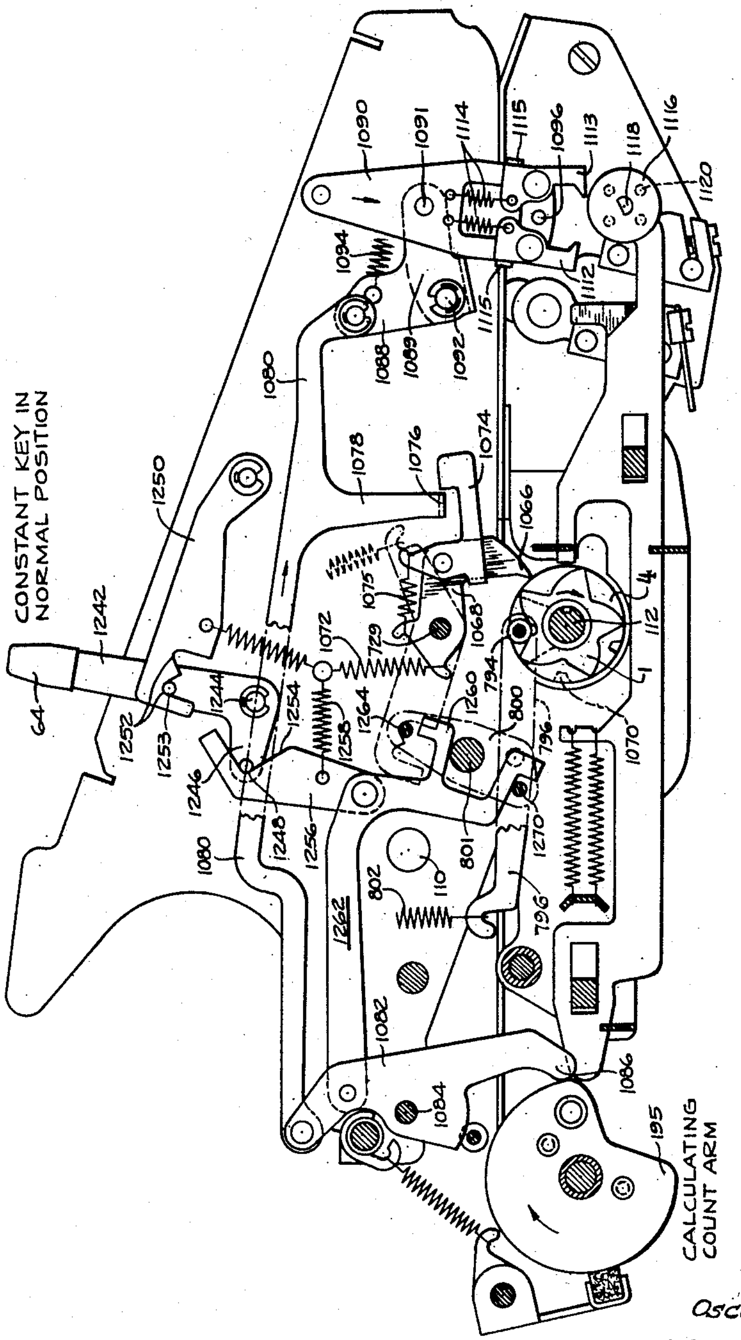
Fig. 41 is a side elevational view of the constant key mechanism shown in normal position.

During the latter portion of the machine cycle, the cam 195 (Fig. 41), operating through the previously described linkages 1082, 1080, and 1088, reciprocates the slide 1090 vertically. The slide 1090 has a pair of pawls 1112 and 1113 (Fig. 67) pivoted to the lower end thereof, these pawls being urged counterclockwise and clockwise respectively, by tension springs 1114 to rest against stop lugs 1115 on the slide 1090. Beneath the lower ends of the pawls (when the latter are in upper position as shown in Fig. 41) there is a disc 1116 secured to a shaft 1118. This disc carries four equally spaced rightwardly projecting studs 1120, and is normally held in one of four positions by a spring biased detent arm 1122 (Fig. 33), the angular nose 1123 of which is shaped to position the disc 1116 accurately in one of four positions.

As best shown in Fig. 15, the right-hand end of shaft 1118 bears in a bushing 1124 which is staked to the support plate 222. The right-hand end of the shaft 1118 is provided with an axially irregularly shaped hole such as a square cross section, to receive the complementally shaped shaft 1126, the right-hand end of which is cylindrical to bear in the frame support plate 224.

The square shaft 1126 forms the driving means for a four-toothed pinion 1128 which, as best shown in Figs. 8 and 15, may drive one of the A register pinions 204. As the square shaft rotates through 90°, one of the teeth of the pinion 1128 engages one of the teeth of the pinion 204 and drives the latter the distance of half a tooth pitch, whereupon the pinion is continued to be driven through the distance of the pitch by its associated spring pressed detent 206. The pinion 1128 is longitudinally slidable on the shaft 1126 and is moved by a rod 1130 which is secured to the frame 220 and is slidable in plates 224 and in a bushing 1132 secured in plate 222. A yoke or U-shaped bracket 1134 is fixed to the rod 1130 by a pair of spring keepers 1136 (Fig. 15), a washer 1138 being interposed between the two arms of the yoke 1134 to assure proper separation of these arms so that they do not cause unnecessary friction between them and the four-toothed pinion 1128.

It will be understood that when the A register actuating slide 1090 is in the position shown in Fig. 66, the pawl 1113 is in alignment with one of the studs 1120 so that the disc 1116 and shaft 1118 will be rotated clockwise in a subtracting direction, whereas when the slide is in the position shown in Fig. 67, these parts will be rotated in the opposite or adding direction.

The reference to adding in the A register means that the wheels of the A register are driven counterclockwise away from the zero position, whereas by subtracting is meant rotation of the pinion 204 back toward its zero position, as viewed in Fig. 8.

It will be recalled that the B register wheels 205 are mounted for rotation on a shaft 268 which is longitudinally slidable relative to the plates 224 and 262 (Fig. 14). There is a lost motion connection between the inner faces of a grooved screw 276 threaded in the end of shaft 268.

Thus after the B register is brought to its home position by the spring 278 (Fig. 15), the frame, including the plate 220, will continue to move about .080 of an inch to the right under the influence of spring 264. Therefore, the four-toothed wheel 1128 will be moved beyond the units order wheel 204 of the A register to the position shown in Figs. 14 and 15.

*Escapement mechanism as operated during dividing*

The shaft 1118 which is driven clockwise (as viewed in Fig. 10) during adding operations, and counterclockwise in subtracting operations, has a four-pointed star wheel 1140 pinned thereto. In the plane of this wheel there are a pair of wipe pawls 1142 and 1143 which are held in the position shown by a spring 1144 tensioned between them. The pawls 1142 and 1143 are pivoted on studs 1146 carried by a lever 1148. Each of the pawls has a motion limiting lug 1150 engageable with the edge of the lever 1148. The lever 1148 is pivoted on shaft 900. When the star wheel 1140 rotates clockwise, as in adding, the star wheel tooth engages the pawl 1142 and swings the lever 1148 counterclockwise from the position shown in Fig. 10, to the position shown in Fig. 21. The rearward end of the lever 1148 is provided with a pair of notches 1152 for engagement by a spring operated hook-shaped detent 1154. The rearward portion of the lever 1148 also has a rectangular notch 1156 into which projects the end portion 1158 of a first escapement arm 1160 (Figs. 10 and 22) which is pivoted on a stud 1162. The arm 1160 has a rearwardly bent lug forming a tooth 1164 which is engageable in the escapement rack 256.

When the star wheel 1140 is rotated counterclockwise and the lever 1148 is in the position shown in Fig. 21, one of its teeth engages the pawl 1143 to swing the lever 1148 clockwise from the position shown in Fig. 21 to the position shown in Fig. 10. This will result in the first escapement lever 1160 swinging downwardly to the position shown in Fig. 12.

The second escapement pawl 252 which is pivoted on a stud 1166, has a downwardly extending arm 1168 which overlies the rearwardly projecting lug and tooth 1164 of the first escapement pawl and is biased by a spring 1170 to move clockwise to bring its tooth 254 into engagement with the escapement rack 256.

*Escapement mechanism used primarily for multiplying*

In Fig. 16 the A register pinion 204 is shown displaced from normal position counterclockwise through an angle represented by one tooth, and the sliding stop 210 therefore lies in front of the stop 216 on the shaft 218. As the machine goes through the cycle which moves the pinion 204 clockwise, the four-toothed pinion 1128 will rotate counterclockwise and upon each operation rotates the pinion 204 subtractively one step so that during the first effective operating cycle following the time when the parts are in the position shown in Fig. 16, the pinion 204 will have moved to the position shown in Fig. 8, having thereby moved the stop 210 from the position in which it is shown in Fig. 16 to that in which it is shown in Fig. 8.

Referring to Fig. 17, the stops 210 are thus successively moved forwardly after each series of cycles in a particular denominational order has been completed. After the last adding cycle of the multiplying operation, the pawl 216 will be in the dotted line position and all of the stops 210 in their forward positions.

*Clearing stops 388 at end of division operation*

At the end of a dividing operation, a cam 18 secured to shaft 112 (Fig. 19) is rotated so as to bring its high point in engagement with a follower arm 1172. The arm 1172 forms part of a bail 1174 which is pivoted on a shaft 1176. The bail has a forwardly extending lug 1178 (see also Fig. 13) which underlies a projection 1180 formed on an arm 1182 which is pivoted on a stud 1184 and urged to swing clockwise by a tension spring 1186. As best shown in Fig. 19, the upper edge of the arm 1182 lies beneath the forward ends of the dividend stops 388 and swings their forward ends upwardly sufficient to release them from engagement with the U-shaped frame 390 so that they may be slid rearwardly by their springs 392.

*B register aligning bar operating mechanism*

The aligning bar 208 (Figs. 4 and 8) for the B register is operated in a novel manner, so that it remains in mesh with the B register pinions 205 until these pinions are fully in mesh with their actuating racks 892. The mechanism for accomplishing such operation of the aligner bar is best shown in Figs. 14, 73, and 74.

The aligning bar 208 has ears 1188 which are pivoted to the end frame plates 280 and 281. The aligning bar 208 is urged to swing into mesh with the pinions 205 by a strong tension spring 1190 (Fig. 14) anchored to a stud 1192 in the bracket 281.

Figures 73, 74:
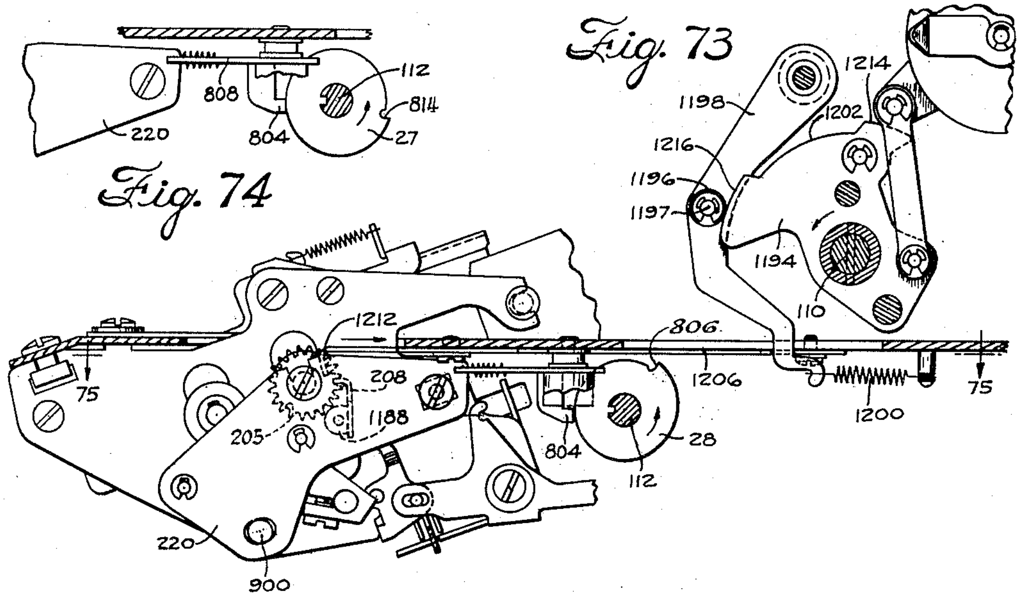
Fig. 73 is an elevational view, taken on the line 73—73 of Fig. 23, showing the multiplicand detent operating mechanism, the ribbon feed mechanism, the calculating stop cam set for division, and the calculating stop cam latch.
Fig. 74 is a fragmentary view showing the calculating stop cam positioned for multiplication, and the stop cam latch.

As best shown in Fig. 73, a cam 1194 is secured to the main shaft 110 and has a follower roller 1196 rotatable on a stud 1197 secured to an arm 1198 in engagement with its camming edge surface. As shown in Fig. 73, the parts are in normal position, but just prior to the rearward movement of the actuator racks the arm 1198 is swung counterclockwise by a spring 1200, the roller 1196 then engaging the reduced radius surface 1202 of the cam 1194. The lower end of the arm 1198 projects into an open end slot 1204 in a slide 1206 guided for back and forth movement on a pair of studs 1208 and 1209 which project through elongated slots 1210 and 1211.

The forward end of the slide 1206 has a hook-shaped lug 1212 adapted to project over the upper edge of the aligner 208 when the B register assembly is in mesh with the racks 892. After the actuators have completed their rearward movement, the high cam portion 1214 reaches the roller 1196 and the slide 1206 is permitted to move forward to permit reengagement of the aligning bar 208 with the teeth.

During the commencement of the return stroke of the main shaft 110, it is necessary to move the aligning bar so that the pinions 205 may be rotated in subtotal operations. The roller 1196 engages the reduced radius edge 1202 of the cam 1194 and the aligning bar 208 is again withdrawn from engagement with the pinions 205. Near the end of the return stroke, and while the pinions 205 are still in mesh with the racks 892, the large radius edge 1216 again engages the roller 1196 and permits re-engagement of the aligning bar 208 in the spaces between the teeth of the pinions 205.

The rise and fall portions of the cam 1194 between the edge 1202 and edges 1214 and 1216 are rather steep so that the operation of the aligning bar 208 is very rapid, and because the aligning bar is always in mesh with the pinions 205 except when the latter are fully in mesh with their actuating racks 892, it is apparent that there is no possibility of accidentally shifting the pinions 205 from their correct positions due to inertia. This is especially important, because when the wheels 205 are in a position such that their zero stop teeth 219, are in engagement with the divisor stop slides 282, the springs 283 (Fig. 8) exert a force which would tend to rotate the wheels 205 counterclockwise were these wheels not at all times either fully engaged with the actuator racks 892 or engaged by the aligner 208.

Each of the pinions 204, in addition to being provided with a lug 212 for engagement with its associated slide 210, has a diametrically oppositely spaced lug 213 (Fig. 8), and each of the pinions 205 has a similar sidewardly extending tooth or lug 217, these lugs being engageable with zero stop projections 1222 and 1223 (Figs. 10 and 11) formed on zero stop members 1224, these members having their forward ends engaged in slots suitably formed in the guide bracket 1226 and having their rearward ends slotted to engage over a fixed annular grooved rod 1228. The slotted bracket 1226 also forms the foremost guide and support for the racks 892. The rearward ends of the racks 892 are carried by headed studs 1230 (Fig. 8) riveted in the forward end of the actuators 80, and which slide in slots 1232 formed in the racks 892 to permit limited sliding movement. Springs 1234 stretched between the forward end of the actuators 80 and ears 1236 formed on the rearward ends of the racks 892 tend to take up this slack. This slack is required because the actuators 80 are returned forwardly beyond zero position. It is not desirable to return the racks 892 beyond the zero position and a fixed stop rod 1238 is therefore provided as a forward limit stop for the racks 892.

It will be noted that any force due to engagement of the register pinions 205 with the racks 892 is transmitted substantially directly to the rigid rod 1228 so that there is no tendency of such force to buckle or strain the racks 892. Similarly, any generally vertical upward force applied to the racks 892 due to engagement of the pinions 204 with the racks 892 is taken up mostly by the guiding bracket 1226 and also by the rod 1228.

*Controls set by the constant key 64*

The constant key 64 (Figs. 41 and 42) is secured to a bell crank stem 1242 which is pivoted on a stud 1244 and has a rearwardly extending arm 1246 having a stud 1248 extending sidewardly therefrom. To set the machine for multiplying or dividing by a constant, the key stem 1242 is manually moved from the position shown in Fig. 41 to the position in which it is shown in Fig. 42, and is held in either position by a spring biased detent arm 1250 having a pair of notches 1252 engageable with a stud 1253.

The stud 1248 normally rests in a V-shaped notch 1254 formed in a forwardly facing edge of an arm 1256 which is pivoted on a lever 1262 and is biased for clockwise movement by a spring 1258. When the key 64 is moved to the position shown in Fig. 42, with the stud 1248 engaging the V-notched surface, the spring 1258 exerts a force tending to move the arm 1256 upwardly. However, when the machine is not operating, such movement is prevented by the engagement of a forwardly and upwardly extending stop part 1260 of the lever 1262 with a stud 1264 secured to the rock plate 800. The rock plate 800 is held in either of two positions by a notched detent arm 1266 which is spring biased and operated in the same manner as the detent 1250.

The lever 1262 has a forwardly and downwardly extending stop portion 1268 which, in normal multiplying and dividing operations, cooperates with a stud 1270 to prevent downward movement of the forward end portion of the lever 1262. The rearward end of lever 1262 is pivotally secured to a cam follower lever 1082 which, as previously described, is pivoted at 1081 and cooperates with cam 195. Thus the follower arm 1082 is free to oscillate under the influence of the cam 195 and spring 1094 whenever the machine is performing a calculating operation and the stop arm 1074 is lowered as previously described.

As best shown in Figs. 5 and 10, the leftmost zero stop member 1224 has an aligner bar 1276 secured thereto, and as shown in Fig. 5 the left-hand end of this aligner bar is carried by a member 1278 which is similar in shape to the zero stops 1224, is similarly mounted, and is adapted to hold pinions 205 in alignment when the aligner bar 208 swings out of mesh with the pinions 205 of the B register and when the pinions are moved beyond the leftmost actuator rack 892.

When the B register is moved to the left one or more stops, the square bar 258 (Figs. 4, 9, 12, and 13), which moves with the B register, will provide a zero stop for the depending stop portions 384 forming parts of the actuators 80. Thus such of the actuators as do not have their racks 892 in mesh with pinions 205 during certain parts of the operating cycle will be held from movement beyond zero position by the wide portion of the shaft 258, it being noted that this shaft has an elongated notch 1280 (Fig. 13) normally in alignment with the depending stops 384 which have their associated pinions 205 in position for engagement with one of the racks 892.

AUTOMATIC SUBTOTAL AND TOTAL TAKING

A feature of the machine which is of considerable value in saving time and effort on the part of the operator is that of automatic subtotal and total-taking, whether debit or credit. This is accomplished (Figs. 80 to 83) by shifting the total and subtotal key 54 automatically to either subtotal or total position, depending upon the position of the automatic total selection key 60, and occurs whenever the pin carriage 70 is in its home position and the motor bar 50 is depressed.

For example, in adding and subtracting operations, the operator, after entering the last item of a series of items to be added or subtracted, holds the motor bar 50 depressed, whereupon the machine will go through a subtotaling or totaling cycle, depending upon the position of the key 60. The mechanism for accomplishing this has been fully described, referring particularly to Figs. 76 to 88.

It may be pointed out here that means are provided to move the key 60 to automatic total position when the machine is going through some calculating cycles. This means is shown in Figs. 80 and 81, and comprises a lever 1308 pivoted on a stud 1310 and connected to the stem 606 by a link 1312. The lever 1308 has a downwardly and forwardly projecting arm 1314 which lies in the plane of cam 32 so that when this cam is rotated counterclockwise from the position shown in Fig. 81 through an angle of approximately 240°, the high point of the cam 32 will engage the arm 1314 and move it and key 60 to the position shown in Fig. 81, so that a total will be taken when the problem of division has been completed.

Except when the machine is in the course of performing calculating problems, the key 60 may be moved to either total or subtotal position at will. When in subtotal position (Fig. 80), the key 60 operates through its key stem 606 and link 612 to position arm 570 so that stud 564 lies in the notch 618, and may swing the arm 570 forwardly and thereby position the lower end portion 576 of link 574 over stud 601 so that during the early part of the succeeding cycle the stud 601 will raise the selecting link 574 and move the key 54 to subtotal position, and the machine will go through a subtotal taking cycle.

Similarly, when the key 60 is moved to its forward automatic total position (Fig. 81) the stud 565 will be in notch 568 and upon counterclockwise oscillation of the member 552 will swing the arm 570 rearwardly, bringing the hook portion 576 beneath stud 578 so that when the arm 598 is oscillated clockwise, link 574 will be pulled downwardly and swing the key 54 to total taking position.

It will be recalled that by the mechanism best illustrated in Figs. 37 and 82, the key 60 is automatically moved to totaling position when the total transfer multiply stop key 68 is depressed during multiplying operations, and automatically moved to subtotal taking position during dividing operations.

OPERATION.—ADDING AND SUBTRACTING OPERATIONS

Problems of addition and subtraction are performed in the usual manner, substantially as disclosed in the aforesaid patents to Thomas O. Mehan. The only difference is in the fugitive one inserting device, which operates upon an overdraft.

In the present machine, the mechanism for performing this operation is power operated from the main shaft so as to lessen the force required to depress the total key, as previously described, whereas in said prior patents power for inserting the fugitive one was stored up in some springs.

DIVIDING OPERATION

To aid in simplifying the description of the operation of the machine in the performance of a problem in division, it will be assumed that the problem to be performed is dividing the dividend 158 by a divisor 12, with the expected answer of 13 and a remainder of 2.

*First cycle*

The operator first swings the key 66 forwardly to divide position. This locks the repeat-nonadd key 56 (Fig. 37) and releases the transfer or multiply stop key 68, and through link 1046 and connected train moves the type carrier 1058 clockwise so as to bring the divide sign in position for a printing impression. It also allows lever 420 (Fig. 50) to swing clockwise, lowering stud 422.

The operator then presses the numeral keys 46 for the the numerals 1—5—8 in succession. When the first numeral key is depressed, the leftward movement of the pin carriage 70, through the mechanism previously described and shown in Figs. 51 to 55, permits the bell crank lever 464 and also the lever 436 (Fig. 51) to swing clockwise, thereby swinging shaft 478 counterclockwise and lowering the stud 472 (Fig. 50) on the lever 436. Thus with both studs 422 and 472 lowered, the arm 424 is free to be moved downwardly by its spring 432.

The counterclockwise movement of shaft 478 (Fig. 51) moves the parts connected therewith from the positions in which they are shown in Fig. 78, to the positions in which the parts are shown in Fig. 79, to disengage the automatic total-taking mechanism. The lowering of the stud 422 and the stud 472 (Figs. 45 and 50) permits the feed pawl 790 (Fig. 45) to move downwardly in position for engagement with the ratchet wheel 14 which rotates the cam shaft 112.

The operator next depresses the motor bar 50, which causes the machine to commence its first cycle. The depression of the motor bar through the previously described kinematic train moves the switch actuator link 512 downwardly (Fig. 76) to close the switch 176, and through arm 520 and shaft 523 and associated linkage operates the trip arm to release the one revolution clutch pawl 534. Shortly after the commencement of this first cycle, the stud 406 (Figs. 49 and 50) moves away from the end of the slide 410 and through engagement of lug 428 by downward and rearward projection 430 on the slide 410 swings the bell crank 438 (Fig. 48) clockwise to position the dividend stops 388 in line with depending stops 384 on the actuators 80 (Fig. 8).

Assuming the machine has eleven actuators 80, as shown in the drawings, the eight leftmost rack bars will be retained in zero position by the engagement of lugs 380 with shoulders 382 (Fig. 4) when the levers 360 are moved clockwise by the means shown in Fig. 48. The three rightmost racks will not be arrested by their associated lugs 380, but will continue moving rearwardly under the influence of their springs 848 as the restoring bail rod 850 swings counterclockwise. During the return of the eight actuators to positions forwardly of their zero positions by the clockwise movement of the arms 360, the downward projections 384 on the forward ends of the actuators 80 will engage the upwardly extending portions 386 of the dividend stops 388, and these eight stops will be latched in forward position, as shown in Fig. 19. At the end of the forward cycle of the machine, the dividend is printed by operation of the platen 92 against the type 86, which are set to the amount 158, together with the divide signal.

At the beginning of the return cycle, the C accumulator pinions 108 are brought into mesh with the actuating segments 100, and thereafter the actuators 80 are moved forwardly with the restoring bail rod 850 and by the tension springs 848 to the position in which they are shown in Fig. 4. During this return stroke the pin 406 (Fig. 50) re-engages the end 408 of the slide 410 and moves the latter forwardly, thereby returning the dividend stop frame 390 to its full line position against the stop pin 400 (Fig. 48). In addition, the cam shaft 112 will be moved through 72° by the pawl 790 from the position shown in Fig. 45.

Referring to Fig. 41, it should be noted that the roller 794 normally rests in one of the notches of cam 1, and that as the pawl 790 rotates the shaft approximately 55° so that the roller passes the first high point of the cam, the spring 802 will swing the lever 796 clockwise to force the cam and shaft 112 clockwise (Fig. 41) until the roller 794 rests in the next notch of the cam. During the return stroke the pin carriage 70 is returned to its home position, and incidental thereto any set stop pins 74 are elevated to their normal positions by the usual cam means.

Upon turning the cam shaft 112 72° clockwise from its normal position, in which it is shown in Fig. 41 (or counterclockwise in Fig. 79), the long radius portion of the cam 31 gets in front of the roller 548*a* and thus the subtract key 52 remains unlocked and the key 54 remains locked. (The A and B registers are not engaged during any portion of the first cycle.)

Incidental to the rotation of the cam shaft 112 (Fig. 29) the cam 8 engages the toe portion 725 of arm 724, swinging the lever 720 counterclockwise against spring 734, thereby permitting spring 726 to swing locking lever 728 clockwise to cause its pin 730 to engage in notch 733, thereby locking the key 66 in dividing position.

*Second cycle*

Before the second cycle, the operator enters the divisor 12 in the pin carriage and presses either the motor bar 50 or the subtract key 52 to cause the machine to commence its second cycle.

Early during the forward stroke, the pin 886 (Fig. 68) swings forwardly and permits spring 880 to pivot the lever 876 counterclockwise, thereby to disengage the wipe pawl 875 from the stud 877 to prevent engagement of the C accumulator on the return stroke. This is possible because the cam 24 has moved 72° counterclockwise from the position in which it is shown in Fig. 69. Near the end of the forward stroke, the divisor 12, together with the division signal, are printed.

Near the beginning of the return stroke the slide 928 moves rearwardly because cam 7 has been moved clockwise (Fig. 29) through an angle of 72°, permitting the stop finger 929 thereof to enter the notch in this cam. The upward projection 930 at the forward end of the slide 928 therefore engages the stud 924 and through the toggle linkage raises the B register shaft 268 to bring the pinions 205 into engagement with the racks 892.

As the pinions 205 rotate counterclockwise (Fig. 8) their stop lugs 219 move away from the upwardly extending parts 285 of the divisor stops 282 (Fig. 8), permitting the latter to move rearwardly from the position shown in Fig. 8 to the position shown in Fig. 19, so that their rearward end portions project into the path of the forward ends of the dividend stops 388 which were set during the first cycle, as best shown in Fig. 20. Also during the return stroke of the second cycle, the pawl 790 (Fig. 46) engages the ratchet wheel 14 and rotates the latter counterclockwise to the position in which it is shown in Fig. 46, in which position the movement is arrested by the engagement of the lug 804 on the arm 808 with the shoulder 806 of cam 28. As a result, the arm 796 cannot force the cam shaft to complete the full 72° shift, but instead, the roller 794 is arrested in the position shown in Fig. 46. Also during the return stroke of the second cycle, the high point of cam 17 (Fig. 62) wipes past the nose 322 of the three-armed lever 320 and moves this lever from the position shown in Fig. 60 to the position shown in Fig. 62, whereupon the lever 324 swings counterclockwise to latch the lever 320 in actuated position because lug 326 lies in the notch 328 of lever 324.

The rearward arm of the three-armed lever 320 engages one of the arms of the bail 314 (Fig. 60) and raises the latter, bringing the end of the pin 318 in front of the rearward arm 336 of lever 338. Thereafter, the roller on stud 284 of cam plate 195 engages the concave edge 286 of the arm 288 and swings the latter forwardly, thereby, through link 292, bell crank 294, and the yielding drive for the pin 318, swinging the forwardly extending arm 340 of the lever 338 clockwise to move the pin 342, which engages in slot 344, toward the left (Fig. 14) until the rightmost set dividend stop 388 (Fig. 20) engages the leftmost set divisor stop 282. By this means the B register, which, it is recalled, is carried by the frame which includes the square shaft 258, will be properly positioned laterally with respect to the accumulator, so that the registration of the divisor 120 in the B register will be in line with the registration 158 of the C register.

The four-toothed pinion 1128 (Fig. 15) moves with the frame 220 so as to be in alignment with the tens order pinion 204 of the A register.

The frame carrying the B register, which includes the rack 256, is locked in position by the escapement pawl 252, the pawl having passed freely over the teeth of the rack 256 until the rack was properly positioned. It is held in this position until the fifth cycle. Of course, during this return stroke, the pin carriage 70 and the pins thereof are restored to normal position.

Referring to Figs. 56 and 57, during the return stroke the cam 16 moves from the position shown in Fig. 58 to the position shown in Fig. 57, thereby disabling the platen operating and paper feed mechanism, as previously described. Also during the return stroke, the cam 26 (Fig. 70) will have moved sufficiently counterclockwise to permit the bell crank 750 to swing counterclockwise and to place its lug 748 in position beneath the end of the bail arm 746, thereby to lock the numeral keys 46 against depression, as shown in Fig. 71.

Furthermore during the return stroke of the second cycle, the cam 30 (Fig. 76) will have rotated counterclockwise sufficiently to permit the three-armed lever 818 to move clockwise and thereby depress the switch actuating link 512, and also cause the one revolution clutch tripping mechanism to be operated. The machine will therefore commence its third cycle automatically.

In addition, during this return stroke the cam 20 will have rotated clockwise (Fig. 63) a sufficient distance that the follower arm 838 of lever 840 will be adjacent the short radius portion of the cam and permit spring 842 to swing lever 840 counterclockwise to raise the latch plate 832 from in front of the stop lugs 78 of the actuators 80, so that during the following repetitive calculating cycles the actuators will not be restrained by the lock plate.

Also during the return stroke, the high point of cam 21 (Fig. 65) engages the follower arm 1016 of bell crank 1018 and by means of arm 1022 moves the slide 998 to the left, disengaging pin 1006 from contact with the transfer pawl 1008, thereby disabling the fugitive one inserting mechanism.

Also during the return stroke of the second cycle, the roller 1036 (Fig. 88) is moved into the notch of cam 33, permitting the spring 632 to swing link 1040 counterclockwise to cause its toe 1044 to lie beneath the pin 600 on the plate 598.

Also during the return stroke, the nose 1066 (Figs. 27, 28, and 41) drops into notch 1070 of cam 5, thus freeing the link 1080 for operation so that the slide 1090 will be raised and lowered during each following calculating cycle by the cam 195. Near the completion of the return stroke, the B register is disengaged from the racks 892, being pulled downwardly by springs 922 (Figs. 14 and 15).

*Third cycle*

It will be recalled that the motor switch actuating link 512 is in lowered position so that the third cycle will follow the second cycle automatically.

At the beginning of this third cycle, the shaft 596 (Fig. 89) oscillate clockwise to pull down the subtract link 1040, thereby conditioning the machine for a subtracting cycle.

Figures 31, 32, 90:
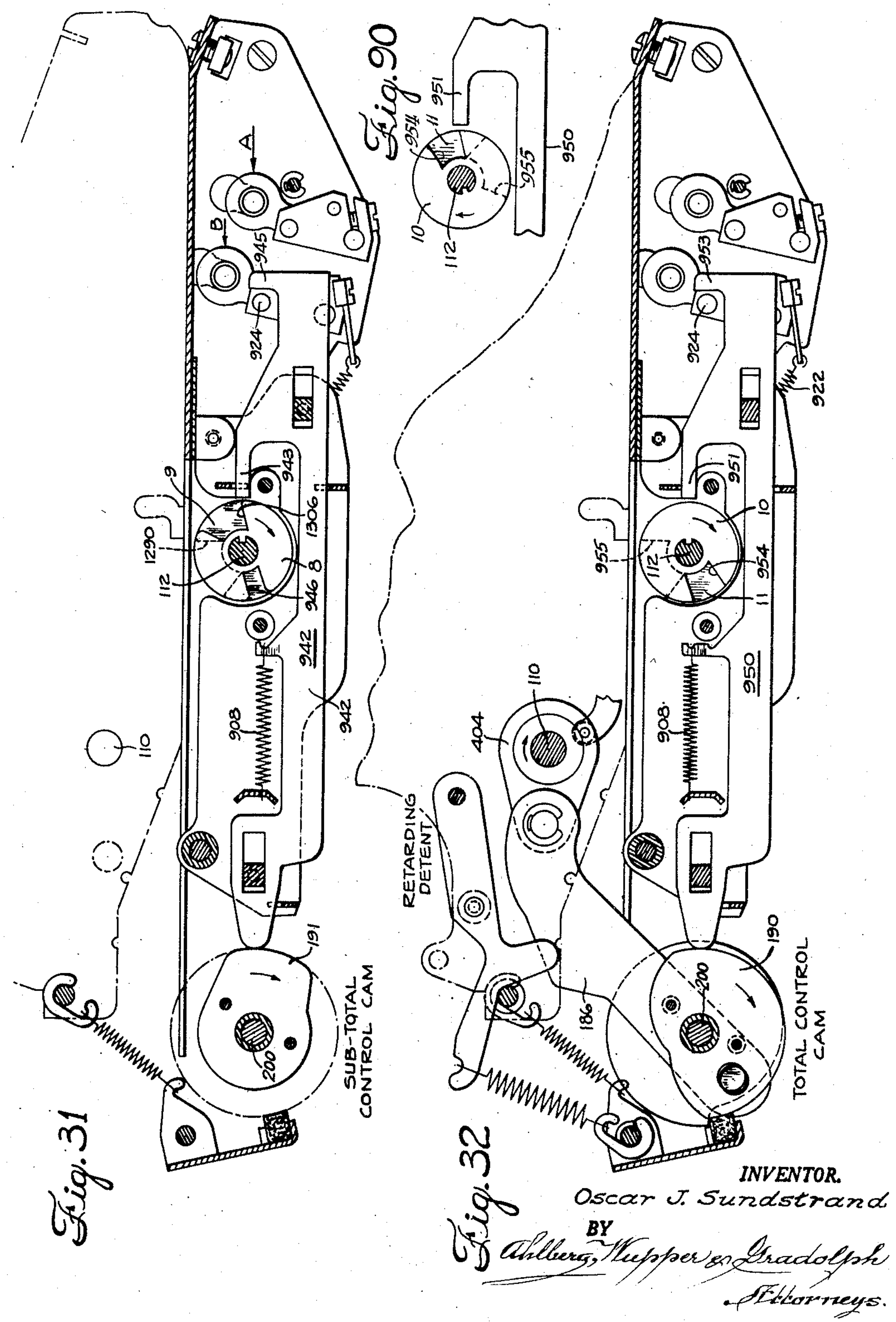
Fig. 31 is a sectional view, taken on the line 31—31 of Fig. 23, showing the multiplicand subtotal cam and divisor subtotal cam.
Fig. 32 is a sectional view, taken on the line 32—32 of Fig. 23, showing the multiplicand clear cam, divisor clear cam, drive link to main shaft, and the drive plate and drive link retarding detent.
Fig. 90 is a fragmentary sectional view of some of the parts of Fig. 32, shown in displaced position.

Also at the beginning of this forward stroke, the B register pinions 205 are brought into engagement with their racks 892 by the cam 191 and slide 942 (Fig. 31). Further during the beginning of this cycle, the cam 182 (Figs. 60, 62) gradually lowers the rear end of lever 324, swinging the forward end thereof upwardly a sufficient distance to permit the three-armed lever 320 to swing from the position in which it is shown in Fig. 62 to the position in which it is shown in Fig. 60, under the force of the compression spring 316, thereby moving the pin 318 downwardly, out of the path of the arm 336 of the lever 338.

The actuators 80 then move rearwardly, completing the forward stroke of the main shaft 110.

At the beginning of the return stroke, the C accumulator is engaged and the amount 120 will be subtracted from the C accumulator, and the tens order pinion 204 of the A register will be operated by the pinion 1128 the angular distance of one tooth, in effect to enter 10 in the A register.

During this cycle the star wheel 1140 shifts the arm 1148 from the position shown in Fig. 10 to the position in which it is shown in Fig. 21, thereby swinging the arm 1160 upwardly so as to bring its tooth 1164 into the space between the teeth of the rack 256 which was formerly occupied by the tooth 254 of the pawl 252.

In this cycle, and in all following calculating cycles during which subtraction is, in effect, being accomplished, the B register pinions 205 are retained in mesh with their racks 892 during the return stroke, in the manner of a subtotal-taking cycle of an ordinary adding machine.

*Fourth cycle*

In the fourth cycle, the machine operates the same as in the third cycle, in an endeavor to subtract 120 from the amount 38 in the C accumulator. This, however, results in an overdraft or credit balance in the C register, and as a result the highest order pinion 108 of the C register (Fig. 65) will be tripped so that the shaft 966 swings clockwise. As shown in Figs. 88 and 89, the shaft 966 carries the arm 1026 which, through the linkage shown in Fig. 89, swings the link 1040 clockwise to move its toe 1044 from beneath the stud 600. The machine is therefore no longer conditioned for subtraction. During this cycle, a 1 was added in the tens order wheel 204 of the A register so that the amount registered therein is 20.

*Fifth cycle*

The fifth or add-back cycle is an add cycle for the C register, and a subtract cycle for the A register. During the course of this cycle the C register is shifted rearwardly and through the linkage including the links 988, 1102, etc. (Fig. 66), pushes the pin 1096 rearwardly, swinging the slide 1090 so that the subtract pawl 1113 is in line with the studs 1120 on the disc 1116, thereby conditioning A register operating mechanism for reverse rotation of the shaft 1118.

Also during this cycle, a 10 is subtracted from the A register so that the amount registered therein is then 10. During this cycle the star wheel 1140 (Fig. 21) rotates counterclockwise to swing the lever 1148 clockwise to the position in which it is shown in Fig. 10, in the course of which the escapement pawl tooth 1164 is pulled away from the tooth of the rack 256 and the nose 254 of the pawl slides over the tooth of the rack to the next space and engages the next lower order tooth of the rack, positioning the B register in the next lower order position.

At the end of this cycle the amount 38 will again be present in the C accumulator.

*Sixth cycle*

The sixth cycle is similar to the third cycle, except for the fact that the B register is in a lower order position so that the amount 12 is subtracted from the C register, and the four-toothed pinion 1128 is in registry with the units order pinion 204 of the A register. As 1 is inserted in the A register, the star wheel 1140 is moved clockwise and the tooth of the star wheel 1140 engages pawl 1142 and swings the lever 1148 counterclockwise from the position shown in Fig. 10 to the position shown in Fig. 21, thereby again bringing the tooth of the pawl 1160 into the same position as shown in Fig. 22, but with the tooth 1164 in engagement with the next lower order tooth of the rack 256.

Thus after the completion of this cycle, the amount registered in the C accumulator will be 26, and the amount registered in the A register will be 11.

*Seventh cycle*

The seventh cycle is identical with the sixth cycle, except that at the end of this cycle the C register will have had 12 subtracted from its previous registration of 26 so that it will register 14 and the A counter will have had 1 added to make the register 12.

*Eighth cycle*

The eighth cycle is similar to the sixth and seventh cycles, differing only in the amount remaining in the C accumulator, which is 2, and the amount registered in the A register, which is 13.

*Ninth cycle*

The ninth cycle is an overdraft cycle, similar to the fourth cycle, at the end of which the C accumulator will register minus 10 and the A register will register 14.

*Tenth cycle*

The tenth cycle is similar to the fifth cycle, and at its conclusion an amount 2 will be in the C accumulator, and an amount 13 registered in the A register.

Near the end of the tenth cycle, the escapement is operated as previously described, releasing the escapement mechanism shown in Fig. 22, and permitting the frame carrying the B register and the fourth-toothed pinion 1128 (Fig. 15) to be moved to the right by the tension spring 264 (Fig. 14) until, as shown in Fig. 75, the frame plate 220 abuts the forwardly extending arm of bell crank 808 and moves the latch 804 away from the shoulder 806 of cam 28 (Fig. 46). The release of the cam 28 permits roller 794 to move downwardly under the tension of its spring 802 (Fig. 41) acting on lever 796.

*Eleventh cycle*

During the forward stroke of the main shaft, the B register wheels are engaged by the slide 950 as previously described. The cam 11 (Fig. 32) having rotated sufficiently so that the notch 955 thereof is in alignment with the feeler portion 951, permits the slide 950 to move rearwardly, thus raising the B register wheels into engagement with the racks 892.

Also on the forward stroke, the machine is conditioned for a nonadd cycle by the mechanism shown in Figs. 68 and 69, as previously described.

At the beginning of the return stroke of the main shaft, the B register will have been cleared of the dividend and its pinions 205 may therefore be disengaged. This is done by the slide 950 (Fig. 32) as it is moved forwardly by the cam 190, permitting the spring 922 to return the register pinions to their lowered or disengaged position.

On the return stroke the pawl 790 (Fig. 46) will engage the tooth of the ratchet wheel 14 and rotate the latter counterclockwise. It will be recalled that when the ratchet wheel is arrested in the position in which it is shown in Fig. 46 by the stop lug 804, the roller 794 rests on a tooth of the cam 1 so that the pawl merely moves from its full line to the dotted line position, missing the following tooth. However, when the stop lug 804 is moved out of engagement with the shoulder 806, the roller 794 is forced into the adjacent notch, advancing the cam shaft 112 approximately 17° counterclockwise so that the following tooth of this cam is now in position to be engaged by the pawl 790. During the return stroke of this cycle, this occurs, rotating the cam shaft 112 an additional 55°, whereupon the roller 794 is again on the sloping portion of the succeeding tooth of the cam 1, which forces the cam and the shaft 112 to move an additional distance of approximately 17°, so that the roller 794 then rests at the bottom of the next notch in the cam 1.

This additional rotation of the cam shaft 112 positions its cam 16 sufficiently clockwise from the position shown in Fig. 57, to permit spring 786 to swing plate 782 clockwise and thus to slide link 778 to the position shown in Fig. 56, pulling the arm 764 counterclockwise to cause engagement of the notch therein with the pin 762, thus conditioning the paper feed mechanism and printing mechanism for operation on the subsequent cycle.

Such additional rotation of the cam shaft 112 also brings cam 21 (Fig. 65) to a position where the spring 1024 may slide the member 998 to the right, thus positioning the stud 1006 in front of the edge 1007 of the transfer pawl 1008.

This further rotation of the shaft 112 causes cam 18 (Fig. 19) to swing the follower arm 1172 of bail 1174 clockwise, causing the plate extension 1178 thereof (Fig. 13) to swing upwardly and raise arm 1182 and cause it to elevate the dividend stops 388, whereupon such of these as have been set are drawn rearwardly by their associated springs 392.

In addition, as the shaft 112 makes this additional angular advancement (clockwise in Fig. 27) the pawl 1066 is cammed out of the notch 1070 in cam 5, thereby bringing the end of the stop latch 1074 in front of the lug 1076 and thereby preventing forward movement of the link 1080 which, it will be recalled (Fig. 41), reciprocates the actuating slide 1090 for the A register.

Under certain conditions, the stop lug 1076 may be advanced forwardly from the position in which it is shown in Fig. 41, and if the pawl 1066 is forced out of the notch 1070 under such conditions, the top edge of the end of the latch 1074 will engage the lug 1076, but such engagement will not interfere with the outward movement of the pawl 1066, because the stop latch 1074 is permitted to move against the yielding of a spring 1075.

*Twelfth cycle*

At the beginning of the forward stroke of the main shaft, the slide 926 (Fig. 25) moves rearwardly as the cam 194 rotates, and its stop finger 927 will be in alignment with the notch of cam 3, so that the hook portion of this slide may engage the stud 902 of the toggle mechanism which causes the A register pinions 204 to move into mesh with the racks 892.

The actuators and racks 892 then move rearwardly, rotating the A register pinions 204 to zero position and then printing the quotient which was registered therein, namely 13. During this forward stroke the cam 24 (Fig. 69) is in the position such that one of the notches thereof is in alignment with the feeler arm 882 and therefore the machine will be conditioned for nonadd, as previously described.

At the beginning of the return stroke, the A register will be disengaged as the slide 926 moves forwardly (Fig. 25) and the springs 914 pull the register wheels downwardly from engagement with the racks 892.

Also during the return stroke of this cycle, the pawl 790 operates to rotate the cam shaft counterclockwise through approximately 55°, which is supplemented by the operation of the roller 794 against the cam 1 so as to make a complete movement of 72° counterclockwise (Fig. 46). This additional rotation of the cam shaft 112 to its fourth position (288° counterclockwise from its normal position) permits lever 548 to swing clockwise to the position in which it is shown in Fig. 78, thereby reconditioning the machine for a total-taking operation.

*Thirteenth cycle*

During the thirteenth cycle, the machine will operate in a normal total-taking manner to print the remainder of 2 and clear the C accumulator. During the return stroke, the pawl 790 engages the ratchet wheel 14 (Fig. 46) and advances the cam shaft 112 counterclockwise to its home position, at which time the lock plate 846 is released by virtue of the fact that the toe 838 of feeler arm 840 has been cammed to the high point of cam 20, as shown in Fig. 64. In this cycle the cam 18 is moved to the position shown in Fig. 8, permitting the bail arm 1172 to move from the high portion of the cam 18 to the low short radius portion thereof so that it is in position to be reoperated in some subsequent cycle.

Furthermore, during the movement of the cam shaft 112 to its home position the cam 30 on this shaft (Fig. 76) cams the three-armed lever 826 counterclockwise to permit the switch actuating link 512 to be spring returned to its "normal" position, thereby opening the switch 176, causing disengagement of the one revolution clutch and stopping of the motor.

The final counterclockwise rotation of the shaft 112 (Figs. 70 and 71) causes the cam 26 to swing the lever 750 clockwise to permit the bail rod 740 to move downwardly, unlocking the numeral keys 46.

The record tape will thus have printed upon it a complete record of the problem, as follows:

÷ 1.58 (Dividend)
÷ .12 (Divisor)
÷ .13 (Quotient)
÷ 2 T (Remainder)

DIVIDING BY A CONSTANT

Frequently the operator is presented with a series of problems in which different dividends are to be divided by the same divisor, which has been herein termed a "constant." For example, if there are 158 articles and the operator is to find out how many dozens there are, the machine may be operated as above, but the constant 12 retained, so that the operator may go through any number of additional problems to find out how many dozens of articles there are in a given number of units without having to reinsert the divisor.

To accomplish this, the operator depresses the numeral keys 56 to enter the dividend 158 into the C register in the manner described above under "First cycle." Then, either before, or during the cycle, the operator may move the key 64 forwardly to the "constant" position shown in Fig. 42. After this first cycle is completed, the second or divisor entering cycle is instituted as set forth above under "Second cycle."

During the third cycle, the stop 1074 (Fig. 41) is lowered so that the link 1080 may move to the right and left by the cam 195 acting through the arm 1082, as previously described. The third to the tenth cycles during the operation of dividing by a constant follow the second cycle automatically, and are the same as those previously described for division.

In the eleventh cycle, due to the fact that the cam 11 (Fig. 32) has been caused to advance to the position shown in Fig. 90, the notch 955 thereof has passed beyond the feeler 951, the latter will not enter the notch, and therefore the B register will not be cleared as it is during the eleventh ordinary dividing cycle. Therefore, the operation during the eleventh cycle will differ from that of the previous cycle only in that the divisor remains in the B register instead of being cleared therefrom.

The twelfth and thirteenth cycles are the same as those of ordinary division described above. It will be recalled that the divisor is still retained in the B register after the completion of the problem in this manner.

Assuming that the next problem is to divide 1469 by the constant divisor 12, the operator need merely press the numeral keys to insert the amount 1469 and press the motor bar to initiate the first cycle, whereupon the machine will enter that amount in the accumulator C, print the amount, continue with the second cycle automatically, and print the constant divisor 12. In this problem the second cycle corresponds to the third cycle of the first problem in dividing by a constant, because in solving the second problem it was not necessary to re-enter the divisor, thus shortening the solution of the second problem by one cycle.

Due to the fact that the machine has been set for dividing by a constant, the roller 794 (Fig. 42) has been moved forwardly of the vertical plane passing through the axis of shaft 112 approximately one-sixteenth inch, and thus the cam shaft 112 will have been rotated clockwise through an angle of 88½° (72 plus 16½). When the cam shaft 112 is thus rotated to the position shown in Fig. 42, a notch 1290 in cam 9 (Fig. 31) will be in alignment with the feeler 943 of the slide 942 so that the B register will be brought into engagement with the racks 892 for a subtotal operation.

It will be apparent from Figs. 63 and 64 that when the cam shaft 112 and cam 20 are rotated 88½° clockwise from the position shown in Fig. 64, the lever 840 will be free to swing counterclockwise and thus its upper end portion 844 will raise lock plate 832 above the level of the lugs 78 on the actuators 80 and thus permit the latter to travel rearwardly to effect the taking of the subtotal from the B register.

Thereafter, all the cycles are automatic in the same manner as described above for the ordinary division problem, and in the second last cycle the quotient 122 will be printed. In the last cycle the remainder of 5 will be printed. It will be noted, however, that it will require fifteen cycles because the sum (5) of the digits in the quotient of this second problem in dividing by a constant is one greater than the sum (3) of the digits in the quotient of the first problem in dividing by a constant. Therefore, two additional cycles will be required, one for the additional overdraft cycle, and one for the additional add-back cycle.

Prior to the completion of the last problem involving a constant divisor, the operator moves the constant key 64 to normal position shown in Fig. 41, whereupon the solution of the problem will be completed by the machine in the same manner as the ordinary division problem described above.

MULTIPLYING OPERATION

*First cycle*

To perform a problem in multiplication, the operator moves the multiply-normal-divide key 66 rearwardly to multiplying position and enters the multiplicand in the B register by depressing the numeral keys and then the motor bar. It will be recalled that when the multiplier key 66 is set to multiply position the nonadd key 56 will be locked by lever 670 (Fig. 37) and the signal printing logotype 1072 (Fig. 40) will move to place the multiply signal type "×" in printing position. Such movement of the key 66 will also move the cam shaft 112 to the right, as shown in Fig. 36, by the previously described mechanism which is best shown in Figs. 33 and 34. Thus some of the slides (e. g., 928, Fig. 30), and other parts which cooperate with the cams, will be adjacent different cams.

The shifting of the key 66 to multiply position also causes a forwardly and upwardly extending arm 1292 (Figs. 33 and 34) to engage a stud 1294 at the upper end of the A register actuating slide 1090 (Fig. 34). Thus when the link 1102 is moved to the right (Fig. 33) the spring 1104 cannot swing the slide 1090 counterclockwise and the pawl 1113 is maintained in operative position so that as the slide reciprocates, the disc 1116 and shaft 1118 will be rotated clockwise, causing subtraction in the A register.

Referring to Fig. 68, it will be noted that cam 23 is normally in position so as to provide a nonadd operation in the manner previously described.

As a result of moving the key 66 to multiply position, lever 420 swings clockwise from the position in which this lever is shown in Fig. 49, to the position in which it is shown in Fig. 50. The arm 424 will rest upon the top of cam 12 and will not swing downwardly as in division. Therefore, the arm 424 will not be pushed rearwardly, because the lug 428 will be above the path of movement of the projection 430 on the arm 424, as shown in Fig. 49. As a result, the dividend stops 388 will remain out of alignment with the stops 384, as shown in full lines in Fig. 48.

In describing how the machine is operated in performing a problem of multiplication, a specific problem will be used as an example, namely, the problem of multiplying 25 by 101. The operator depresses the numeral keys 2 and 5 and the motor bar 50, to enter the amount 25 in the B register. As previously described, the feeler 929 of the slide 928 (Fig. 30) is in position to enter the notch 1296 in cam 6 so that the slide 928 may cause engagement of the B register pinions with the racks 892, to enter therein the amount 25 in the pin carriage 70. Also, through the previously described mechanism, best shown in Figs. 51 to 55 and 78 and 79, the total key 54 and the subtract key 52 are locked and the total-taking mechanism is disengaged by the parts best shown in Fig. 79. During this cycle, the symbol "×" and the multiplicand 25 are printed on the record tape.

During the return stroke of the first cycle, the cam shaft 112 is rotated approximately 72° counterclockwise from the position shown in Fig. 6 to the position shown in Fig. 16, thereby rotating shaft 218 clockwise, through levers 230, 242, and 226, so as to bring the stop lug 216 upward to the position in which it may engage projected stop slides 214.

*Second cycle*

The operator then enters the amount 101 in the keyboard and presses the motor bar, whereupon the second and all succeeding cycles of the machine will take place automatically. In this second cycle, the amount 101 is entered into the A register by virtue of the fact that the notch 1298 (Fig. 28) in cam 4 is in alignment with feeler 912 of the slide 906. Thus slide 906 may commence moving rearwardly at the end of the forward stroke of the second cycle and bring the A register pinions into mesh with the racks 892. The units and hundredths actuators 80 will move rearwardly one tooth, and upon the return stroke the A register will be engaged and the pinions in the units and hundredths order will each be rotated one tooth counterclockwise to the position shown in Fig. 16, in which position the lugs 212 will move rearwardly, permitting the springs 283 to project the stops 210 to the position shown in Figs. 16 and 17. Near the end of the forward stroke, the symbol "×" and multiplier 101 are printed on the record tape.

During the second multiplying cycle the motor bar 50 is locked in depressed position by the hook 650, 652 (Fig. 86) and it remains in this position until the machine has completed the calculating cycles, whereupon cam 32 engages the toe 660 of lever 654 to withdraw the key locking hook levers 650 and 654.

During the return stroke of this second cycle, the frame which includes rack 256 and frame plates 220 for the B register, is moved fully to the left, in which position it is stopped by the engagement of washer 275 (Fig. 14) with the bushing 1302 which supports the left-hand end of shaft 268. The mechanism for accomplishing this (as previously described in connection with the second cycle of division) is operated by the roller on stud 284 operating against edge 286 (Fig. 60) of follower arm 288 so the the connecting arm 340 is swung from the position shown in Fig. 59 to the position in which it is shown in Fig. 61, in the manner previously described.

*Third cycle*

The third cycle follows automatically upon the completion of the second cycle, as in solving a dividing problem. The roller on stud 284 passes beyond the end of the arcuate edge 286 of follower arm 288, permitting spring 264 (Fig. 61) to move the rack 256 and frame 220 to the right until, as shown in Fig. 17, the stop lug 216 engages the nose of the set stop 210 in the hundredths order. Thereafter, the lug 326 (Fig. 62) is freed to permit the three-armed lever 320 to swing clockwise and permit pin 318 to move out of the path of the arm 326 of connecting arm 340.

During the third cycle the machine is conditioned for nonadd and nonprint by the mechanism shown in Figs. 56 to 58, under the control of cam 15.

During this third cycle, the cam shaft 112 is so positioned that the high edge of cam 4 (Fig. 28) is opposite the feeler 912 so that the A register is not engaged. The high edge of cam 8 is behind the feeler 943 (Fig. 31) so that the slide 942 cannot move rearwardly and thus the B register will not be engaged during this cycle. On the return stroke of the third cycle, the cam shaft 112 is advanced counterclockwise to the position shown in Fig. 47, which is approximately 199° counterclockwise from its normal position. In this position it is arrested by engagement of stop shoulder 814 on cam 27 with the stop lever 804 which forms part of arm 808. The ratchet wheel 14 is therefore advanced to the position where, as in the dividing operation, the pawl 790 cannot engage any of the teeth of the ratchet wheel 14. The machine is now in condition to multiply.

*Fourth cycle*

During the fourth cycle, the B register is brought into mesh for subtotal taking and the C register is brought into mesh on the return stroke to enter 2500 therein. Due to the operation of the slide 1090, which is in its clockwise position shown in Fig. 41, the shaft 1118 is rotated clockwise (Fig. 41) or counterclockwise, as viewed in Fig. 8, to turn the pinion 204 clockwise, subtracting 100 from the A register, and causing its lug 212 to engage the nose 211 of stop slide 210 and move the latter out of stopping position. This permits springs 264 and 278 to move the frame 220 to the right two steps, where it is arrested by the rightmost or units stop slide 210. If the multiplier chosen did not have the zero therein, the stop 210 second from the right (Fig. 17) would have been projected and the frame 220 would have moved only one step to the right.

Whenever the multiplier has zeros therein, the frame 220 will be stopped at positions corresponding to the denominational orders in which there is a digit entered. Thus, in performing a great many problems of multiplication, the machine is required to go through fewer cycles than are required by machines of the prior art.

*Fifth cycle*

In the fifth cycle, 1 is subtracted from the A register (because the frame 220 has moved two spaces to the right), in the same manner as 100 was subtracted from this register in the fourth cycle, and 25 is added into the C register in the same manner as 2500 was added in the fourth cycle, so that the C register now contains the product 2525.

At the end of the fifth cycle, as the frame 220 strikes the lever 808 (Fig. 75), it moves the lug 804 thereof (Fig. 47) out of the path of the stop face 814 so that the lever 796 may rotate the cam shaft 112 16½° counterclockwise, as viewed in Fig. 47, thus conditioning the machine for the sixth cycle.

*Sixth cycle*

In the sixth cycle the B register is cleared by virtue of the fact that the notch 954 of cam 10 (Fig. 32) is in alignment with the feeler 951, permitting slide 950 to move rearwardly during the forward stroke and thus engage the B register pinions and clear the B register. The B register pinions are disengaged from their racks 892 as the cam 190 (Fig. 32) pushes the slide 950 forwardly, permitting springs 922, through the toggle linkage, to move the B register pinions downwardly.

As the cam shaft 112 is rotated in the sixth cycle, the high edge of cam 15 (Figs. 56 to 58) passes the finger 779 of slide 778, permitting spring 786 to swing arms 764 upwardly into engagement with the pins 762 so that on the following cycle paper feeding and printing will take place.

*Seventh cycle*

During the seventh cycle the C register is cleared and the product 2525 with the symbol "T" is printed. In this cycle neither the A register nor the B register is brought into mesh, so that this cycle is the same as a normal total-taking cycle during adding operation.

On the return stroke of the seventh cycle, the pawl 790 engages the tooth of ratchet wheel 14 (Fig. 46) and advances the cam shaft to its home or normal position, thereby, through cam 32 (Fig. 85) releasing the motor bar 50, thus disengaging the motor trip mechanism, and through cam 19 (Fig. 63) permitting the lock plate 832 to swing downwardly. The nose 758 (Figs. 71 and 72) of arm 756 is on the high point of cam 25, unlocking the keyboard.

The rotation of the cam shaft 112 to home position also permits the end portion 725 of arm 724 (Fig. 30) to drop into notch 1296, thereby removing the stud 730 from notch 732 and permitting the key 66 to be restored to normal position.

MULTIPLICATION BY SUBTRACTION

In certain instances it is desirable to multiply "by subtraction." For example, in keeping an inventory it may be desirable to enter the previous cost and then subtract from this various multiples of the unit price. To solve problems of this character the unit cost of the articles is entered in the B register automatically during the first cycle, due to the setting of the multiply-divide key 66. The number representing the quantity of the articles to be subtracted from the record of inventory is entered into the A register automatically as a result of the setting of the key 66. Negative multiplication is accomplished upon depressing the subtract key so that the machine then contains a product or subtotal of the negative sign. The previous cost of the entire inventory may then be entered in an adding sense, and the motor bar depressed to secure the difference between the subtotal and the prior balance. For example, the operation might result in a tape as follows:

× 1.25 (Multiplicand)
× .12— (Negative multiplier)
× 15.00 S C (Negative product subtotal)

× 125.36 (Adding operation)
× 110.36 T (Total)

An operation of this character is the same as an ordinary multiplying operation, except that the subtract key is operated instead of operating the motor bar 50 in the calculating operation. In the calculating cycles of such operation the subtract key 52 (Fig. 87) is held depressed by the upper hook portion 662 of the key locking lever 654, locking over the stud 495, which is secured to the stem 486 of the subtract key. In other respects operations of multiplying by subtraction are the same as multiplying by addition.

MULTIPLICATION BY A CONSTANT

In many instances it is desirable to solve a series of problems of multiplication in which one factor is a constant. In solving such problems by the use of this machine, the constant key 64 is pulled forwardly to constant position and the constant entered into the B register in the same manner as was done in the first cycle of ordinary multiplication.

Assuming that the constant factor is 25, as in the preceding multiplying example, all of the cycles, including the fifth, will be the same as in the ordinary multiplication described above, except that in the third cycle the roller 794 (Figs. 41 and 42) is moved forwardly of the vertical plane passing through the axis of the shaft 112, so as to rotate this cam shaft 16½° clockwise (Fig. 42) to the position in which it is shown in Fig. 42, so that during the sixth cycle the feeler 951 (Fig. 32) will engage the high portion of the cam 10, as indicated in Fig. 90, and slide 950 will be prevented from moving rearwardly, and the B register will thus be prevented from being engaged with the racks 892 and will not be cleared. In other respects the sixth cycle in this operation will be the same as the sixth cycle previously described in the ordinary multiplication operation.

The seventh cycle is the same as that in ordinary multiplication, except that at its conclusion the multiplicand is still registered in the B register. Due to the fact that the roller 794 (Fig. 42) is in its forward position, the shaft 112 will have been rotated 16½° clockwise in Fig. 42, at the end of the fourth cycle, and will remain in this position as long as the constant remains in the B register. The cam 29 on the shaft will therefore be advanced counterclockwise (Fig. 77) to a position such that the toe 816 of lever 818 will be pulled into the notch 1304 of the cam 29 and thus through spring 820 maintain the switch actuating link 512 downwardly so that the machine will go through the first cycle of the next problem automatically. In this cycle, the cam 19 will have been advanced 16½° clockwise from the position in which it is shown in Fig. 63, so that the lock plate 832 will be raised, permitting the racks to move rearwardly and cam 8 will have rotated clockwise sufficiently to bring its notch 1306 (Fig. 31) adjacent the feeler 943 and permit the slide 942 to be moved rearwardly by spring 908 as the cam 191 rotates. Thus, the first cycle of the second problem is completed by bringing the B register in engagement with the racks 892 in both forward and return strokes, printing the constant at the end of the forward stroke, and the machine is in condition for entry of the multiplier of the next problem which is to be multiplied by the constant.

When the machine is about to be used to solve the final problem using the constant multiplicand, the constant lever 64 is swung rearwardly and the last problem entered and completed in the same manner as the second problem of multiplying by a constant. However, the fact that the constant lever was moved rearwardly results in the movement of the lever 796 rearwardly to the position in which it is shown in Fig. 41, in which the roller 794 is approximately one-sixteenth of an inch rearward of the vertical plane through the center of shaft 112. As a result of this movement of the roller 794, the last three cycles of the last problem will result in a series of cycles similar to the last three cycles in ordinary multiplication.

By using this method of operation of the machine, the operator may, when confronted by a certain series of problems, save considerable time by avoiding the necessity of repeatedly entering the multiplicand in the B register.

AUTOMATIC TRANSFER OF TOTAL IN MULTIPLICATION

On some occasions it is desirable to total a series of figures and to use this total as a multiplicand for a multiplying problem, or as a constant multiplicand for a series of multiplying problems. Means are therefore provided whereby the total accumulated in the C register may be transferred to the B register. This is accomplished by mechanism best shown in Figs. 51 to 55, and 82.

When the key 66 is shifted to either multiply or divide positions, the key 68 (Fig. 38) is unlocked and may be depressed. If the key 66 is in its rearward multiply position, the depression of the total transfer multiply stop key 68 will cause the edge 704 of the arm 692 to engage lug 705 on rocking lever 708 to turn the latter counterclockwise (Figs. 37 and 39) and thereby, as previously described, swing the total-subtotal key 60 from subtotal to total-taking position. Depression of the key 68 also causes the forwardly and rearwardly tapered portions 688 to engage the sidewardly extending lug 459 (Fig. 55) and swing the latter to the position shown in said figure, thereby swinging depending arm of pawl 458 sidewardly to the position shown in Fig. 55, thereby permitting the bell crank 436 (Fig. 51) to swing clockwise, which raises the forward end of this bell crank 436 from engagement with the sidewardly extending lug 940 of bell crank 938 and allows spring 932 to swing the bell crank lever 934 upward about its pivot 1308 (Fig. 30), thereby moving the stop portion 936 thereof from the path of the upwardly extending lug 930 on slide 928. This also, through the mechanism best shown in Fig. 45, permits the pawl 790 to drop into feeding position with respect to the ratchet wheel 14. This will result, upon pressing the motor bar with nothing entered in the keyboard, in a cycle similar to the first cycle of ordinary multiplication, except that the actuators 80 will be stopped by the clearing of the C register instead of being stopped by the stop pins 74 in the stop pin carriage 70.

With respect to the C register, the first cycle is the same as a total-taking operation, because the actuating racks for the C register pinions are disengaged at the beginning of the return stroke so that the C register will be cleared, and as a result the amount formerly entered in the C register will be transferred to the B register.

Following this cycle, the remaining cycles of the multiplying operation will be the same as in ordinary multiplication, or if the constant key 64 is moved to its forward constant position, the subsequent operations will be the same as those described with reference to multiplication by a constant.

MULTIPLIER STOP

After the first cycle of operation of the machine, when the key 66 is set for multiplication, the key 68 becomes effective as a means to stop a multiplying operation. In the event that the operator inadvertently enters the multiplicand after setting the lever 66 for multiplication, and then presses the motor bar, the machine will continue to recycle, because the cam shaft 112 cannot be advanced by the pawl 790 because the latter is held out of the path of the ratchet wheel 14 by the pin 472 on the bell crank 436 (Fig. 45). The latter, it will be recalled, swings clockwise only after an amount has been entered into the pin carriage 70, i. e., the latter has moved at least one space to the left (Fig. 52). When the button 68 is depressed, this releases the bell crank 436 to permit it to swing clockwise as previously described with reference to Figs. 51 to 54 and 37, and therefore the pin 472 is lowered to permit the pawl 790 to engage the ratchet wheel 14 and advance the cam shaft 112.

SETTING DIVIDEND STOPS BY THE TOTAL IN THE C REGISTER

Upon occasion it is convenient to use the total in the C register as the control for setting up the dividend stops 388 (Fig. 8). This is accomplished by depressing the button 68 which, as best shown in Figs. 37 and 82, results in the end portion 706 engaging lug 707 (Fig. 39), and through the crank rod 710 and link 714, moving the total-subtotal key to subtotal position as shown in Fig. 82. Depression of the button 68 through the sloping portion 688 (Figs. 51 to 55) permits bell crank 436 to swing clockwise, with the result that the arm 424 falls from the position in which it is shown in Fig. 49 to the position shown in Fig. 50. Then upon the forward stroke the end 408 of the slide 410 will be engaged by stud 406 to move the dividend stop frame 390 to the right by virtue of the fact that the lug 428 lies in the plane of the lug 430 so as to align the sliding stops 388 with the lugs 384 on the actuator bars 80. This automatically results in setting the required dividend stops by the mechanism best shown in Fig. 48.

After this, the operator will depress the numeral keys for the divisor, and upon operation of the motor bar the machine will automatically enter the divisor in the B register in the manner previously described, and will continue automatically to the third and subsequent cycles, as in a problem of division heretofore set forth in detail.

DIVISION STOP MECHANISM

If the operator by mistake enters a problem of division which is impossible of solution, as, for example, attempting to divide a dividend of 500 by zero, the machine would continue to cycle indefinitely, because no overdraft will ever take place and the machine will not have an opportunity to add back. To stop the machine under these circumstances, the operator need merely depress button 62. The operation of the machine upon depression of button 62 is fully described above under the heading "Division stop."

CONCLUSION

From the foregoing, it will appear that the machine is very versatile in the operations it may perform, and that all of this is accomplished by a very compactly arranged mechanism which may be housed in a casing of substantially the same size as that used for a simple listing adding and subtracting machine.

The principal feature of design which contributes to the compactness and relative simplicity of the mechanism is the use of the cam shaft 112 which, by its respective positions, conditions the machine for the several different operating cycles which the machine goes through in solving a large variety of problems.

Furthermore, this machine is believed to be unique in that the dividend, divisor, quotient, and remainder are printed in succession on the record tape, as distinguished from printing the digits of the dividend in the left-hand column of the machine, and similarly, in which the multiplicand, multiplier, and product are printed in immediate succession on the tape.

It is also believed to be unique in that it is capable of dividing by a constant as well as multiplying by a constant.

Likewise, the feature whereby the total of a sum of amounts may be used as the multiplicand of a succeeding multiplying operation, without the necessity of resetting the multiplicand by means of the numeral keys, presents time saving and error reduction advantages.

Another attractive feature is that in multiplication the machine will automatically skip all zeros to the right of a digit in the multiplier, thus reducing the number of cycles required for multiplying operations in which the multiplier contains one or more zeros.

This machine is different in that the divisor register moves from the highest order successively to the lower orders during the performance of a calculation in division, while in all other calculating machines the C register is moved, and in that it includes dividend stops which are set by the actuators.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an electric motor driven calculating machine having a plurality of registers and actuators therefor, means for engaging and resilient means for disengaging the registers and their actuators comprising a plurality of slides each of which is cooperable with one of the registers to move it into engagement with its actuators, resilient means for biasing the slides for movement in one direction, a shaft rotated through one revolution during each operating cycle of the machine, a plurality of operating cams secured to said shaft and cooperable respectively with the slides to move the latter in a direction opposing the resilient biasing means, and a cycle control shaft having a plurality of stop cams secured thereto positionable in cooperable relation with the slides and effective to prevent movement of the slides by their respective resilient biasing means.

2. The combination set forth in claim 1, in which the stop cams are in the form of notched discs, and in which the slides are provided with feeler projections each in alignment with one of the notched discs and engageable in the notch thereof, or with the peripheral portion of the disc.

3. The combination set forth in claim 1, in which there is a group of slides associated with each of the registers and in which the operation of any one of the group will cause engagement of the associated register.

4. The combination set forth in claim 1, in which the stop cams are movable with respect to the slides in a direction to bring different stop cams into cooperative relationship with the slides.

References Cited in the file of this patent

UNITED STATES PATENTS

| | | |
|---|---|---|
| Re. 22,947 | Clary | Dec. 9, 1947 |
| 1,333,277 | Niemann | Mar. 9, 1920 |
| 1,439,175 | Landsiedel | Dec. 19, 1922 |
| 1,861,618 | White | June 7, 1932 |
| 1,946,572 | Crosman | Feb. 13, 1934 |
| 2,141,269 | Ewald | Dec. 27, 1938 |
| 2,320,399 | Anderson | June 1, 1943 |
| 2,376,481 | Gubelmann | May 22, 1945 |
| 2,397,745 | Kiel | Apr. 2, 1946 |
| 2,609,145 | Reynolds | Sept. 2, 1952 |
| 2,620,129 | Kristenson | Dec. 2, 1952 |
| 2,661,151 | Goodbar | Dec. 1, 1953 |
| 2,668,011 | Anderson | Feb. 2, 1954 |
| 2,681,767 | Hopkins | June 22, 1954 |

FOREIGN PATENTS

| | | |
|---|---|---|
| 681,036 | Great Britain | Oct. 15, 1952 |